United States Patent
Ito et al.

(10) Patent No.: US 10,049,825 B2
(45) Date of Patent: Aug. 14, 2018

(54) CYCLIC QUATERNARY AMMONIUM SALT, NONAQUEOUS SOLVENT, NONAQUEOUS ELECTROLYTE, AND POWER STORAGE DEVICE

(71) Applicant: Semiconductor Energy Laboratory Co., Ltd., Atsugi-shi, Kanagawa-ken (JP)

(72) Inventors: Kyosuke Ito, Saitama (JP); Toru Itakura, Kanagawa (JP); Rie Yokoi, Kanagawa (JP); Jun Ishikawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 382 days.

(21) Appl. No.: 13/864,477

(22) Filed: Apr. 17, 2013

(65) Prior Publication Data

US 2013/0288112 A1 Oct. 31, 2013

(30) Foreign Application Priority Data

Apr. 27, 2012 (JP) ................ 2012-103033
Oct. 5, 2012 (JP) ................ 2012-222974
Mar. 13, 2013 (JP) ................ 2013-049812

(51) Int. Cl.
*H01M 10/056* (2010.01)
*H01G 11/62* (2013.01)
(Continued)

(52) U.S. Cl.
CPC ............ *H01G 11/54* (2013.01); *H01G 11/62* (2013.01); *H01M 10/052* (2013.01); *H01M 10/056* (2013.01); *Y02E 60/13* (2013.01)

(58) Field of Classification Search
CPC .... H01M 10/05; H01M 10/056; H01G 11/62; C07D 209/54; C07D 221/20
(Continued)

(56) References Cited

U.S. PATENT DOCUMENTS 5,580,540 A 12/1996 Nakagawa
5,645,812 A 7/1997 Nakagawa
(Continued)

FOREIGN PATENT DOCUMENTS

CN 101300260 A 11/2008
CN 101784524 A 7/2010
(Continued)

OTHER PUBLICATIONS

Blicke, F et al., "Polycyclic Quaternary Ammonium Salts. III," J. Am. Chem. Soc. (Journal of the American Chemical Society), 1954, vol. 76, No. 20, pp. 5099-5103.
(Continued)

*Primary Examiner* — James Lee
(74) *Attorney, Agent, or Firm* — Fish & Richardson P.C.

(57) ABSTRACT

To provide an ionic liquid which has at least one of properties such as high ionic conductivity, a small reduction in ionic conductivity at a low temperature, a low melting point, and a low viscosity. To provide a power storage device having higher initial charge and discharge efficiency than a power storage device containing a conventional ionic liquid. A cyclic quaternary ammonium salt is liquid at room temperature and contains a quaternary spiro ammonium cation having an asymmetrical structure including two aliphatic rings and one or more substituents bonded to one or both of the two aliphatic rings and an anion corresponding to the quaternary spiro ammonium cation. The power storage device includes a positive electrode, a negative electrode,
(Continued)

and a nonaqueous electrolyte containing the cyclic quaternary ammonium salt as a nonaqueous solvent.

21 Claims, 21 Drawing Sheets

(51) Int. Cl.
    *C07D 209/54*      (2006.01)
    *C07D 221/20*      (2006.01)
    *H01G 11/54*      (2013.01)
    *H01M 10/052*      (2010.01)

(58) Field of Classification Search
    USPC .................. 429/121–347; 546/16; 361/502
    See application file for complete search history.

(56) References Cited

U.S. PATENT DOCUMENTS

| | | | |
|---|---|---|---|
| 5,683,572 | A | 11/1997 | Nakagawa |
| 5,911,968 | A | 6/1999 | Nakagawa |
| 5,968,474 | A | 10/1999 | Nakagawa et al. |
| 6,086,848 | A | 7/2000 | Nakagawa et al. |
| 6,444,191 | B1 | 9/2002 | Nakagawa |
| 6,469,888 | B1 | 10/2002 | Otsuki et al. |
| 7,179,561 | B2 | 2/2007 | Niu et al. |
| 7,411,777 | B2 | 8/2008 | Chiba |
| 7,745,047 | B2 | 6/2010 | Zhamu et al. |
| 7,842,432 | B2 | 11/2010 | Niu et al. |
| 7,939,218 | B2 | 5/2011 | Niu |
| 7,977,007 | B2 | 7/2011 | Niu et al. |
| 7,977,013 | B2 | 7/2011 | Niu et al. |
| 8,088,917 | B2 | 1/2012 | Forsyth et al. |
| 8,278,011 | B2 | 10/2012 | Zhu et al. |
| 8,426,593 | B2 | 4/2013 | Siggel et al. |
| 8,686,134 | B2 | 4/2014 | Forsyth et al. |
| 9,064,633 | B2 | 6/2015 | Siggel et al. |
| 2004/0094741 | A1* | 5/2004 | Sato et al. ......................... 252/1 |
| 2006/0245143 | A1* | 11/2006 | Nakamura ............. H01G 11/42 361/502 |
| 2006/0274475 | A1 | 12/2006 | Chiba |
| 2007/0049750 | A1* | 3/2007 | Siggel .................. C07D 471/10 540/543 |
| 2008/0254296 | A1 | 10/2008 | Handa et al. |
| 2008/0296531 | A1* | 12/2008 | Whiston et al. ............ 252/182.3 |
| 2010/0143798 | A1 | 6/2010 | Zhamu et al. |
| 2010/0176337 | A1 | 7/2010 | Zhamu et al. |
| 2010/0178555 | A1* | 7/2010 | Best .................... H01M 4/5825 429/188 |
| 2010/0248034 | A1 | 9/2010 | Oki et al. |
| 2010/0330421 | A1 | 12/2010 | Cui et al. |
| 2011/0012067 | A1 | 1/2011 | Kay |
| 2011/0070486 | A1 | 3/2011 | Matsumoto et al. |
| 2011/0111303 | A1 | 5/2011 | Kung et al. |
| 2011/0121240 | A1 | 5/2011 | Amine et al. |
| 2011/0159372 | A1 | 6/2011 | Zhamu et al. |
| 2011/0229795 | A1 | 9/2011 | Niu et al. |
| 2012/0082872 | A1* | 4/2012 | Schmidt ............ H01M 10/0525 429/50 |
| 2012/0308882 | A1 | 12/2012 | Ito et al. |
| 2012/0328960 | A1 | 12/2012 | Ito et al. |

FOREIGN PATENT DOCUMENTS

| | | |
|---|---|---|
| JP | 2001-217151 A | 8/2001 |
| JP | 2003-331918 A | 11/2003 |
| JP | 2005-347176 A | 12/2005 |
| JP | 2006-049447 A | 2/2006 |
| JP | 2006-265751 A | 10/2006 |
| JP | 2007-189024 A | 7/2007 |
| JP | 2009-506121 | 2/2009 |
| JP | 2009-524567 A | 7/2009 |
| JP | 2009-176721 A | 8/2009 |
| JP | 2009-218608 A | 9/2009 |
| JP | 2011-503804 A | 1/2011 |
| JP | 2011-517053 A | 5/2011 |
| JP | 2012-056897 A | 3/2012 |
| JP | 2013-177324 A | 9/2013 |
| TW | I593663 | 8/2017 |
| WO | 1995/009812 A1 | 4/1995 |
| WO | 1996/034827 A1 | 11/1996 |
| WO | WO-1997/020769 | 6/1997 |
| WO | WO-1998/029339 | 7/1998 |
| WO | 2005/022571 A1 | 3/2005 |
| WO | 2006/062947 A2 | 6/2006 |
| WO | WO-2007/027649 | 3/2007 |
| WO | 2007/061945 A2 | 5/2007 |
| WO | WO-2008/150842 | 12/2008 |
| WO | 2009/061685 A1 | 5/2009 |
| WO | 2009/127901 A1 | 10/2009 |
| WO | 2009/136608 A1 | 11/2009 |
| WO | 2009/144600 A2 | 12/2009 |
| WO | WO-2013/162040 | 10/2013 |

OTHER PUBLICATIONS

Lasslo, A et al., "The Effect of Piperidinecarboxamide Derivatives on Isolated Human Plasma Cholinesterase," Journal of Medicinal Chemistry, 1963, vol. 6, No. 6, pp. 811-813.
Paillaud, J et al., "Structure orienting role of germanium in zeolite synthesis," Studies in Surface Science and Catalysis, 2007, vol. 170, pp. 389-396.
Wagner, P et al., "Guest/Host Relationships in the Synthesis of the Novel Cage-Based Zeolites SSZ-35, SSZ-36, and SSZ-39," J. Am. Chem. Soc. (Journal of the American Chemical Society), 2000, vol. 122, No. 2, pp. 263-273.
International Search Report, PCT Application No. PCT/JP2013/062518, dated May 28, 2013, 4 pages.
Written Opinion, PCT Application No. PCT/JP2013/062518, dated May 28, 2013, 5 pages.
Makoto UE et al.; "Electrochemical Properties of Organic Liquid Electrolytes Based on Quaternary Onium Salts for Electrical Double-Layer Capacitors"; J. Electrochem. Soc. (Journal of the Electrochemical Society); Nov. 1, 1994; pp. 2989-2996; vol. 141, No. 11.
Toru Itakura et al.; "Cycle performance of lithium ion batteries containing ionic liquids with improved reduction stability"; 222nd ECS Meeting Abstract; Oct. 7, 2012; p. 1213; Abstract #1213, Honolulu PRiME 2012, The Electrochemical Society.
Xufeng Zhou et al.; "Graphene modified LiFePO4 cathode materials for high power lithium ion batteries"; Journal of Materials Chemistry; 2011; pp. 3353-3358; vol. 21.
Fang-Yuan Su et al.; "Flexible and planar grapheme conductive additives for lithium-ion batteries"; Journal of Materials Chemistry; 2010; pp. 9644-9650; vol. 20.
Guihua Yu et al.; "Solution-Processed Graphene/MnO2 Nanostructured Textiles for High-Performance Electrochemical Capacitors"; Nano Letters; 2011; pp. 2905-2911; vol. 11, No. 7.
Chinese Office Action (Application No. 201380022137.0) dated Nov. 3, 2015.
Itakura.T et al., "Cycle Performance of Lithium-Ion Batteries Containing Ionic Liquids with Improved Reduction Stability", ECS Transactions, 2013, vol. 50, No. 26, pp. 329-338, The Electrochemical Society.
Taiwanese Office Action (Application No. 102114626) dated Nov. 7, 2016.
Chinese Office Action (Application No. 201380022137.0) dated Jun. 13, 2017.
Taiwanese Office Action (Application No. 106115838) dated Mar. 9, 2018.
Zones.S et al., "A Study of Piperidinium Structure-Directing Agents in the Synthesis of Silica Molecular Sieves under Fluoride-Based Conditions", J. Am. Chem. Soc. (Journal of the American Chemical Society), Jul. 25, 2007, vol. 129, No. 29, pp. 9066-9079.

* cited by examiner

FIG. 2A
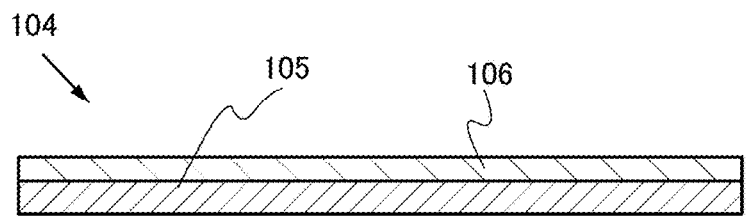
FIG. 2B  FIG. 2C
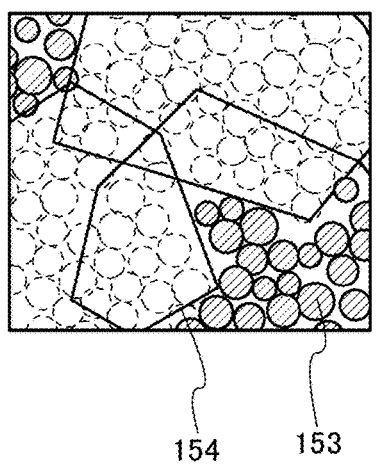
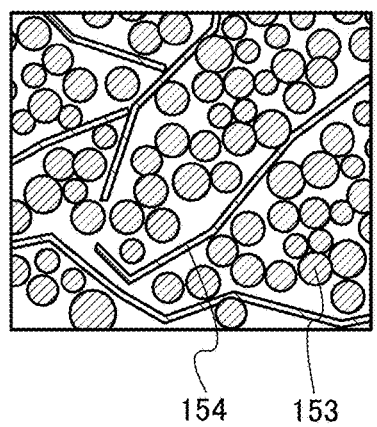
FIG. 2D
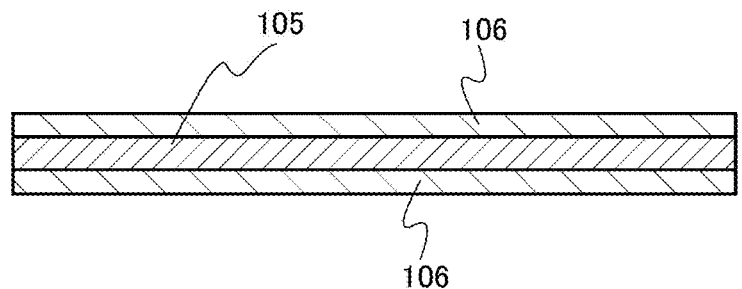

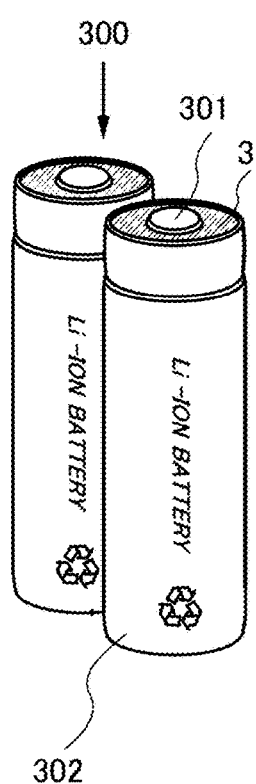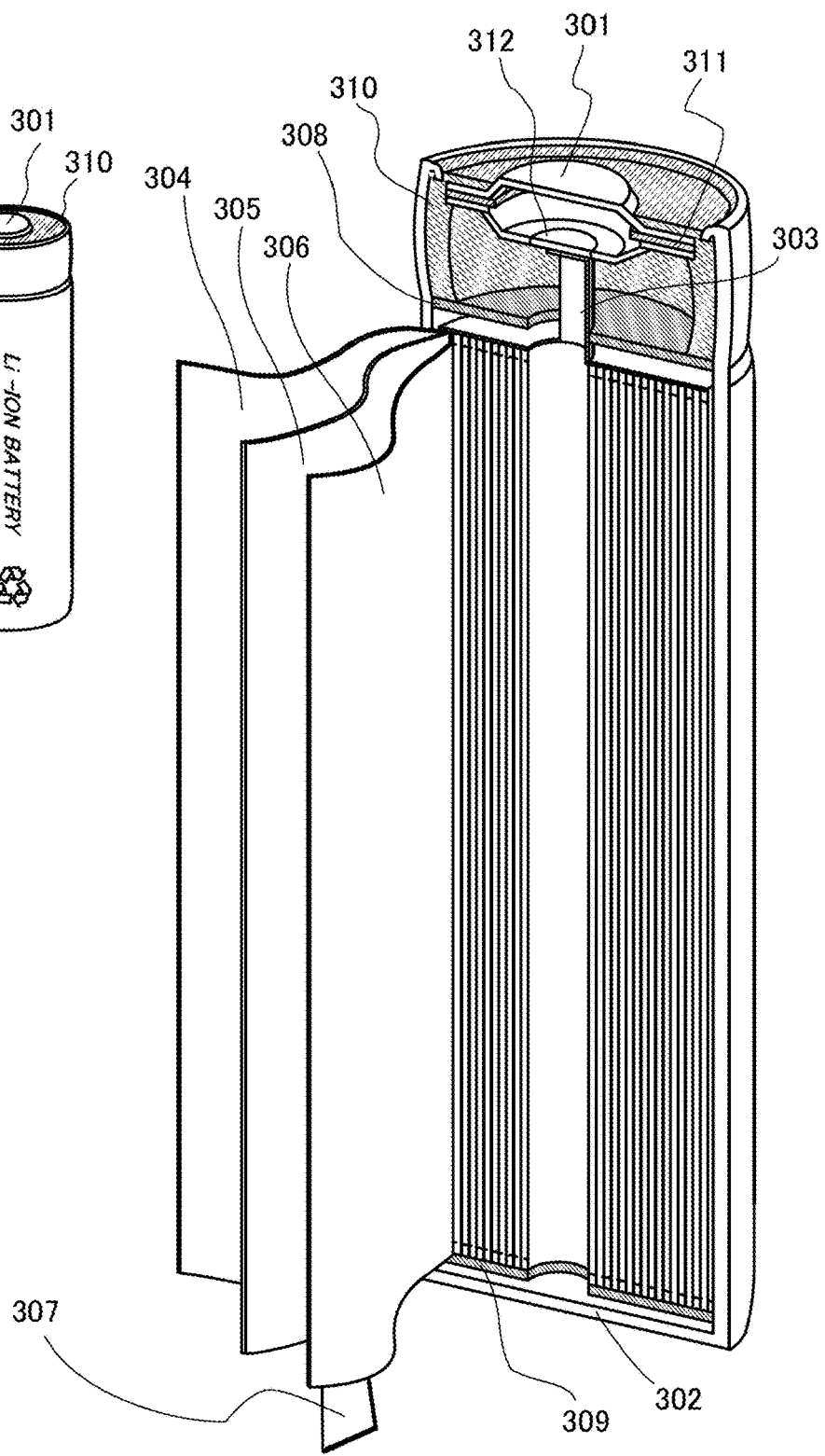
FIG. 5A
FIG. 5B

CYCLIC QUATERNARY AMMONIUM SALT, NONAQUEOUS SOLVENT, NONAQUEOUS ELECTROLYTE, AND POWER STORAGE DEVICE

TECHNICAL FIELD

The present invention relates to a cyclic quaternary ammonium salt which is liquid at room temperature and atmospheric pressure, a nonaqueous solvent containing the cyclic quaternary ammonium salt, a nonaqueous electrolyte containing the cyclic quaternary ammonium salt, and a power storage device containing the nonaqueous electrolyte.

A salt which is liquid at room temperature and atmospheric pressure is called an ionic liquid or a room temperature molten salt. For this reason, in this specification, a cyclic quaternary ammonium salt of one embodiment of the present invention may be referred to as an ionic liquid of one embodiment of the present invention. Further, room temperature in this specification means a temperature in the range of 5° C. to 35° C.

Note that the power storage device indicates every element and device having a function of storing power.

BACKGROUND ART

Lithium secondary batteries which are one example of power storage devices have been used for a variety of uses, for example, laptop personal computers, mobile phones, smartphones, and next-generation clean energy vehicles such as hybrid electric vehicles (HEVs), plug-in hybrid electric vehicles (PHEVs), and electronic vehicles (EVs). Properties necessary for such lithium secondary batteries are high energy density, excellent cycle characteristics, safety in a variety of operation environments, and the like.

In many of lithium secondary batteries used widely, a nonaqueous electrolyte (also referred to as a nonaqueous electrolytic solution or simply an electrolytic solution) is used; the nonaqueous electrolyte contains an organic solvent which is liquid at room temperature, such as diethyl carbonate (DEC), ethylene carbonate (EC), dimethyl carbonate (DMC), or propylene carbonate (PC), which has a high dielectric constant and high ionic conductivity, and a lithium salt containing lithium ions.

However, the above organic solvents each have volatility and a low flash point; thus, when any of the organic solvents is used in a lithium secondary battery, the lithium secondary battery could internally short out or the internal temperature of the lithium secondary battery could increase owing to overcharging or the like, so that the lithium secondary battery would explode or catch fire.

Here, Table 1 shows comparison results of thermal stability of organic solvents and an ionic liquid used in electrolytic solutions.

TABLE 1

|  | Freezing point (melting point) (° C.) | Flash point (° C.) | Vapor pressure (hPa) |
| --- | --- | --- | --- |
| EC | 248 | 150 | 0.12 |
| PC | 242 | 135 | 0.03 |
| DMC | 90 | 18 | 11 |
| DEC | 126 | 33 | 53 |
| Ionic liquid | >300 | — | ≈0 |

Note that the organic solvent shown in Table 1 having a lower flash point and a higher vapor pressure is more flammable. Thus, a battery containing the organic solvent has a possibility of catching fire when the internal pressure of the battery increases owing to heat generation or the battery shorts out. In contrast, ionic liquids are known to have a low possibility of catching fire and causing an explosion.

In view of the above, the use of an ionic liquid (also referred to as a room temperature molten salt) which has non-flammability and non-volatility as a nonaqueous solvent of a nonaqueous electrolyte of a lithium secondary battery has been proposed. Examples of such an ionic liquid are an ionic liquid containing ethylmethylimidazolium (EMI) cation, an ionic liquid containing an N-methyl-N-propylpyrrolidinium (P13) cation, and an ionic liquid containing an N-methyl-N-propylpiperidinium (PP13) cation (see Patent Document 1).

An example of an ionic liquid containing a cyclic quaternary ammonium cation such as a PP13 cation is an ionic liquid containing a quaternary ammonium cation having a spiro ring and an amide anion with an asymmetrical structure (e.g., fluorosulfonyl(trifluoromethylsulfonylamide) (FTA; $[(FSO_2)(CF_3SO_2)N^-])$) (see Patent Document 2).

Properties necessary for an ionic liquid in a lithium secondary battery are high conductivity, a low possibility of reduction in conductivity at a low temperature, a low freezing point, a low viscosity, and the like besides non-flammability and non-volatility. Note that a low temperature in this specification refers to a temperature lower than approximately 25° C. (room temperature).

The summary of the properties needed for an ionic liquid (electrolytic solution) is shown below.

TABLE 2

| Properties needed for electrolytic solution | Organic solvent | Ionic liquid |
| --- | --- | --- |
| Boiling point and heat resistance | acceptable to high | very high |
| Melting point | low | low to very low |
| Viscosity | very low | acceptable to low |
| Electrochemical stability | high | high |
| Flammability | acceptable | very low |
| Volatility | acceptable | very low |

Patent Document 2 discloses that an ionic liquid a quaternary spiro ammonium salt containing an FTA anion has resistance to oxidation and reduction, a low viscosity, and a high conductivity and thus is suitable for an electrolytic solution of a lithium secondary battery.

Further, Patent Document 2 discloses that when an ionic liquid containing a highly symmetrical cation and generally having a high melting point has an amide anion with an asymmetrical structure, such as an FTA anion, as an anion in the ionic liquid, the melting point of the ionic liquid can be lowered.

REFERENCE

[Patent Document 1] Japanese Published Patent Application No. 2003-331918

[Patent Document 2] PCT International Publication No. WO2009/136608

[Patent Document 3] PCT International Publication No. WO2005/022571

[Patent Document 4] Japanese Published Patent Application No. 2001-217151

Non-Patent Document 1

Makoto Ue, Kazuhiko Ida, and Shoichiro Mori, "Electrochemical Properties of Organic Liquid Electrolytes Based on Quaternary Onium Salts for Electrical Double-Layer Capacitors", Journal of the Electrochemical Society, November 1994, Vol. 141, No. 11, pp. 2989-2996

DISCLOSURE OF INVENTION

In lithium secondary batteries used widely, a graphite-based material is used for negative electrodes in consideration of safety and productivity. In the case where a lithium secondary battery including a graphite-based material for a negative electrode contains an ionic liquid, the lithium secondary battery, in many cases, does not operate unless an additive such as ethylene carbonate (EC) or vinylene carbonate (VC) is used. This is because it is said that film formation occurs as a result of a deposition reaction of the additive, leading to battery operation.

However, the deposition reaction of the additive and the reaction of film formation are irreversible reactions and thus are causes of reduction in charge and discharge capacity (e.g., initial charge and discharge capacity). For example, even when an ionic liquid a quaternary spiro ammonium salt containing a FTA anion in patent Document 2 is used for an electrolytic solution in a lithium secondary battery, an additive is necessary and thus the additive would cause reduction in charge and discharge capacity. Therefore, unnecessity of the additive is useful to manufacture a lithium secondary battery which contains an ionic liquid.

Note that it is known that in a lithium secondary battery which contains an ionic liquid and includes a graphite-based negative electrode, when the ionic liquid contains a bis(fluorosulfonyl)amide anion (hereinafter abbreviated to an FSA anion) as an anion, the lithium secondary battery operates without an additive; however, the salt containing a quaternary spiro ammonium cation and an FSA anion in Patent Document 2 is solid at room temperature.

Further, the salt which contains an unsubstituted quaternary spiro ammonium cation in Patent Document 2 and tetrafluoroborate as an anion instead of an FSA anion is also solid at room temperature (see Patent Documents 3 and 4 and Non-patent Document 1).

Thus, a cyclic quaternary ammonium salt which is solid at room temperature is not suitable for an electrolytic solution in a lithium secondary battery, and it is difficult to obtain a salt which contains a quaternary spiro ammonium cation and is liquid at room temperature.

In view of the above, an object of one embodiment of the present invention is to provide an ionic liquid which has at least one of properties such as high ionic conductivity, a small reduction in ionic conductivity at a low temperature, a low freezing point (melting point), and a low viscosity. Note that a freezing point and a melting point are, in a strict sense, different physical properties; however, in this specification, a freezing point and a melting point have the same meaning, that is, a freezing point can also be referred to as a melting point.

Another object of one embodiment of the present invention is to provide a nonaqueous electrolyte which allows manufacture of a high-performance power storage device. Another object of one embodiment of the present invention is to provide a high-performance power storage device. For example, it is an object to provide a power storage device having higher initial charge and discharge efficiency than a power storage device containing a conventional ionic liquid.

In view of the above objects, one embodiment of the present invention is a cyclic quaternary ammonium salt which is liquid at room temperature and atmospheric pressure and which contains a cation whose structure is made to be asymmetrical by introduction of a substituent and an anion corresponding to the cation.

Specifically, one embodiment of the present invention is a cyclic quaternary ammonium salt which is liquid at room temperature and which contains a quaternary spiro ammonium cation and an anion corresponding to the quaternary spiro ammonium cation. The quaternary spiro ammonium cation has an asymmetrical structure including two aliphatic rings and one or more substituents bonded to one or both of the two aliphatic rings.

The above can be described using a general formula as follows. One embodiment of the present invention is a cyclic quaternary ammonium salt which is liquid at room temperature and which can be expressed by General Formula (G1). In General Formula (G1), a quaternary spiro ammonium cation has an asymmetrical structure.

[Chemical Formula 1]

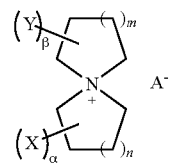

(G1)

In General Formula (G1), n and m are greater than or equal to 1 and less than or equal to 3. Assume that α is greater than or equal to 0 and less than or equal to 6. When n is 1, α is greater than or equal to 0 and less than or equal to 4. When n is 2, α is greater than or equal to 0 and less than or equal to 5. When n is 3, α is greater than or equal to 0 and less than or equal to 6. Assume that β is greater than or equal to 0 and less than or equal to 6. When m is 1, β is greater than or equal to 0 and less than or equal to 4. When m is 2, β is greater than or equal to 0 and less than or equal to 5. When m is 3, β is greater than or equal to 0 and less than or equal to 6. "α or β is 0" means that at least one of two aliphatic rings is unsubstituted. Note that the case where both α and β are 0 is excluded. X or Y is a substituent such as a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. Further, A$^-$ is a monovalent amide anion, a monovalent methide anion, a perfluoroalkylsulfonate anion, tetrafluoroborate, perfluoroalkylborate, hexafluorophosphate, or perfluoroalkylphosphate.

In the quaternary spiro ammonium cation, two aliphatic rings composing a spiro ring are each a five-membered ring, a six-membered ring, or a seven-membered ring. One embodiment of the present invention is a cyclic quaternary ammonium salt which is liquid at room temperature and which can be expressed by General Formula (G2). In General Formula (G2), a quaternary Spiro ammonium cation has an asymmetrical structure.

[Chemical Formula 2]

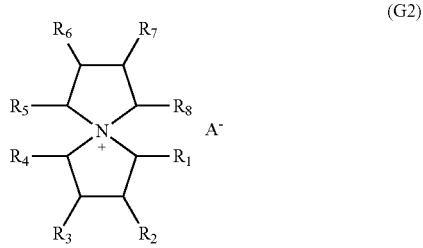

(G2)

In General Formula (G2), $R_1$ to $R_8$ are each a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

Specifically, one embodiment of the present invention is a cyclic quaternary ammonium salt which is liquid at room temperature and which can be expressed by General Formula (G3).

[Chemical Formula 3]

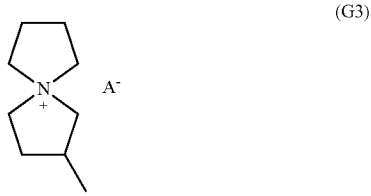

(G3)

In General Formula (G3), $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

One embodiment of the present invention is a cyclic quaternary ammonium salt which is liquid at room temperature and which can be expressed by General Formula (G4). In General Formula (G4), a quaternary spiro ammonium cation has an asymmetrical structure.

[Chemical Formula 4]

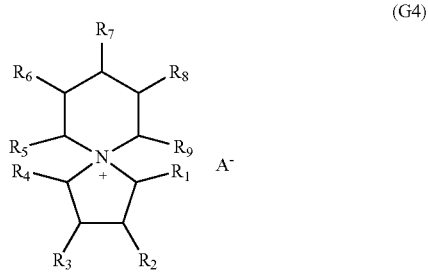

(G4)

In General Formula (G4), $R_1$ to $R_9$ are each a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

Specifically, one embodiment of the present invention is a cyclic quaternary ammonium salt which is liquid at room temperature and which can be expressed by General Formula (G9).

[Chemical Formula 5]

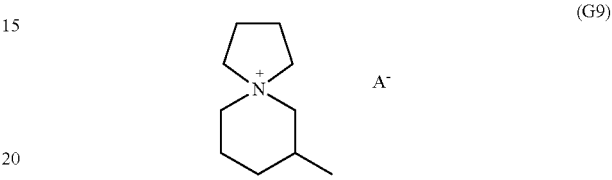

(G9)

In General Formula (G9), $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

More specifically, one embodiment of the present invention is a cyclic quaternary ammonium salt which is liquid at room temperature and which can be expressed by General Formula (G10).

[Chemical Formula 6]

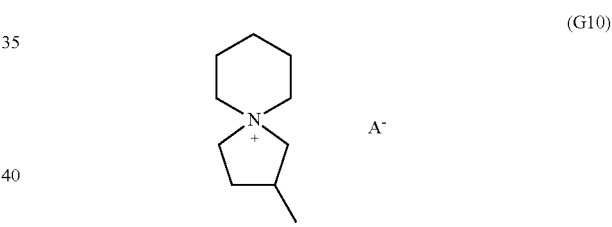

(G10)

In General Formula (G10), $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

A cation having an n-fold (n is an integer larger than or equal to 2) rotation axis passing through a specific atom (e.g., a spiro atom) has a symmetrical structure. The smaller the number of the rotation axes is, the lower the degree of symmetry of the cation is. Thus, a cation not having the n-fold rotation axis can be said to have an asymmetrical structure.

In view of the above, one embodiment of the present invention is a cyclic quaternary ammonium salt which is liquid at room temperature and which contains a quaternary spiro ammonium cation and an anion corresponding to the quaternary spiro ammonium cation. The quaternary spiro ammonium cation has two aliphatic rings and one or more substituents bonded to one or both of the two aliphatic rings and does not have an n-fold (n is an integer larger than or equal to 2) rotation axis passing through a spiro atom.

One embodiment of the present invention is a cyclic quaternary ammonium salt which is liquid at room temperature and which is expressed by General Formula (G1) or General Formula (G2). In General Formula (G1) and General Formula (G2), a quaternary spiro ammonium cation does not have an n-fold (n is an integer larger than or equal to 2) rotation axis passing through a spiro atom.

Further, a nonaqueous electrolyte can be formed by dissolving a metal salt serving as a solute in the cyclic quaternary ammonium salt (ionic liquid) of one embodiment of the present invention as a nonaqueous solvent. As the metal salt, an alkali metal salt, an alkaline earth metal salt, a magnesium salt, a beryllium salt, or the like can be used. The nonaqueous solvent may be a mixed solvent containing two or more of nonaqueous solvents at least one of which is the cyclic quaternary ammonium salt of one embodiment of the present invention. For example, the nonaqueous solvent may be a mixed solvent containing a plurality of the cyclic quaternary ammonium salts of embodiments of the present invention which have different structures or a mixed solvent containing the cyclic quaternary ammonium salts of one embodiment of the present invention and another ionic liquid or an organic solvent.

With the use of at least a positive electrode and a negative electrode in addition to the nonaqueous electrolyte, a power storage device can be formed. For example, the use of a lithium salt as a metal salt in the nonaqueous electrolyte enables manufacture of a lithium secondary battery or a lithium-ion capacitor.

The cyclic quaternary ammonium salt of one embodiment of the present invention is compatible with a negative electrode including a graphite-based material. Thus, the use of the cyclic quaternary ammonium salt as a nonaqueous solvent of a nonaqueous electrolyte allows manufacture of a power storage device without an additive such as EC or VC. When an additive is not used, an irreversible reaction which is a cause of a reduction in charge and discharge capacity can be minimized, so that a power storage device having a smaller reduction in charge and discharge capacity than a power storage device containing a conventional ionic liquid can be manufactured.

According to one embodiment of the present invention, an ionic liquid which has at least one of properties such as high ionic conductivity, a small reduction in ionic conductivity at a low temperature, a low freezing point (melting point), and a low viscosity can be provided.

Further, the use of the cyclic quaternary ammonium salt of one embodiment of the present invention enables formation of a nonaqueous electrolyte with which a high-performance power storage device can be manufactured. The use of the cyclic quaternary ammonium salt or the nonaqueous electrolyte of one embodiment of the present invention allows manufacture of a power storage device including a graphite-based material for a negative electrode without an additive such as EC or VC. When an additive is not used, a power storage device where a reduction in charge and discharge capacity is minimized can be manufactured. Thus, according to one embodiment of the present invention, a high-performance power storage device can be provided.

BRIEF DESCRIPTION OF DRAWINGS

In the accompanying drawings:

FIGS. 2A to 2D illustrate positive electrodes of coin-type power storage devices;

FIGS. 5A and 5B illustrate a cylindrical lithium ion battery;

BEST MODE FOR CARRYING OUT THE INVENTION

Figure 1A:
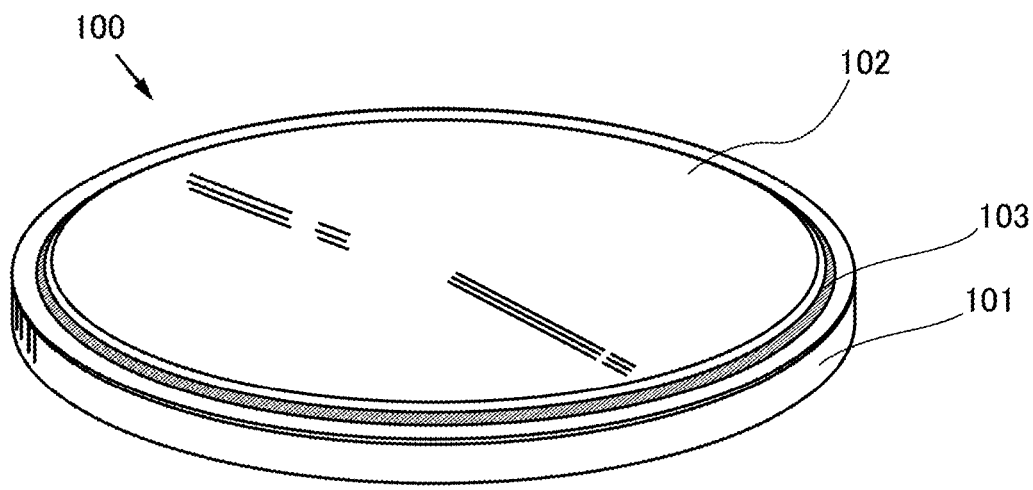
FIGS. 1A and 1B are a perspective view and a cross-sectional view of a coin-type power storage device.

Hereinafter, embodiments and examples of the present invention will be described in detail with reference to the accompanying drawings. However, the present invention is not limited to the following descriptions and it is easily understood by those skilled in the art that the mode and details can be variously changed without departing from the scope and spirit of the present invention. Therefore, the present invention should not be interpreted as being limited to the descriptions of the embodiments and examples. In describing the structures of the present invention with reference to the drawings, the same reference numerals are used in common for the same portions in different drawings. The same hatch pattern is applied to similar parts, and the similar parts are not especially denoted by reference numerals in some cases. Note that the size, the layer thickness, or the region of each structure illustrated in each drawing is exaggerated for clarity in some cases. Therefore, the present invention is not necessarily limited to such scales in the drawings.

Embodiment 1

In this embodiment, an ionic liquid of one embodiment of the present invention will be described.

The ionic liquid of one embodiment of the present invention is a cyclic quaternary ammonium salt which is liquid at room temperature and atmospheric pressure and which contains a cation whose structure is made to be asymmetrical by introduction of a substituent and an anion corresponding to the cation.

Specifically, the ionic liquid is a cyclic quaternary ammonium salt which is liquid at room temperature and which contains a quaternary spiro ammonium cation and an anion corresponding to the quaternary spiro ammonium cation. The quaternary spiro ammonium cation has an asymmetrical structure including two aliphatic rings and one or more substituents bonded to one or both of the two aliphatic rings.

An ionic liquid of one embodiment of the present invention is a cyclic quaternary ammonium salt which is liquid at room temperature and which can be expressed by General Formula (G1).

[Chemical Formula 7]

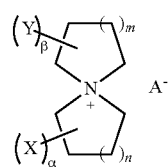

(G1)

In General Formula (G1), n and m are greater than or equal to 1 and less than or equal to 3. Assume that α is greater than or equal to 0 and less than or equal to 6. When n is 1, α is greater than or equal to 0 and less than or equal to 4. When n is 2, α is greater than or equal to 0 and less than or equal to 5. When n is 3, α is greater than or equal to 0 and less than or equal to 6. Assume that β is greater than or equal to 0 and less than or equal to 6. When m is 1, β is greater than or equal to 0 and less than or equal to 4. When m is 2, β is greater than or equal to 0 and less than or equal to 5. When m is 3, β is greater than or equal to 0 and less than or equal to 6. "α or β is 0" means that at least one of two aliphatic rings is unsubstituted. Note that the case where both α and β are 0 is excluded. X or Y is a substituent such as a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. Further, A⁻ is a monovalent amide anion, a monovalent methide anion, a perfluoroalkylsulfonate anion, tetrafluoroborate, perfluoroalkylborate, hexafluorophosphate, or perfluoroalkylphosphate.

In General Formula (G1), n and m are greater than or equal to 1 and less than or equal to 3; thus, the quaternary spiro ammonium cation has a spiro ring including two aliphatic rings selected from a five-membered ring, a six-membered ring, and a seven-membered ring. Note that the two aliphatic rings may each have the same number of carbon atoms or a different number of carbon atoms. That is to say, as the spiro ring, any of combinations of five-membered rings, a five-membered ring and a six-membered ring, a five-membered ring and a seven-membered ring, six-membered rings, a six-membered ring and a seven-membered ring, and seven-membered rings can be employed. The spiro ring with any of the combinations where two aliphatic rings are unsubstituted has a symmetrical structure.

In the quaternary spiro ammonium cation in the cyclic quaternary ammonium salt of one embodiment of the present invention, a substituent is introduced into at least one of the two aliphatic rings composing the symmetrical spiro ring with any of the combinations to make the spiro ring asymmetrical.

This is based on the fact that a salt whose cation or anion has an asymmetrical structure is more likely to be liquid at room temperature.

Further, at least one of the aliphatic rings composing the spiro ring in the quaternary spiro ammonium cation expressed by General Formula (G1) is preferably an aliphatic ring having 5 carbon atoms (n or m is 2 in General Formula (G1)) in terms of the stability, viscosity, ionic conductivity, and easy synthesis of a compound.

An example of the cyclic quaternary ammonium salt of one embodiment of the present invention is a cyclic quaternary ammonium salt which has a spiro ring including five-membered rings and which is expressed by General Formula (G2). Note that in General Formula (G2), the degree of symmetry of the quaternary spiro ammonium cation is decreased (the symmetry thereof is destroyed) by $R_1$ to $R_8$ or the quaternary spiro ammonium cation preferably has an asymmetrical structure.

[Chemical Formula 8]

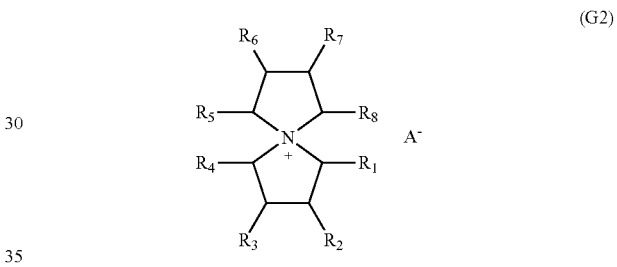

(G2)

In General Formula (G2), $R_1$ to $R_8$ are each a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. A⁻ is a monovalent amide anion, a monovalent methide anion, a perfluoroalkylsulfonate anion, tetrafluoroborate, perfluoroalkylborate, hexafluorophosphate, or perfluoroalkylphosphate.

The anion in General Formula (G1) and General Formula (G2) is a monovalent anion which is contained in the ionic liquid along with the quaternary spiro ammonium cation. Examples of the anion are a monovalent amide anion, a monovalent methide anion, a perfluoroalkylsulfonate anion, tetrafluoroborate ($BF_4^-$), perfluoroalkylborate, hexafluorophosphate ($PF_6^-$), or perfluoroalkylphosphate. Examples of a monovalent amide anion are $(C_nF_{2n+1}SO_2)_2N^-$ (n=0 to 3) and $CF_2(CF_2SO_2)_2N^-$. Examples of a monovalent methide anion are $(C_nF_{2n+1}SO_2)_2C^-$ (n=0 to 3) and $CF_2(CF_2SO_2)_2C^-$. An examples of a perfluoroalkylsulfonate anion is $(C_mF_{2m+1}SO_3)^-$ (m=0 to 4). An example of perfluoroalkylborate is $\{BF_n(C_mH_kF_{2m+1-k})_{4-n}\}^-$ (n=1 to 3, m=1 to 4, and k=0 to 2m). An example of perfluoroalkylphosphate is $\{PF_n(C_mH_kF_{2m+1-k})_{6-n}\}^-$ (n=1 to 5, m=1 to 4, and k=0 to 2m). Note that the anion is not limited thereto.

As a substituent of the quaternary spiro ammonium cation expressed by General Formula (G1) and General Formula (G2), a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms can be used. For example, a methyl group, an ethyl group, a methoxy group, an ethoxy group, a methoxymethyl group, or a methoxyethyl group can be used.

An example of the cyclic quaternary ammonium salt of one embodiment of the present invention which has a spiro ring structure different from that in General Formula (G2) will be described. In General Formulas (G4) to (G8), the degree of symmetry of the quaternary spiro ammonium cation is decreased (the symmetry thereof is destroyed) by $R_1$ to $R_{12}$ or the quaternary spiro ammonium cation preferably has an asymmetrical structure.

[Chemical Formula 9]

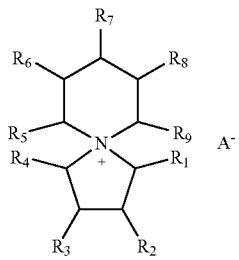

(G4)

In General Formula (G4), $R_1$ to $R_9$ are each a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

[Chemical Formula 10]

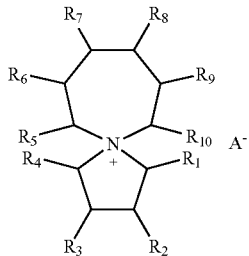

(G5)

In General Formula (G5), $R_1$ to $R_{10}$ are each a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

[Chemical Formula 11]

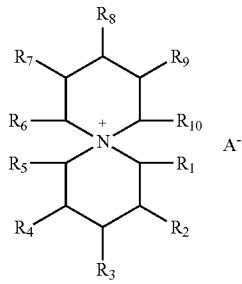

(G6)

In General Formula (G6), $R_1$ to $R_{10}$ are each a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

[Chemical Formula 12]

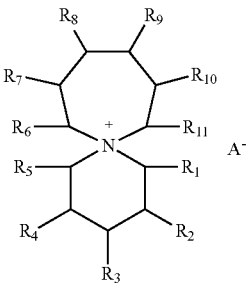

(G7)

In General Formula (G7), $R_1$ to $R_{11}$ are each a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

[Chemical Formula 13]

(G8)

In General Formula (G8), $R_1$ to $R_{12}$ are each a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms. $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

For low viscosity of the cyclic quaternary ammonium salt of one embodiment of the present invention, it is preferable that the number of substituents in the quaternary spiro ammonium cation be small and the number of carbon atoms of the substituent(s) be small. The use of an ionic liquid with a low viscosity for a nonaqueous solvent of a nonaqueous electrolyte allows the nonaqueous electrolyte to have a low viscosity and high ionic conductivity, and the use of the nonaqueous electrolyte enables manufacture of a power storage device with excellent output characteristics (rate characteristics).

Alternatively, the cyclic quaternary ammonium salt (ionic liquid) expressed by General Formula (G1) or General Formula (G2) can favorably be used for a nonaqueous solvent of a nonaqueous electrolyte in a power storage device because of its low melting point. For example, the melting point of the cyclic quaternary ammonium salt of one embodiment of the present invention is lower than approximately 0° C. The nonaqueous electrolyte also contains a metal salt; thus, the melting point of the nonaqueous electrolyte is lower than that of the ionic liquid alone. Therefore, the use of the nonaqueous electrolyte makes it possible to manufacture a power storage device which can operate at a wide range of temperatures including low temperatures.

Moreover, in the cases of the cyclic quaternary ammonium salts (ionic liquids) expressed by General Formula (G1) and General Formula (G2), the viscosity is unlikely to increase and the ionic conductivity is unlikely to decrease even at a low temperature. For this reason, any of the cyclic quaternary ammonium salts can favorably be used for a nonaqueous solvent of a nonaqueous electrolyte in a power storage device. The use of the nonaqueous electrolyte enables manufacture of a power storage device in which the degradation of battery characteristics at a low temperature is minimized.

As an example of the cyclic quaternary ammonium salt expressed by General Formula (G1) or General Formula (G2) shown above, a cyclic quaternary ammonium salt expressed by General Formula (G3) will be described below.

[Chemical Formula 14]

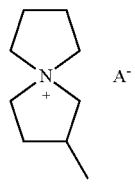

(G3)

In General Formula (G3), $A^-$ is a monovalent amide anion, a monovalent methide anion, a perfluoroalkylsulfonate anion, tetrafluoroborate, perfluoroalkylborate, hexafluorophosphate, or perfluoroalkylphosphate.

The cyclic quaternary ammonium salt expressed by General Formula (G3) is liquid at room temperature. This is owing to the effect of destroying the symmetry of the quaternary spiro ammonium cation by a methyl group, which is a substituent, as described above.

In addition, in the cyclic quaternary ammonium salt expressed by General Formula (G3), the charge density of a nitrogen atom disperses (is delocalized) when the cyclic quaternary ammonium salt has a substituent. Accordingly, the following effect can be obtained. For example, a salt containing a cation whose charge density of a nitrogen atom disperses is more likely to be liquid at room temperature. Further, in a lithium secondary battery or the like, an ionic liquid containing a cation whose charge density of a nitrogen atom disperses is more likely to have a reduction potential equivalent to or lower than the redox potential of lithium.

Specifically, in the cyclic quaternary ammonium salt expressed by General Formula (G3), the quaternary spiro ammonium cation has a methyl group. The inductive effect of the methyl group, which is an electron-donating substituent, disperses the charge density of the quaternary spiro ammonium cation; thus, the cyclic quaternary ammonium salt is liquid at room temperature. For this reason, in General Formulas (G1) to (G8), $R_1$ to $R_{12}$ each preferably have an electron-donating substituent such as an alkyl group.

In addition to the cyclic quaternary ammonium salt expressed by General Formula (G3), examples of the cyclic quaternary ammonium salt expressed by General Formula (G1), specifically, examples of the cyclic quaternary ammonium salts expressed by General Formulas (G2) and (G4) to (G8) will be given below. Examples of the cyclic quaternary ammonium salts are General Formulas (101) to (126), General Formulas (201) to (238), General Formulas (301) to (319), General Formulas (401) to (435), General Formulas (501) to (535), and General Formulas (601) to (635).

As described above, an anion $A^-$ is a monovalent amide anion, a monovalent methide anion, a perfluoroalkylsulfonate anion, tetrafluoroborate ($BF_4^-$), perfluoroalkylborate, hexafluorophosphate ($PF_6^-$), or perfluoroalkylphosphate. Examples of a monovalent amide anion are $(C_nF_{2n+1}SO_2)_2N^-$ (n=0 to 3) and $CF_2(CF_2SO_2)_2N^-$. Examples of a monovalent methide anion are $(C_nF_{2n+1}SO_2)_2C^-$ (n=0 to 3) and $CF_2(CF_2SO_2)_2C^-$. An examples of a perfluoroalkylsulfonate anion is $(C_mF_{2m+1}SO_3)^-$ (m=0 to 4). An example of perfluoroalkylborate is $\{BF_n(C_mH_kF_{2m+1-k})_{4-n}\}^-$ (n=1 to 3, m=1 to 4, and k=0 to 2m). An example of perfluoroalkylphosphate is $\{PF_n(C_mH_kF_{2m+1-k})_{6-n}\}^-$ (n=1 to 5, m=1 to 4, and k=0 to 2m). Note that the anion is not limited thereto.

[Chemical Formula 15]

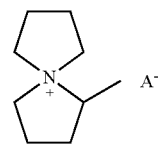

(101)

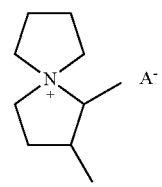

(102)

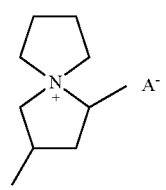 (103)
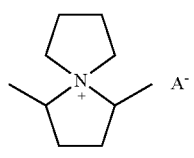 (104)
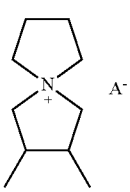 (105)
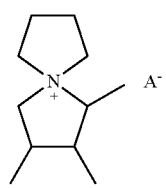 (106)
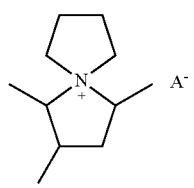 (107)
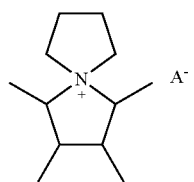 (108)
[Chemical Formula 16]
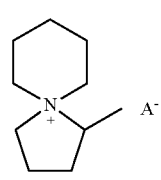 (109)
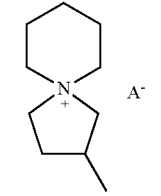 (110)
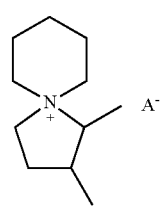 (111)
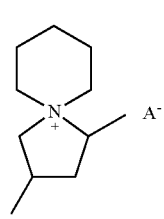 (112)
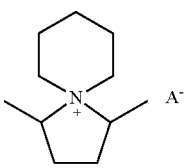 (113)
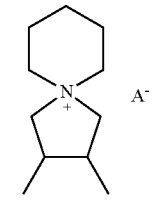 (114)
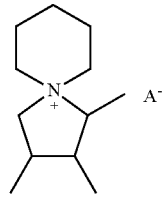 (115)
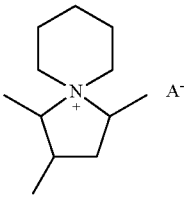 (116)
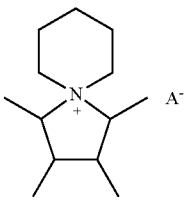 (117)

[Chemical Formula 17]
(117) 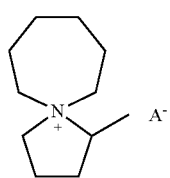
(118) 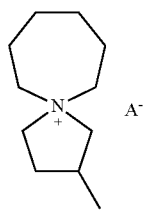
(119) 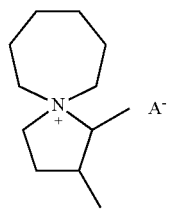
(120) 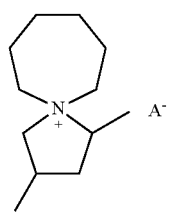
(121) 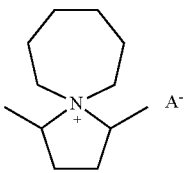
(122) 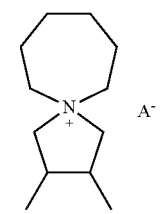
(123) 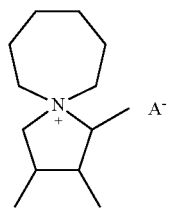
(124) 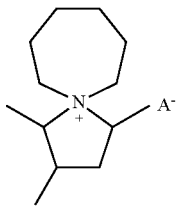
(125) 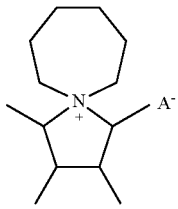
(126) 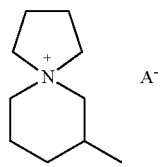
[Chemical Formula 18]
(201) 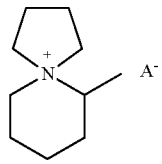
(202) 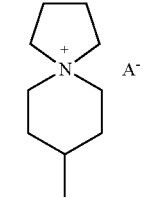
(203) 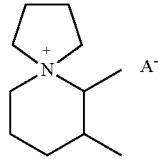
(204) 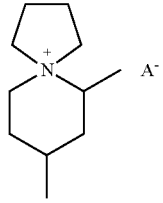
(205) 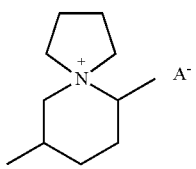
(206)

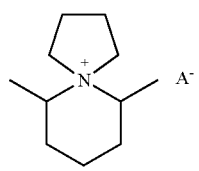 (207)
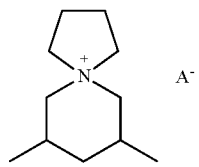 (208)
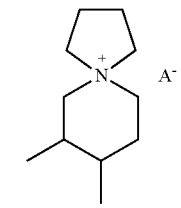 (209)
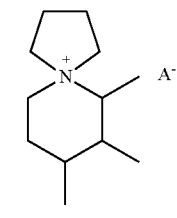 (210)
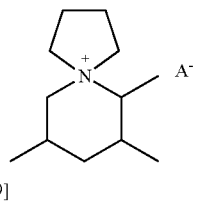 (211)
[Chemical Formula 19]
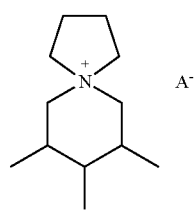 (212)
(213)
(214)
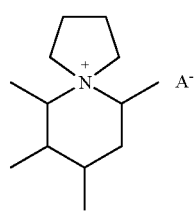 (215)
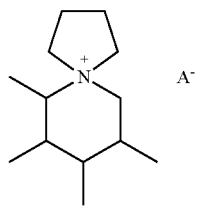 (216)
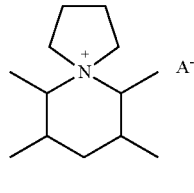 (217)
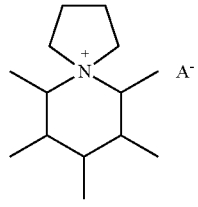 (218)
(219)
[Chemical Formula 20]
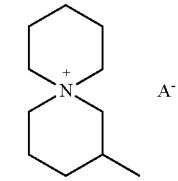 (220)
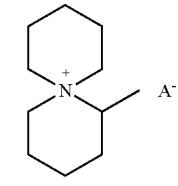 (221)

(222) 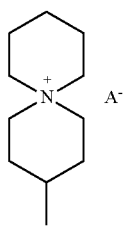
(223) 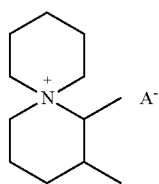
(224) 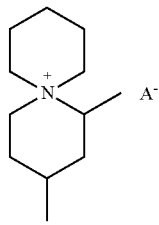
(225) 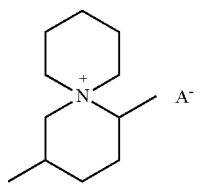
(226) 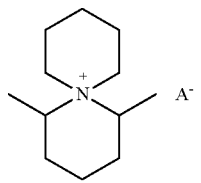
(227) 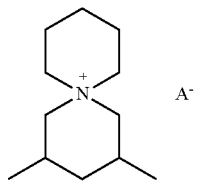
(228) 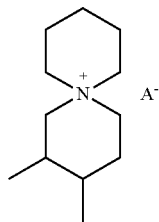
(229) 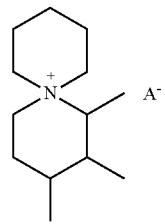
(230) 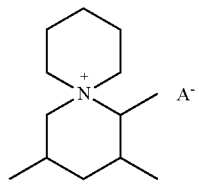
[Chemical Formula 21]
(231) 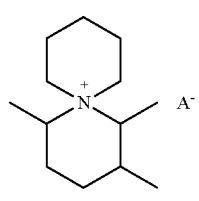
(232) 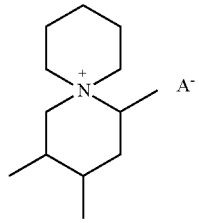
(233) 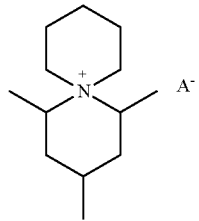
(234) 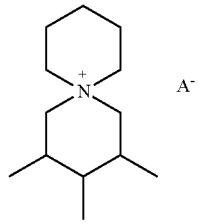
(235) 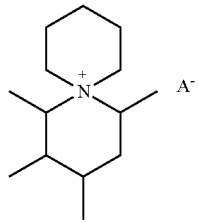

-continued
(236) 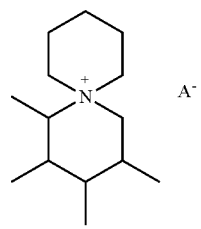
(237) 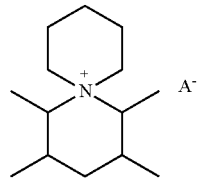
(238) 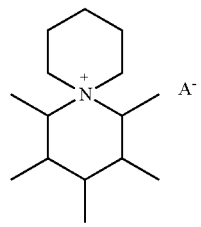
[Chemical Formula 22]
(301) 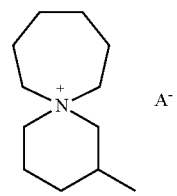
(302) 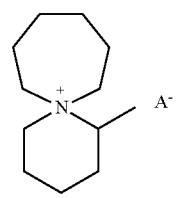
(303) 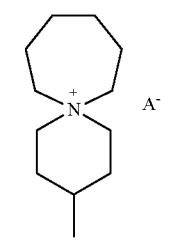
(304) 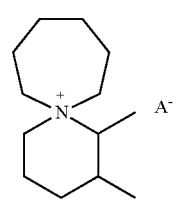
-continued
(305) 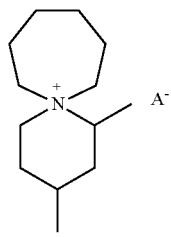
(306) 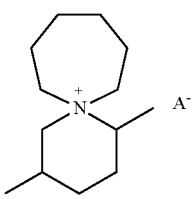
(307) 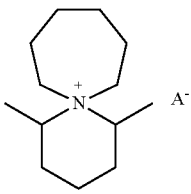
(308) 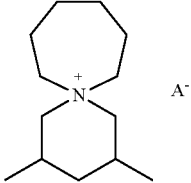
(309) 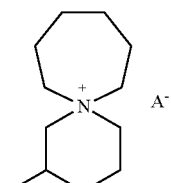
(310) 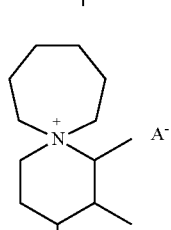
(311) 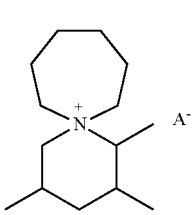

[Chemical Formula 23]
(312) 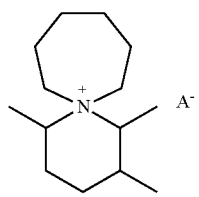
(313) 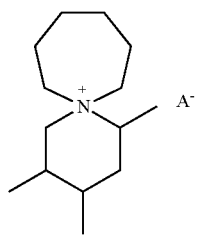
(314) 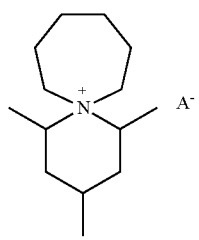
(315) 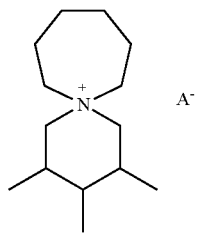
(316) 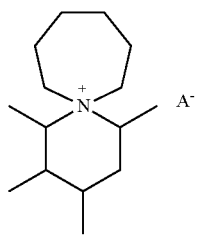
(317) 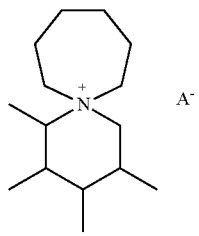
(318) 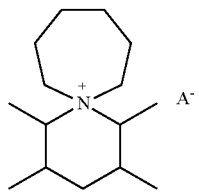
(319) 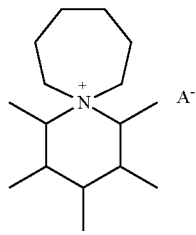
[Chemical Formula 24]
(401) 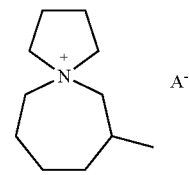
(402) 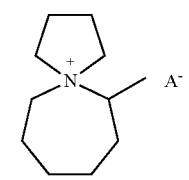
(403) 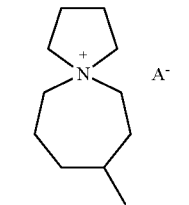
(404) 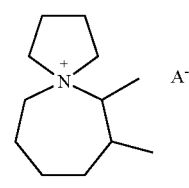
(405) 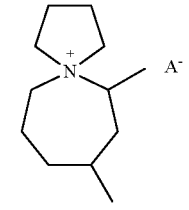
(406) 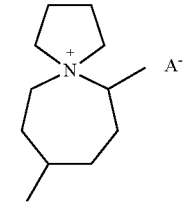

(407) 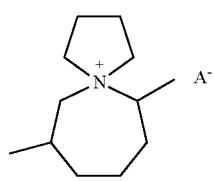
(408) 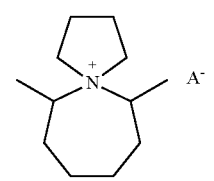
(409) 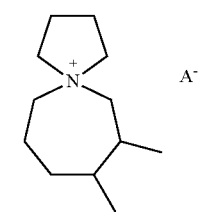
(410) 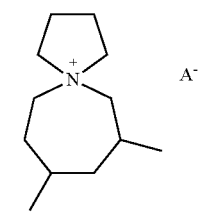
(411) 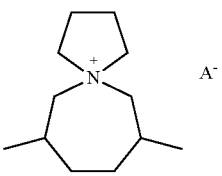
[Chemical Formula 25]
(412) 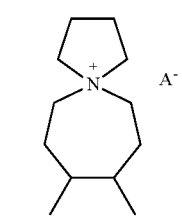
(413) 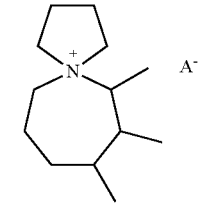
(414) 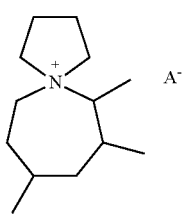
(415) 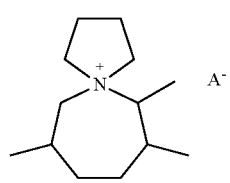
(416) 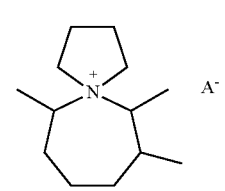
(417) 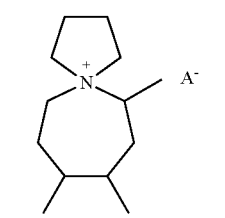
(418) 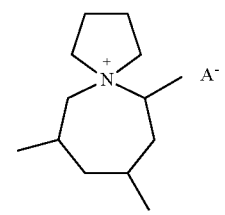
(419) 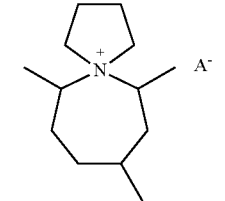
(420) 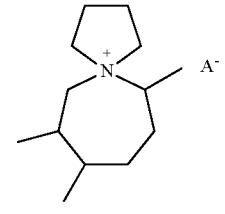

-continued
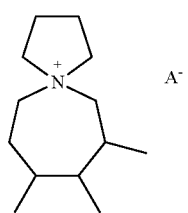 (421)
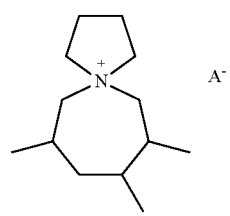 (422)
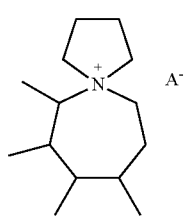 (423)
[Chemical Formula 26]
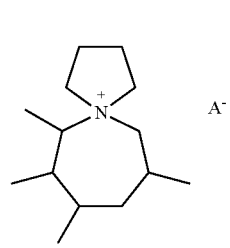 (424)
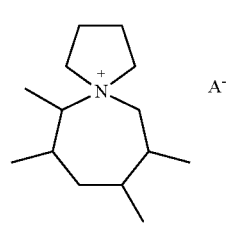 (425)
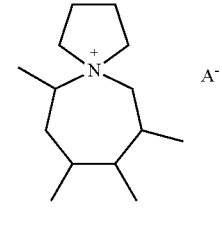 (426)
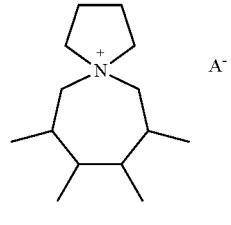 (427)
-continued
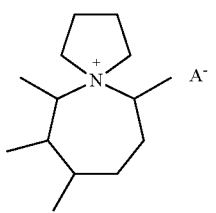 (428)
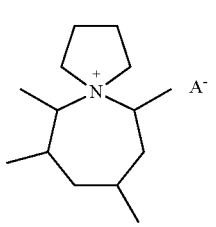 (429)
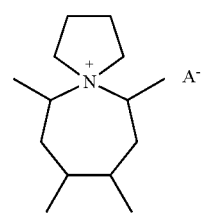 (430)
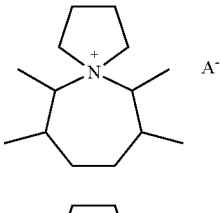 (431)
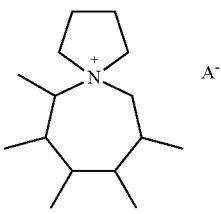 (432)
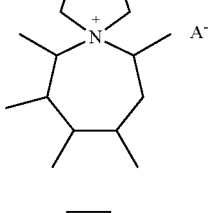 (433)
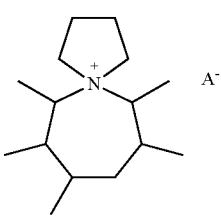 (434)

[Chemical Formula 27]
(501) 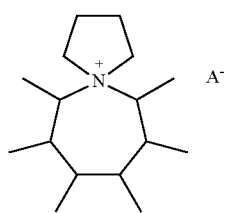
(502) 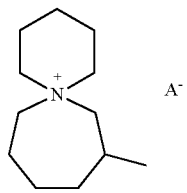
(503) 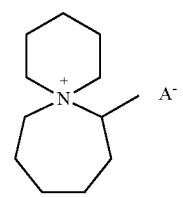
(504) 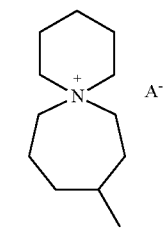
(505) 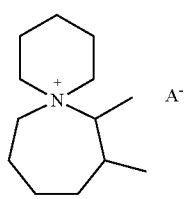
(506) 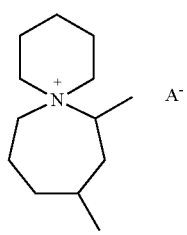
(435) 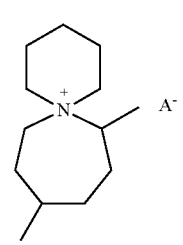
(507) 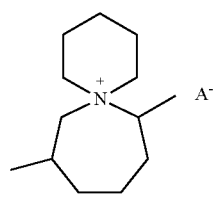
(508) 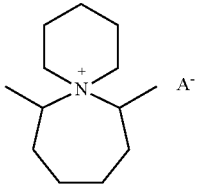
(509) 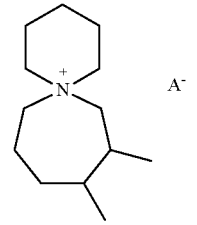
(510) 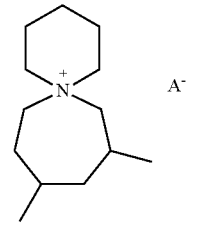
(511) 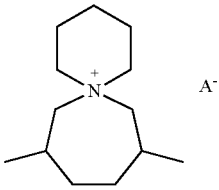
[Chemical Formula 28]
(512) 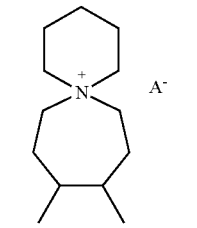
(513) 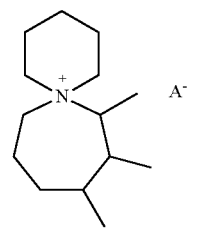

(514) 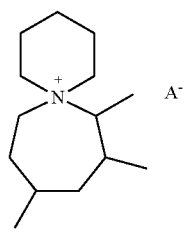 A⁻
(515) 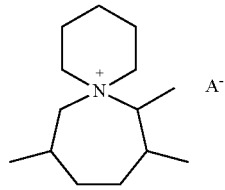 A⁻
(516) 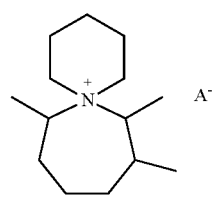 A⁻
(507) 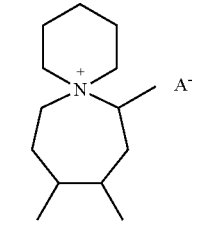 A⁻
(518) 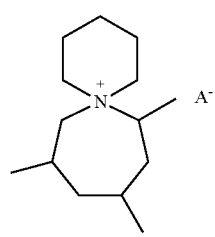 A⁻
(519) 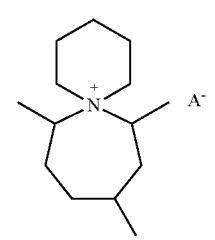 A⁻
(520) 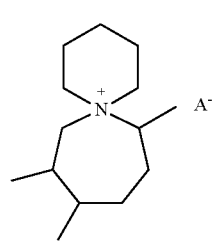 A⁻
(521) 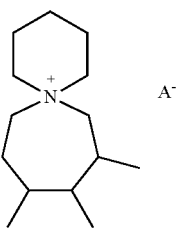 A⁻
(522) 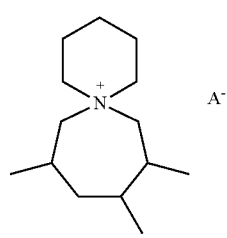 A⁻
(523) 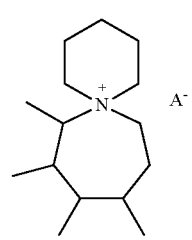 A⁻
[Chemical Formula 29]
(524) 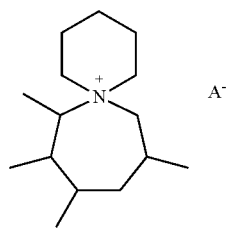 A⁻
(525) 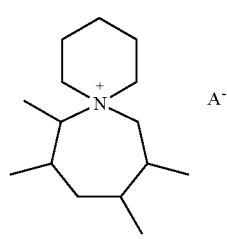 A⁻
(526) 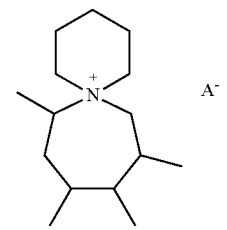 A⁻

(527) 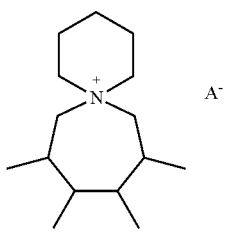
(528) 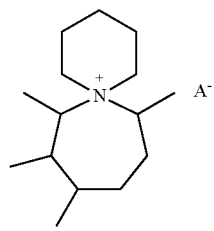
(529) 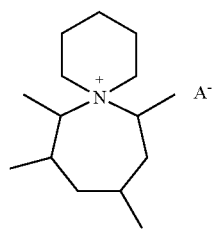
(530) 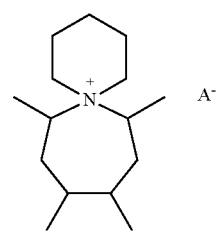
(531) 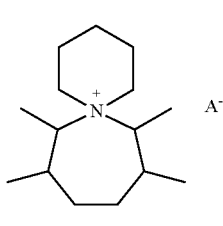
(532) 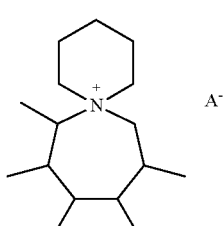
(533) 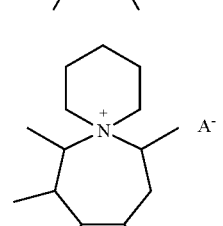
(534) 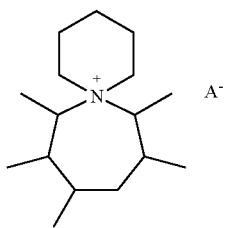
(535) 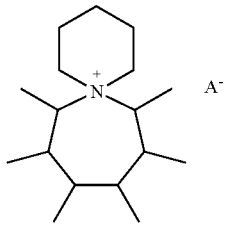
[Chemical Formula 30]
(601) 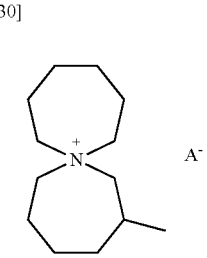
(602) 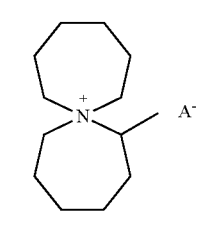
(603) 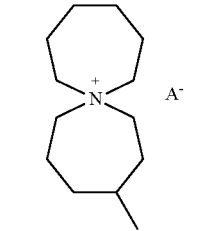
(604) 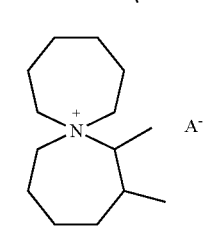
(605) 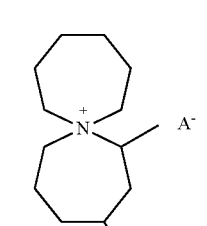

-continued
(606)
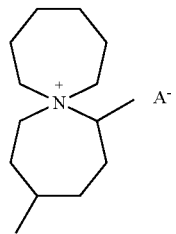
(607)
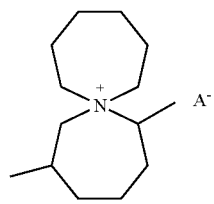
(608)
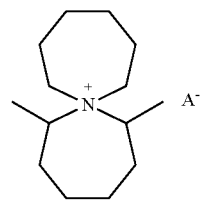
(609)
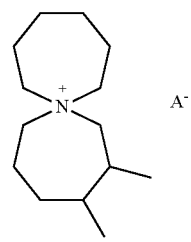
(610)
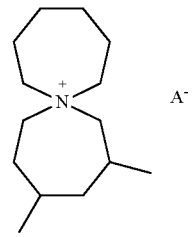
(611)
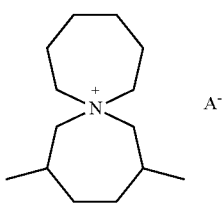
[Chemical Formula 31]
(612)
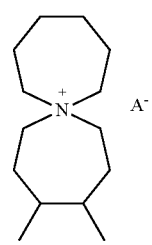
-continued
(613)
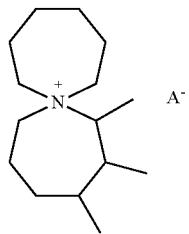
(614)
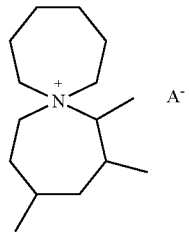
(615)
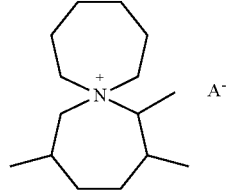
(616)
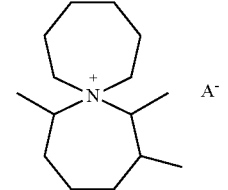
(607)
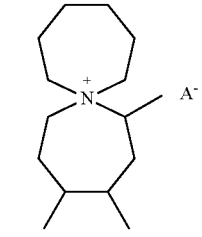
(618)
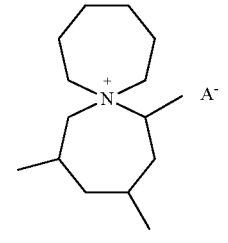
(619)
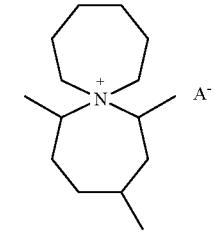

-continued
(620) 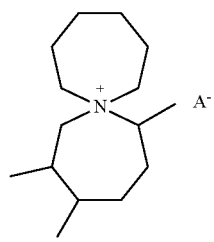 A⁻
(621) 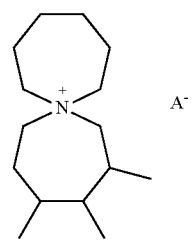 A⁻
(622) 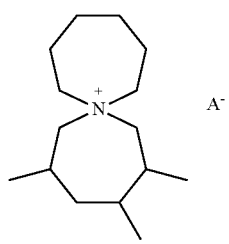 A⁻
(623) 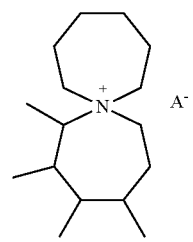 A⁻
[Chemical Formula 32]
(624) 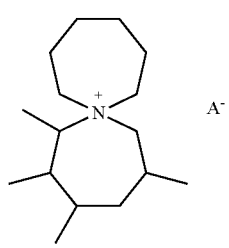 A⁻
(625) 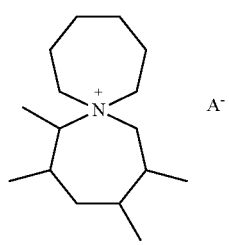 A⁻
-continued
(626) 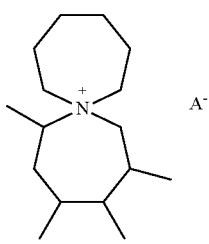 A⁻
(627) 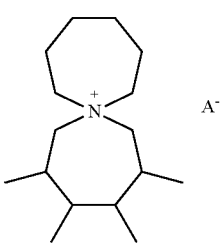 A⁻
(628) 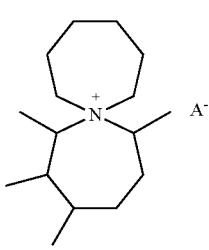 A⁻
(629) 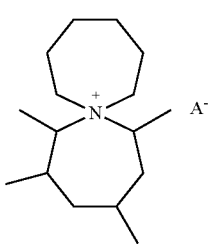 A⁻
(630) 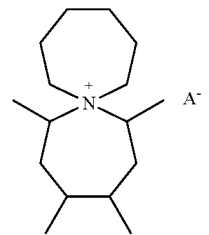 A⁻
(631) 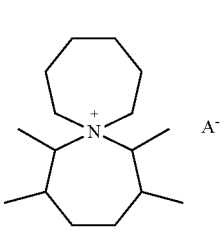 A⁻

-continued (632)
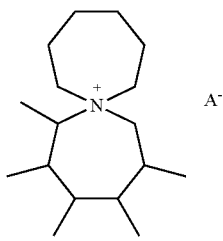

(633)
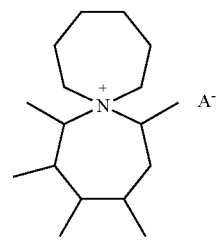

(634)
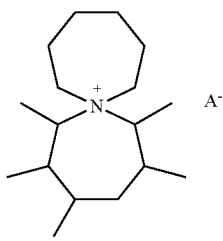

(635)
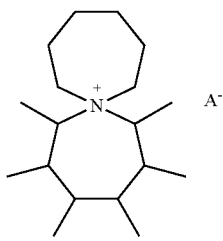

Note that the cyclic quaternary ammonium salt of one embodiment of the present invention can have any of a variety of cation structures depending on the linkage position of a substituent. The cation stereostructures shown above include stereoisomers and cations having equivalent stereostructures (coincident stereostructures). For example, the cyclic quaternary ammonium salt expressed by General Formula (G3) where a methyl group is attached to a carbon atom at the 2-position of a spiro ring and the cyclic quaternary ammonium salt expressed by General Formula (127) where a methyl group is attached to a carbon atom at the 3-position of a spiro ring have enantiomers as stereoisomers; however, when the stereostructures of cations are coincident, the cyclic quaternary ammonium salts can be regarded as being equivalent.

[Chemical Formula 33]

(G3)
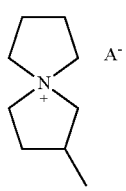

-continued (127)
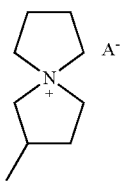

<Synthesis Method of Cyclic Quaternary Ammonium Salt>

A synthesis method of the cyclic quaternary ammonium salt of one embodiment of the present invention will be described. Any of a variety of reactions can be applied to the synthesis method of the cyclic quaternary ammonium salt described in this embodiment. For example, the cyclic quaternary ammonium salt expressed by General Formula (G2) can be synthesized by a synthesis method described below.

A synthesis method of an amine compound expressed by General Formula ($\alpha$-2) which is a precursor of the cyclic quaternary ammonium salt expressed by General Formula (G2) will be described with reference to Synthesis Scheme (S-1). Note that the synthesis method of the amine compound is not limited to the following synthesis method.

[Chemical Formula 34]

(S-1)
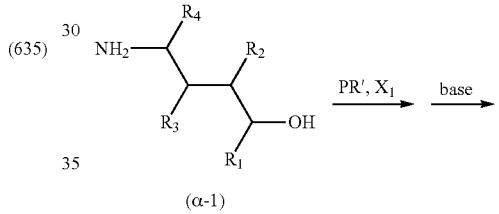

In Synthesis Scheme (S-1), a reaction from General Formula ($\alpha$-1) to General Formula ($\alpha$-2) is a ring closure reaction of amino alcohol which passes through halogenation using a halogen source and trisubstituted phosphine such as trialkylphosphine. Note that PR' represents trisubstituted phosphine and $X_1$ represents a halogen source. As the halogen source, carbon tetrachloride, carbon tetrabromide, iodine, or iodomethane can be used, for example.

[Chemical Formula 35]

(S-2)
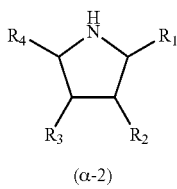

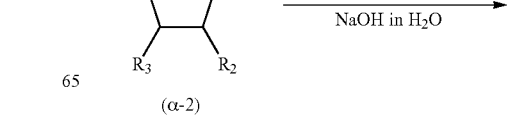

-continued

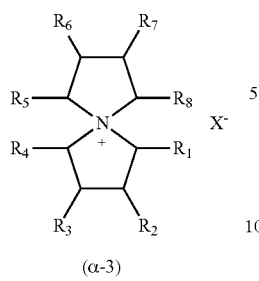

(α-3)

X = Cl or Br or I

In the above scheme (S-2), the synthesis reaction of a spiro compound (specifically, a cyclic quaternary ammonium salt) expressed by General Formula (α-3) from the amine compound synthesized in the above scheme (S-1) and expressed by General Formula (α-2) is a reaction (ring closure reaction) which forms a spiro ring in a basic solution using dihalogenated alkyl (specifically, dihalogenated butane). Note that X represents chlorine, bromine, or iodine; bromine or iodine is preferably used in terms of high reactivity.

[Chemical Formula 36]

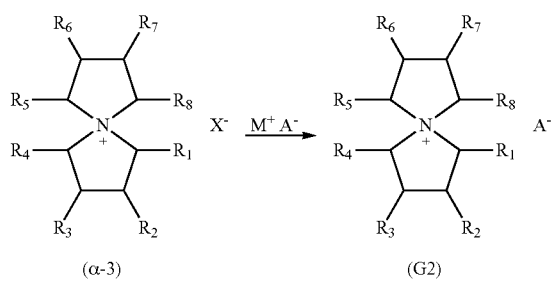

(α-3) (G2)

Through ion exchange (anion exchange) between the spiro compound expressed by General Formula (α-3) and a desired metal salt in the above scheme (S-3), the cyclic quaternary ammonium salt expressed by General Formula (G2) can be obtained. The metal salt contains at least any of the above anions as the anion ($A^-$).

Through the above synthesis pathway, the cyclic quaternary ammonium salt (ionic liquid) expressed by General Formula (G2) can be synthesized.

Further, the cyclic quaternary ammonium salts expressed by General Formulas (G4) to (G8) can also be synthesized according to Synthesis Schemes (S-1) to (S-3) shown above.

The cyclic quaternary ammonium salt expressed by General Formula (G4) can be synthesized in the following manner: a spiro compound is synthesized as in Synthesis Scheme (S-4), using dihalogenated alkyl (specifically, dihalogenated pentane) and the amine compound synthesized through Synthesis Scheme (S-1) and expressed by General Formula (α-2), and ion exchange between the spiro compound and a desired metal salt is performed as in Synthesis Scheme (S-5).

[Chemical Formula 37]

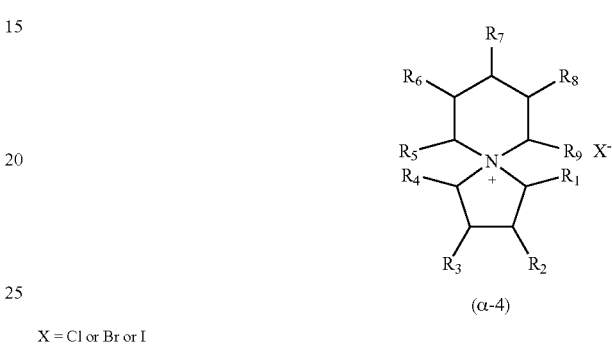

(α-2)

X = Cl or Br or I

[Chemical Formula 38]

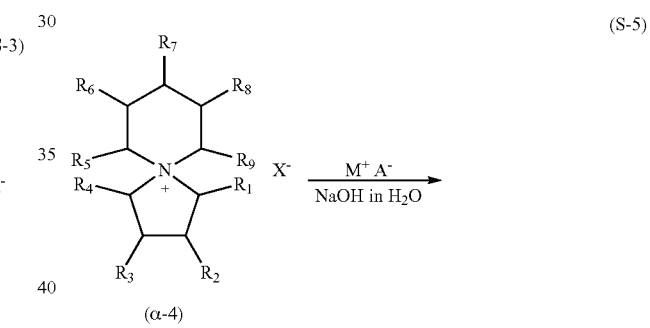

(α-4)

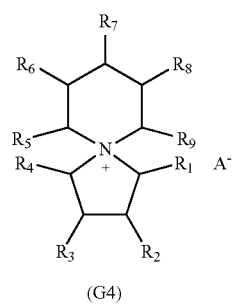

(G4)

The cyclic quaternary ammonium salt expressed by General Formula (G5) can be synthesized in the following manner: a spiro compound is synthesized as in Synthesis Scheme (S-6), using dihalogenated alkyl (specifically, dihalogenated hexane) and the amine compound synthesized through Synthesis Scheme (S-1) and expressed by General Formula (α-2), and ion exchange between the spiro compound and a desired metal salt is performed as in Synthesis Scheme (S-7).

[Chemical Formula 39]

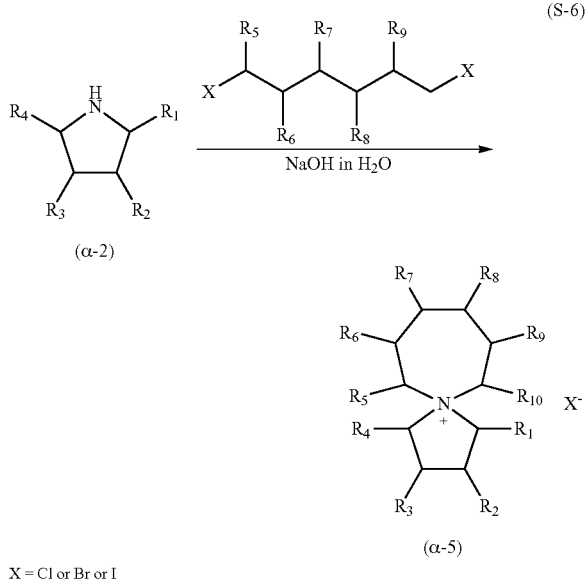

X = Cl or Br or I

[Chemical Formula 40]

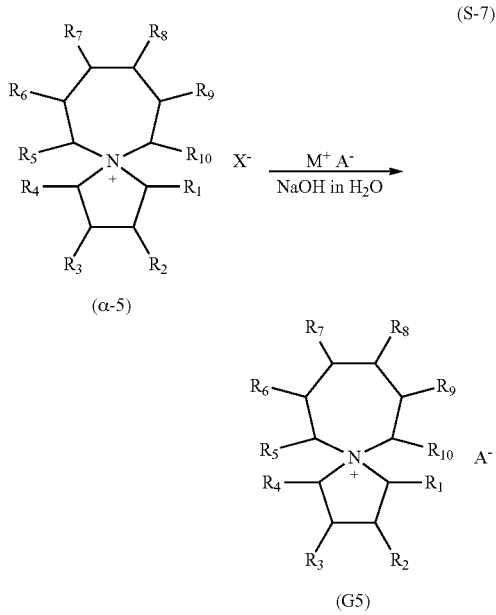

As the cyclic quaternary ammonium salt expressed by General Formula (G6), a six-membered ring amine compound is synthesized through a ring closure reaction of amino alcohol which passes through halogenation using trisubstituted phosphine and a halogen source. The amino alcohol has five carbon atoms in the main chain which are changed from four carbon atoms in the main chain in amino alcohol expressed by General Formula (α-1) in Synthesis Scheme (S-1).

Then, a spiro compound is synthesized as in Synthesis Scheme (S-2) or the like, using the six-membered ring amine compound and dihalogenated alkyl (specifically, dihalogenated pentane), and ion exchange between the synthesized spiro compound and a desired metal salt is performed as in Synthesis Scheme (S-3) or the like.

The cyclic quaternary ammonium salt expressed by General Formula (G7) can be synthesized in the following manner: a spiro compound is synthesized as in Synthesis Scheme (S-2) or the like, using the six-membered ring amine compound and dihalogenated alkyl (specifically, dihalogenated hexane), and ion exchange between the synthesized spiro compound and a desired metal salt is performed as in Synthesis Scheme (S-3) or the like.

The cyclic quaternary ammonium salt expressed by General Formula (G8) can be synthesized as follows. A seven-membered ring amine compound is synthesized through a ring closure reaction of amino alcohol which passes through halogenation using trisubstituted phosphine and a halogen source. The amino alcohol has six carbon atoms in the main chain which are changed from four carbon atoms in amino alcohol expressed by General Formula (α-1) in Synthesis Scheme (S-1).

Then, a spiro compound is synthesized as in Synthesis Scheme (S-2) or the like, using the seven-membered ring amine compound and dihalogenated alkyl (specifically, dihalogenated hexane), and ion exchange between the synthesized spiro compound and a desired metal salt is performed as in Synthesis Scheme (S-3) or the like.

Thus, a cyclic quaternary ammonium salt which has at least one of characteristics such as high ionic conductivity, a small reduction in ionic conductivity at a low temperature, a low freezing point, and a low viscosity can be provided.

This embodiment can be implemented in combination with any of the structures described in the other embodiments and examples as appropriate.

Embodiment 2

In this embodiment, a power storage device containing a cyclic quaternary ammonium salt of one embodiment of the present invention will be described.

The power storage device of one embodiment of the present invention includes at least a positive electrode, a negative electrode, a nonaqueous electrolyte (electrolytic solution). The nonaqueous electrolyte contains the cyclic quaternary ammonium salt described in the above embodiment and a metal salt. As the metal salt, a metal salt which contains carrier ions such as alkali metal ions, alkaline earth metal ions, beryllium ions, or magnesium ions can be used. Examples of the alkali metal ions include lithium ions, sodium ions, and potassium ions. Examples of the alkaline earth metal ions include calcium ions, strontium ions, and barium ions. In this embodiment, a metal salt containing lithium ions (hereinafter referred to as a lithium salt) is used as the metal salt.

With the above structure, a lithium secondary battery or a lithium-ion capacitor can be formed. When the metal salt is not used and the cyclic quaternary ammonium salt of one embodiment of the present invention is used in the above structure, an electric double layer capacitor can be formed.

In this embodiment, a power storage device containing a nonaqueous electrolyte which contains the cyclic quaternary ammonium salt (ionic liquid) described in the above embodiment and a lithium salt and a method for manufacturing the power storage device will be described with reference to FIGS. 1A and 1B. A lithium secondary battery will be described below as an example of the power storage device.

<Coin-Type Power Storage Device>

Figure 1B:
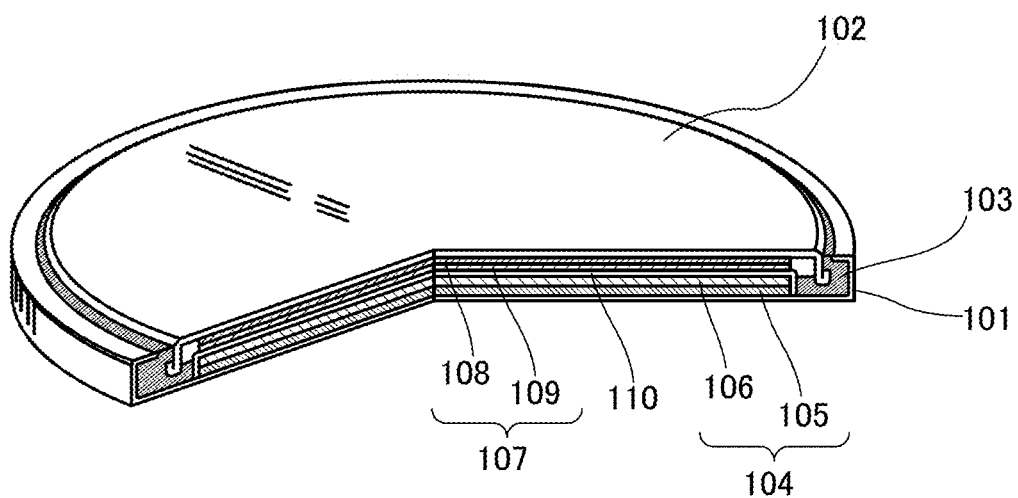

FIG. 1A is a perspective view of a coin-type power storage device 100, and FIG. 1B is a cross-sectional view thereof.

The coin-type power storage device 100 includes a positive electrode can 101 doubling as a positive electrode terminal, a negative electrode can 102 doubling as a negative electrode terminal, and a gasket 103 formed using polypropylene or the like. In the coin-type power storage device 100, the positive electrode can 101 and the negative electrode can 102 are fixed with the gasket 103 interposed therebetween so as to be insulated from each other (see FIG. 1A).

In the coin-type power storage device 100, the positive electrode 104 and the negative electrode 107 are provided so as to face each other with a separator 110 interposed therebetween. In the positive electrode 104, a positive electrode current collector 105 is provided in contact with the positive electrode can 101, and a positive electrode active material layer 106 is provided in contact with the positive electrode current collector 105, and in the negative electrode 107, a negative electrode current collector 108 is provided in contact with the negative electrode can 102, and a negative electrode active material layer 109 is provided in contact with the negative electrode current collector 108 (see FIG. 1B). A nonaqueous electrolyte (not illustrated) is provided between the positive electrode active material layer 106 and the negative electrode active material layer 109.

<Positive Electrode>

The positive electrode current collector 105 can formed using a conductor with a foil-like shape, a plate-like shape (sheet-like shape), a net-like shape, a punching-metal shape, an expanded-metal shape, or the like as appropriate.

For the positive electrode current collector 105, a conductive material such as aluminum (Al), copper (Cu), nickel (Ni), platinum (Pt), zinc (Zn), iron (Fe), or titanium (Ti) can be used. Alternatively, for the positive electrode current collector 105, an alloy material containing a plurality of the above conductive materials. Examples of the alloy material are an Al—Ni alloy, an Al—Cu alloy, and an aluminum alloy to which an element which improves heat resistance, such as silicon, titanium, neodymium, scandium, or molybdenum, is added.

Alternatively, a metal element that forms silicide by reacting with silicon may be used to form the positive electrode current collector 105. Examples of the metal element which reacts with silicon to form a silicide are zirconium, titanium, hafnium, vanadium, niobium, tantalum, chromium, molybdenum, tungsten, cobalt, and nickel.

Furthermore, a conductive layer provided by deposition separately on a substrate and then separated from the substrate can be also used as the positive electrode current collector 105.

The positive electrode active material layer 106 can be formed using, for example, a material containing ions functioning as carriers and a transition metal. For example, a material expressed by a general formula $A_hM_iO_j$ (h>0, i>0, j>0) can be used for the positive electrode active material layer 106. Here, A represents, for example, an alkali metal such as lithium, sodium, or potassium; an alkaline earth metal such as calcium, strontium, or barium; beryllium; or magnesium. M represents a transition metal such as iron, nickel, manganese, or cobalt. The material represented by A and the material represented by M are each one or more selected from the above materials.

Note that examples of the material expressed by a general formula $A_hM_iO_j$ (h>0, i>0, j>0) are $LiFeO_2$, $LiCoO_2$, $LiNiO_2$, and $LiMn_2O_4$.

An example of the material containing ions functioning as carriers and a transition metal is a material expressed by a general formula $A_xM_yPO_z$ (x>0, y>0, z>0). Here, A represents, for example, an alkali metal such as lithium, sodium, or potassium; an alkaline earth metal such as calcium, strontium, or barium; beryllium; or magnesium. M represents, for example, a transition metal such as iron, nickel, manganese, or cobalt. The material represented by A and the material represented by M are each one or more selected from the above elements.

Here, examples of the material expressed by a general formula $A_xM_yPO_z$ (x>0, y>0, z>0) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly satisfies conditions necessary for the positive electrode active material, such as safety, stability, high capacity density, high potential, and the existence of lithium ions which can be extracted in initial oxidation (charging).

Alternatively, for the positive electrode active material layer 106, for example, any of the following can be used: lithium cobalt oxide ($LiCoO_2$); $LiNiO_2$; $LiMnO_2$; $Li_2MnO_3$; a NiCo-containing composite oxide (general formula: $LiNi_xCo_{1-x}O_2$ (0<x<1)) such as $LiNi_{0.8}Co_{0.2}O_2$; a NiMn-containing composite oxide (general formula: $LiNi_xMn_{1-x}O_2$ (0<x<1)) such as $LiNi_{0.5}Mn_{0.5}O_2$; a NiMnCo-containing composite oxide (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$; $Li(Ni_{0.8}Co_{0.15}Al_{0.05})O_2$; and $Li_2MnO_3$—$LiMO_2$ (M=Co, Ni, or Mn). Alternatively, a solid solution of $xLi_2MnO_3$ and $(1-x)LiNi_{1/3}Mn_{1/3}Co_{1/3}O_2$ can be used.

$LiCoO_2$ is particularly preferable because of its advantages such as high capacity and stability in the air higher than that of $LiNiO_2$ and thermal stability higher than that of $LiNiO_2$.

Alternatively, for the positive electrode active material layer 106, $LiMn_2O_4$, $Li_{1+x}Mn_{2-x}O_4$, $Li(MnAl)_2O_4$, or $LiMm_{1.5}Ni_{0.5}O_4$ can be used.

It is preferable to add a small amount of lithium nickel oxide ($LiNiO_2$ or $LiNi_{1-x}MO_2$ (M=Co, Al, or the like)) to lithium-containing composite oxide with a spinel crystal structure which contains manganese such as $LiMn_2O_4$ because advantages such as minimization of the elution of manganese and the decomposition of an electrolytic solution can be obtained.

Alternatively, a material expressed by a general formula $Li_{(2-j)}MSiO_4$ (M is one or more of Fe(II), Mn(II), Co(II), and Ni(II), 0≤j≤2) can be used for the positive electrode active material layer 106. Examples of the material expressed by the general formula $Li_{(2-j)}MSiO_4$ are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material. Examples of the nasicon compound are $Fe_2(MnO_4)_3$, $Fe_2(SO_4)_3$, and $Li_3Fe_2(PO_4)_3$. Alternatively, a compound expressed by $Li_2MPO_4F$, $Li_2MP_2O_7$, or $Li_5MO_4$ (general formula) (M=Fe or Mn), a perovskite fluoride such as $NaF_3$ or $FeF_3$, a metal chalcogenide (a sulfide, a selenide, or a telluride) such as $TiS_2$ or $MoS_2$, a lithium-containing composite oxide with an inverse spinel crystal structure such as LiMVO$_4$, a vanadium oxide (V$_2$O$_5$, V$_6$O$_{13}$, LiV$_3$O$_8$, or the like), a manganese oxide, an organic sulfur, or the like can be used as the positive electrode active material.

Alternatively, for the positive electrode active material layer 106, V$_2$O$_5$, Cr$_2$O$_5$, MnO$_2$, or the like can be used.

Note that strictly speaking, "active material" refers only to a material that relates to insertion and extraction of ions functioning as carriers. In this specification, however, in the case of using a coating method to form the positive electrode active material layer 106, for the sake of convenience, the positive electrode active material layer 106 collectively refers to a material of the positive electrode active material layer 106, that is, a substance which is actually a "positive electrode active material," a conductive additive, a binder, etc.

The positive electrode active material layer 106 is not necessarily formed on and in direct contact with the positive electrode current collector 105. Any of the following functional layers may be formed using a conductive material such as a metal between the positive electrode current collector 105 and the positive electrode active material layer 106: an adhesion layer for increasing the adhesion between the positive electrode current collector 105 and the positive electrode active material layer 106; a planarization layer for reducing the roughness of the surface of the positive electrode current collector 105; a heat radiation layer; a stress relaxation layer for reducing the stress on the positive electrode current collector 105 or the positive electrode active material layer 106; and the like.

The functional layer formed using a conductive material such as a metal may be formed in such a manner that a paste in which a conductive additive (e.g., acetylene black (AB)), a binder (e.g., poly(vinylidene fluoride) (PVDF)), or the like are mixed with any of the above materials for the positive electrode active material layer 106 is applied to the positive electrode current collector 105, or may be formed by a sputtering method.

Note that any electron-conductive material can be used as a conductive additive as long as it is not chemically changed in the power storage device. For example, a carbon-based material such as graphite or carbon fiber; a metal material such as copper, nickel, aluminum, or silver; or powder, fiber, or the like of a mixture of any of them can be used.

As the binder, polysaccharides such as starch, carboxymethyl cellulose, hydroxypropyl cellulose, regenerated cellulose, and diacetyl cellulose; vinyl polymers such as polyvinyl chloride, polyethylene, polypropylene, poly(vinyl alcohol), polyvinyl pyrrolidone, polytetrafluoroethylene, poly(vinylidene fluoride), ethylene-propylene-diene monomer (EPDM) rubber, sulfonated EPDM rubber, styrene-butadiene rubber, butadiene rubber, and fluorine rubber; polyether such as polyethylene oxide; and the like can be given.

Alternatively, for the positive electrode active material layer 106, a paste in which, instead of a conductive additive and a binder, graphene or multilayer graphene is mixed with any of the above materials for the positive electrode active material layer 106 may be used. Note that graphene in this specification includes single-layer graphene and multilayer graphene including two to hundred layers. Single-layer graphene refers to a one-atom-thick sheet of carbon molecules. Graphene oxide refers to a compound formed by oxidation of such graphene. When graphene oxide is reduced to form graphene, oxygen contained in the graphene oxide is not entirely released and part of the oxygen remains in the graphene. When the graphene contains oxygen, the proportion of the oxygen is higher than or equal to 2 at. % and lower than or equal to 20 at. %, preferably higher than or equal to 3 at. % and lower than or equal to 15 at. %. Note that graphene or multilayer graphene may contain an alkali metal such as potassium.

The case where the graphene or multilayer graphene is used for the positive electrode active material layer 106 will be described with reference to the drawings. FIG. 2A is a cross-sectional view of the positive electrode active material layer 106. FIG. 2B is a plan view of the positive electrode active material layer 106.

The positive electrode active material layer 106 includes positive electrode active materials 153 which are particles capable of occluding and releasing carrier ions, and graphenes 154 which cover a plurality of the positive electrode active materials 153 and at least partly surround the plurality of the positive electrode active materials 153. The different graphenes 154 cover surfaces of the plurality of the positive electrode active materials 153. The positive electrode active materials 153 may partly be exposed (see FIG. 2B).

The particle size of the positive electrode active material 153 is preferably greater than or equal to 20 nm and less than or equal to 100 nm. Note that the particle size of the positive electrode active material 153 is preferably smaller because electrons transfer in the positive electrode active materials 153.

Sufficient characteristics can be obtained even when surfaces of the positive electrode active materials 153 are not covered with a graphite layer; however, it is preferable to use both the graphene and the positive electrode active material covered with a graphite layer because carriers hop between the positive electrode active materials and accordingly current flows.

FIG. 2C is a cross-sectional view of a part of the positive electrode active material layer 106 in FIG. 2B. The positive electrode active material layer 106 includes the positive electrode active materials 153 and the graphenes 154 which cover a plurality of the positive electrode active materials 153. The graphenes 154 are observed to have linear shapes in the cross-sectional view. A plurality of the positive electrode active materials are at least partly surrounded with one graphene or a plurality of the graphenes or sandwiched between a plurality of the graphenes. Note that the graphene has a bag-like shape, and a plurality of the positive electrode active materials are surrounded with the bag-like portion in some cases. In addition, part of the positive electrode active materials is not covered with the graphenes and exposed in some cases.

The desired thickness of the positive electrode active material layer 106 is determined to be greater than or equal to 20 μm and less than or equal to 100 μm. It is preferable to adjust the thickness of the positive electrode active material layer 106 as appropriate so that a crack and flaking are not caused.

Note that the positive electrode active material layer 106 may include acetylene black particles having a volume 0.1 times to 10 times as large as that of the graphene, carbon particles having a one-dimensional expansion such as carbon nanofibers, or other known conductive additives.

As an example of the positive electrode active material 153, a material whose volume is expanded by occlusion of ions serving as carriers is given. When such a material is used, the positive electrode active material layer gets vulnerable and is partly collapsed by charge and discharge, resulting in lower reliability of a power storage device. However, the graphene covering the periphery of the positive electrode active materials can prevent dispersion of the positive electrode active materials and the collapse of the positive electrode active material layer, even when the volume of the positive electrode active materials is increased and decreased due to charge and discharge. That is to say, the graphene has a function of maintaining the bond between the positive electrode active materials even when the volume of the positive electrode active materials is increased and decreased by charge and discharge.

The graphene 154 is in contact with a plurality of the positive electrode active materials 153 and serves also as a conductive additive. Further, the graphene 154 has a function of holding the positive electrode active materials 153 capable of occluding and releasing carrier ions. Thus, the proportion of a conductive additive and a binder in the positive electrode 104 can be decreased. In other words, the proportion of the positive electrode active materials per unit weight of the positive electrode can be increased, which allows an increase in capacity of a power storage device.

Next, a method for forming the positive electrode 104 will be described.

Slurry containing particulate positive electrode active materials and graphene oxide is formed. Then, the slurry is applied to one of surfaces of the positive electrode current collector 105 (see FIG. 2A) or both the surfaces of the positive electrode current collector 105 (see FIG. 2D). After that, heating is performed in a reducing atmosphere for reduction treatment so that the positive electrode active materials are baked and part of oxygen is released from graphene oxide to form graphene. Note that oxygen in the graphene oxide is not entirely released and partly remains in the graphene. Through the above steps, the positive electrode active material layer 106 can be formed over the positive electrode current collector 105 or the positive electrode active material layers 106 can be provided so that the positive electrode current collector 105 is sandwiched therebetween. Consequently, the positive electrode active material layer 106 has higher conductivity.

Graphene oxide contains oxygen and thus is negatively charged in a polar liquid. As a result of being negatively charged, graphene oxide is dispersed in the polar liquid. Accordingly, the positive electrode active materials contained in the slurry are not easily aggregated, so that the size of the particle of the positive electrode active material can be prevented from increasing. Thus, the transfer of electrons in the positive electrode active materials is facilitated, resulting in an increase in conductivity of the positive electrode active material layer.

<Negative Electrode>

The negative electrode current collector 108 is formed using a conductive material which is not alloyed with carrier ions such as lithium ions. For example, stainless steel, iron, aluminum, copper, nickel, or titanium can be used. Alternatively, an alloy material such as an aluminum-nickel alloy or an aluminum-copper alloy may be used. The negative electrode current collector 108 can have a foil shape, a plate shape (sheet shape), a net shape, a punching-metal shape, an expanded-metal shape, or the like as appropriate. The negative electrode current collector 108 preferably has a thickness in the range of 10 μm to 30 μm.

There is no particular limitation on a material used for the negative electrode active material layer 109 as long as the material can dissolve and precipitate carrier ions and can be doped and dedoped with carrier ions (carrier ions can be inserted and extracted into/from the material). For example, a lithium metal, a carbon-based material, silicon, a silicon alloy, tin, or lithium titanium oxide can be used. As a carbon-based material into/from which lithium ions can be inserted and extracted, an amorphous or crystalline carbon material such as a graphite powder or a graphite fiber can be used.

As the negative electrode active material, a material with which lithium can be dissolved and precipitated or a material into/from which lithium ions can be inserted and extracted can be used; for example, a lithium metal, a carbon-based material, an alloy-based material, or the like can be used.

(b-1: Lithium Metal)

The lithium metal is preferable because of its low redox potential (3.045 V lower than that of a standard hydrogen electrode) and high specific capacity per unit weight and per unit volume (3860 mAh/g and 2062 mAh/cm$^3$).

(b-2: Carbon-Based Material)

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

(b-3: Alloy-Based Material)

As a negative electrode active material, an alloy-based material which enables charge-discharge reaction by alloying and dealloying reaction with a lithium metal can be used. For example, a material containing at least one of Al, Si, Ge, Sn, Pb, Sb, Bi, Ag, Zn, Cd, In, Ga, and the like can be given. Such elements have higher capacity than carbon. In particular, silicon has a significantly high theoretical capacity of 4200 mAh/g. For this reason, silicon is preferably used as the negative electrode active material. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

(b-4: Others)

Alternatively, as the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting lithium ions in advance.

Alternatively, a material which causes a conversion reaction can be used as the negative electrode active material; for example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

Figure 3A:
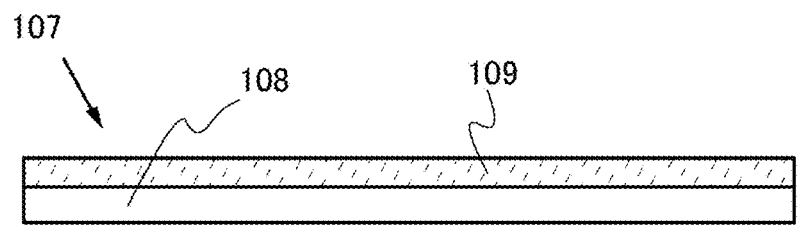
FIGS. 3A to 3E illustrate negative electrodes of coin-type power storage devices.
Figure 3B:
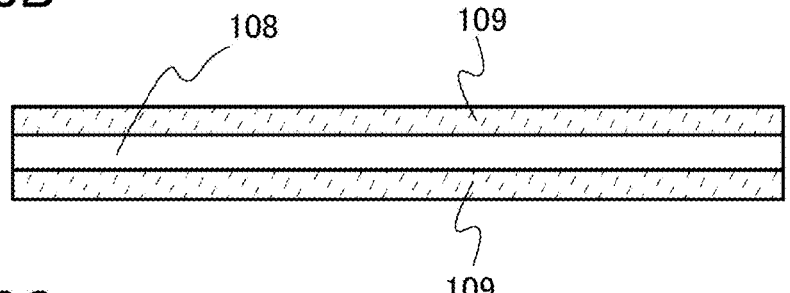

The negative electrode active material layer 109 can be provided over the negative electrode current collector 108, or the negative electrode active material layers 109 can be provided so that the negative electrode current collector 108 is sandwiched therebetween (see FIGS. 3A and 3B).

The negative electrode active material layer 109 may be predoped with ions of an element which are carrier ions in such a manner that a layer containing the ions of the element which serve as carrier ions is formed on a surface of the negative electrode active material layer 109 by a sputtering method. Alternatively, foil made from a material containing carrier ions is provided on the surface of the negative electrode active material layer 109, whereby the negative electrode active material layer 109 can be predoped with carrier ions (lithium ions).

In this embodiment, the negative electrode active material layer 109 is formed in such a manner that a conductive additive and a binder are added to the negative electrode active material and the materials are mixed and baked.

Figure 3C:
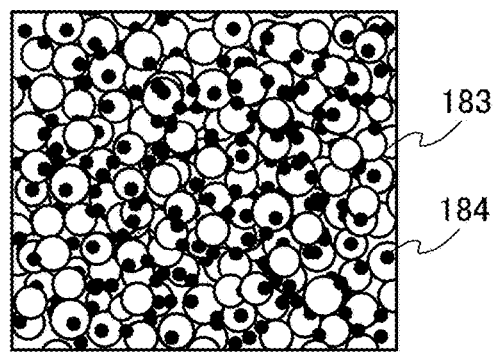

Here, the negative electrode active material layer 109 will be described with reference to the drawings. FIG. 3C is a cross-sectional view of part of the negative electrode active material layer 109. The negative electrode active material layer 109 includes particulate negative electrode active materials 183 formed using any of the above materials, a conductive additive 184, and a binder (not illustrated).

The conductive additive 184 improves conductivity between the negative electrode active materials 183 and between the negative electrode active material 183 and the negative electrode current collector 108 and thus can be added to the negative electrode active material layer 109. The conductive additive 184 does not necessarily have to be used. As the conductive additive 184, a material which has a large specific surface area is preferably used; for example, acetylene black (AB) can be used. Alternatively, a carbon material such as a carbon nanotube, fullerene, or graphene (multilayer graphene) can be used. Note that an example where graphene is used will be described below.

As the binder, any material can be used as long as it can bond the negative electrode active material, the conductive additive, and the current collector together. For example, any of the following can be used as the binder: resin materials such as poly(vinylidene fluoride) (PVDF), a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, polyamide, and polyimide.

The negative electrode 107 is formed in the following manner. First, the particulate negative electrode active materials formed using any of the above materials are mixed into a solvent such as NMP (N-methylpyrrolidone) in which a vinylidene fluoride-based polymer such as poly(vinylidene fluoride) or the like is dissolved to form slurry.

Then, the slurry is applied to one of or both the surfaces of the negative electrode current collector 108, and dried. In the case where both the surfaces of the negative electrode current collector 108 are subjected to the coating step, the negative electrode active material layers 109 are formed so that the negative electrode current collector 108 is sandwiched therebetween at the same time or one by one. After that, rolling with a roller press machine is performed, whereby the negative electrode 107 is formed.

Next, an example where graphene is used as a conductive additive added to the negative electrode active material layer 109 will be described with reference to FIGS. 3D and 3E.

Figure 3D:
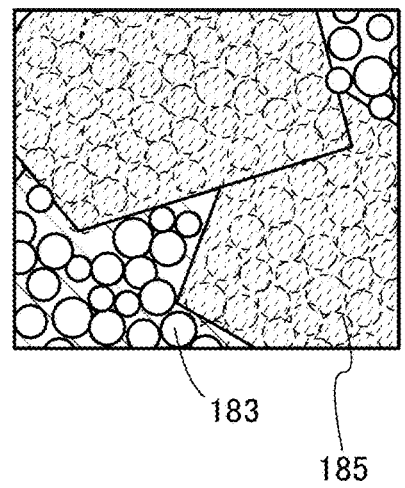

FIG. 3D is a plan view of a part of the negative electrode active material layer 109 formed using graphene. The negative electrode active material layer 109 includes particulate negative electrode active materials 183 and graphenes 185 which cover a plurality of the negative electrode active materials 183 and at least partly surround the plurality of the negative electrode active materials 183. Although a binder not illustrated may be added, when graphenes 185 is included so as to be bonded to each other to fully function as a binder, a binder does not necessarily have to be added. The different graphenes 185 cover surfaces of the plurality of the negative electrode active materials 183 in the negative electrode active material layer 109 in the plan view. The particulate negative electrode active materials 183 may partly be exposed.

Figure 3E:
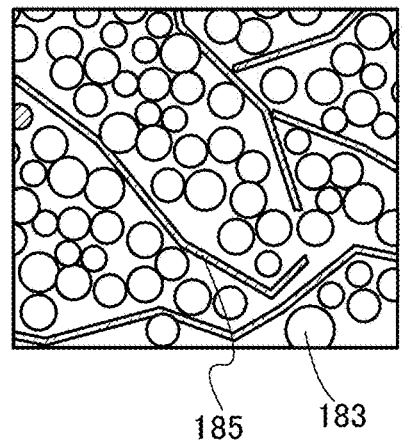

FIG. 3E is a cross-sectional view of the part of the negative electrode active material layer 109 in FIG. 3D. FIG. 3E illustrates the particulate negative electrode active materials 183 and the graphenes 185 covering a plurality of the particulate negative electrode active materials 183 in the negative electrode active material layer 109 in the plan view. The graphenes 185 are observed to have linear shapes in the cross-sectional view. One graphene or a plurality of the graphenes overlap with a plurality of the negative electrode active materials 183, or the plurality of the negative electrode active materials 183 are at least partly surrounded with one graphene or a plurality of the graphenes. Note that the graphene 185 has a bag-like shape, and a plurality of the negative electrode active materials are at least partly surrounded with the bag-like portion in some cases. The graphene 185 partly has openings where the negative electrode active materials 183 are exposed in some cases.

The desired thickness of the negative electrode active material layer 109 is determined in the range of 20 µm to 150 µm.

As an example of the negative electrode active material 183, a material whose volume is expanded by occlusion of carrier ions is given. When such a material is used, the negative electrode active material layer gets vulnerable and is partly collapsed by charge and discharge, resulting in lower reliability (e.g., inferior cycle characteristics) of a power storage device.

A binder does not have to be used in forming the negative electrode active material layer 109. Therefore, the proportion of the negative electrode active materials per unit weight of the electrode can be increased, leading to an increase in capacity of a power storage device.

The graphene 185 has conductivity and is in contact with a plurality of the negative electrode active materials 183; thus, it also serves as a conductive additive. Thus, the proportion of a conductive additive and a binder in the negative electrode 107 can be decreased. In other words, the proportion of the negative electrode active materials per unit weight of the electrode can be increased, which allows an increase in capacity of a power storage device.

The graphene 185 efficiently forms a sufficient electron conductive path in the negative electrode active material layer 109, so that the conductivity of the whole negative electrode 107 can be increased.

Note that the graphene 185 also functions as a negative electrode active material capable of occluding and releasing carrier ions, leading to an increase in capacity of a power storage device.

Next, a formation method of the negative electrode active material layer 109 in FIGS. 3D and 3E will be described.

First, the particulate negative electrode active materials 183 formed using any of the above materials and a dispersion liquid containing graphene oxide are mixed to form the slurry.

Then, the slurry is applied to the negative electrode current collector 108. Next, drying is performed in a vacuum for a certain period of time to remove a solvent from the slurry applied to the negative electrode current collector 108. After that, rolling with a roller press machine is performed.

Then, the graphene oxide is electrochemically reduced with electric energy or thermally reduced by heat treatment to form the graphene 185. Particularly when electrochemical reduction treatment is performed, the proportion of π bonds of graphene formed by the electrochemical reduction treatment is higher than that of graphene formed by heat treatment; therefore, the graphene 185 can have high conductivity. Through the above process, the negative electrode active material layer 109 including graphene as a conductive additive can be formed over one of surfaces of the negative electrode current collector 108 or the negative electrode active material layers 109 can be formed so that the negative electrode current collector 108 is sandwiched therebetween, whereby the negative electrode 107 can be formed.

<Nonaqueous Electrolyte>

A nonaqueous electrolyte in the power storage device 100 contains the cyclic quaternary ammonium salt (ionic liquid) described in the above embodiment, a metal salt containing carrier ions such as alkali metal ions, alkaline earth metal ions, beryllium ions, or magnesium ions. The metal salt is dissolved in the ionic liquid at a desired concentration.

In the case of the cyclic quaternary ammonium salts of embodiments of the present invention, as the number of substituents increases or the number of carbon atoms in the substituent increases, the viscosity of the cyclic quaternary ammonium salts increases. Thus, it is preferable to select a cyclic quaternary ammonium salt in accordance with a desired viscosity.

To reduce the viscosity of the nonaqueous electrolyte of one embodiment of the present invention, a mixed solvent in which an organic solvent such as a cyclic ester, an acyclic ester, a cyclic ether, or an acyclic ether is mixed with the cyclic quaternary ammonium salt of one embodiment of the present invention may be used as a nonaqueous solvent. Examples of the organic solvent are ethylene carbonate, diethyl carbonate, and propylene carbonate. Alternatively, a fluorinated cyclic ester, a fluorinated acyclic ester, a fluorinated cyclic ether, or a fluorinated acyclic ether may be used as the organic solvent.

Note that in this specification, the fluorinated cyclic ester refers to a cyclic ester in which fluorine is substituted for hydrogen, as in a cyclic ester having alkyl fluoride. Thus, in the fluorinated acyclic ester, the fluorinated cyclic ether, or the fluorinated acyclic ether, fluorine is substituted for hydrogen.

The use of the mixed solvent as a nonaqueous solvent allows an increase in the ionic conductivity of the nonaqueous electrolyte, and thus a power storage device having favorable charge and discharge rate characteristics can be manufactured. However, too much organic solvent mixed into the mixed solvent to reduce the viscosity makes the nonflammable nonaqueous solvent containing an ionic liquid flammable; therefore, it is preferable to mix the organic solvent so that the mixed solvent does not have flammability.

The nonaqueous electrolyte of one embodiment of the present invention may contain a plurality of the cyclic quaternary ammonium salts with different structures of embodiments of the present invention for a nonaqueous solvent. Alternatively, as the nonaqueous solvent, a mixed solvent in which one or more of the cyclic quaternary ammonium salts of embodiments of the present invention is mixed with one or more kinds of ionic liquids different from the cyclic quaternary ammonium salt may be used. Alternatively, a mixed solvent in which the nonaqueous solvent containing the ionic liquids is mixed with the above organic solvent may be used as the nonaqueous solvent of one embodiment of the present invention.

A gelled high-molecular material may be added to the nonaqueous electrolyte of one embodiment of the present invention so that leakage of the nonaqueous electrolyte can be prevented, leading to manufacture of a safer power storage device. Further, the power storage device can be thinner and more lightweight. Typical examples of the high-molecular material include a silicone gel, an acrylic gel, an acrylonitrile gel, polyethylene oxide, polypropylene oxide, a fluorine-based polymer, and the like.

In this embodiment, the power storage device 100 is a lithium secondary battery. Examples of a lithium salt used as the metal salt in the nonaqueous electrolyte include lithium chloride (LiCl), lithium fluoride (LiF), lithium perchlorate ($LiClO_4$), lithium tetrafluoroborate ($LiBF_4$), $LiAsF_6$, $LiPF_6$, and $Li(CF_3SO_2)_2N$. Note that the metal salt contains a carrier ion and corresponds to the positive electrode active material layer 106. For example, when the positive electrode active material layer 106 is formed using a material containing sodium, the metal salt preferably contains sodium.

The cyclic quaternary ammonium salt of one embodiment of the present invention has a low freezing point (melting point). When a metal salt is dissolved in the nonaqueous electrolyte of one embodiment of the present invention, the freezing point (melting point) of the nonaqueous electrolyte is lowered; accordingly, the nonaqueous electrolyte of one embodiment of the present invention in which a metal salt is dissolved has a lower freezing point (melting point) than the cyclic quaternary ammonium salt. Thus, the use of the nonaqueous electrolyte makes it possible to form a power storage device which can operate at a wide range of temperatures including low temperatures.

In a lithium secondary battery, the reduction potential of a nonaqueous electrolyte (specifically, a solvent) is preferably lower than a potential at which lithium ions react with a negative electrode active material layer. For example, the reduction potential of a nonaqueous electrolyte (specifically, a solvent) is preferably substantially equal to or lower than or equal to the redox potential of lithium. Specifically, the reduction potential of a cyclic quaternary ammonium salt is preferably a potential 0.5 V or lower plus or minus the redox potential of lithium, particularly preferably a potential 0.2 V or lower plus or minus the redox potential of lithium. Such a nonaqueous electrolyte is unlikely to be subjected to reduction due to charge and discharge of a full cell lithium secondary battery; thus, the use of the nonaqueous electrolyte enables an improvement in cycle characteristics.

The reduction potential of the cyclic quaternary ammonium salt of one embodiment of the present invention is substantially equal to or lower than or equal to the redox potential of lithium; accordingly, the use of the cyclic quaternary ammonium salt of one embodiment of the present invention for a nonaqueous solvent in a nonaqueous electrolyte allows manufacture of a lithium secondary battery having favorable cycle characteristics.

<Separator>

As the separator 110, paper; nonwoven fabric; glass fiber; ceramics; synthetic fiber containing nylon (polyamide), vinylon (polyvinyl alcohol based fiber), polyester, acrylic, polyolefin, or polyurethane; or the like may be used. However, it is necessary to select a material which does not dissolve in the nonaqueous electrolyte described above.

More specifically, examples of the material for the separator 110 include fluorine-based polymers, polyethers such as a polyethylene oxide and a polypropylene oxide, polyolefins such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane based polymers, and derivatives thereof, cellulose, paper, nonwoven fabric, and glass fiber. One of the above materials or a combination of two or more of the above materials can be used for the separator 110.

For the positive electrode can 101 and the negative electrode can 102, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 101 and the negative electrode can 102 are electrically connected to the positive electrode 104 and the negative electrode 107, respectively.

The negative electrode 107, the positive electrode 104, and the separator 110 are immersed in the electrolytic solution. Then, as illustrated in FIG. 1B, the positive electrode 104, the separator 110, the negative electrode 107, and the negative electrode can 102 are stacked in this order with the positive electrode can 101 positioned at the bottom, and the positive electrode can 101 and the negative electrode can 102 are subjected to pressure bonding with the gasket 103 interposed therebetween. In such a manner, the coin-type power storage device 100 can be manufactured.

<Laminated Power Storage Device>

Figure 4:
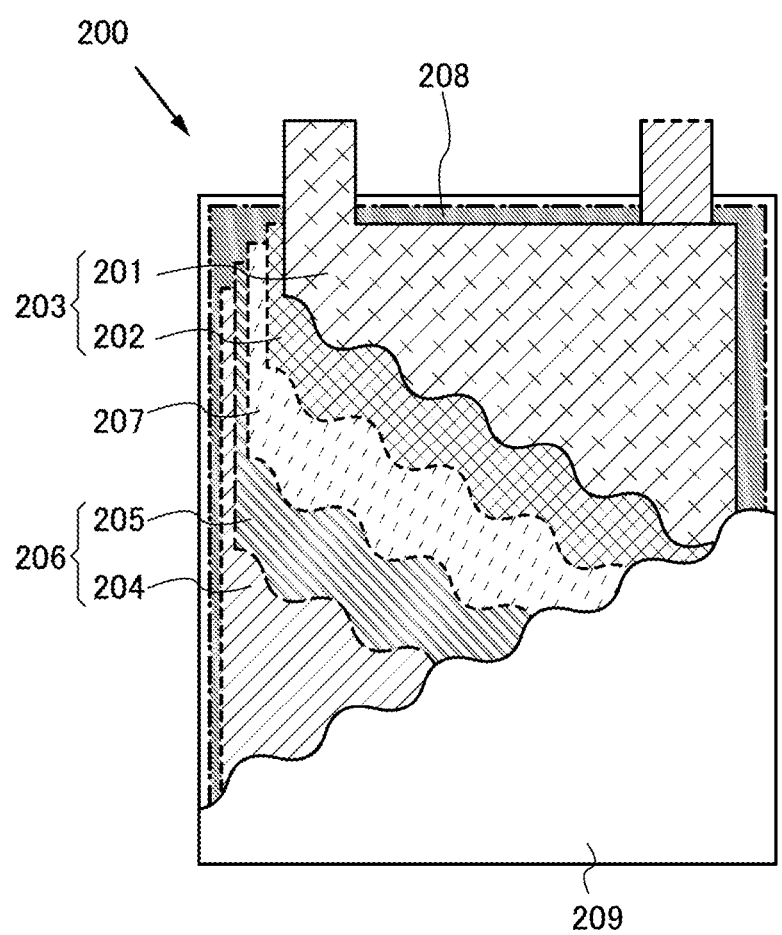
FIG. 4 illustrates a laminated power storage device.

Next, an example of a laminated power storage device will be described with reference to FIG. 4.

The laminated power storage device 200 is a battery formed in such a manner that a positive electrode 203 including a positive electrode current collector 201 and a positive electrode active material layer 202, a separator 207, and a negative electrode 206 including a negative electrode current collector 204 and a negative electrode active material layer 205 are stacked and sealed in an exterior body 209 and a nonaqueous electrolyte 208 is injected into the exterior body 209. Although the laminated power storage device 200 in FIG. 4 has a structure where one sheet-like positive electrode 203 and one sheet-like negative electrode 206 are stacked, it is preferable to roll the laminate structure or stack a plurality of pieces of the laminate structures and then laminate them in order to increase battery capacity. Such a laminated power storage device is particularly suitable for uses which need flexibility owing to its flexibility.

In the laminated power storage device 200, the positive electrode current collector 201 and the negative electrode current collector 204 also function as terminals for electrical contact with an external portion. For this reason, each of the positive electrode current collector 201 and the negative electrode current collector 204 is provided so as to be partly exposed on the outside of the exterior body 209.

As the exterior body 209 in the laminated power storage device 200, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be obtained.

The positive electrode 203 including the positive electrode current collector 201 and the positive electrode active material layer 202, the separator 207, the negative electrode 206 including the negative electrode current collector 204 and the negative electrode active material layer 205, and the nonaqueous electrolyte 208 correspond to the positive electrode 104 including the positive electrode current collector 105 and the positive electrode active material layer 106, the separator 110, the negative electrode 107 including the negative electrode current collector 108 and the negative electrode active material layer 109, and the nonaqueous electrolyte of one embodiment of the present invention, respectively.

<Cylindrical Power Storage Device>

Next, an example of a cylindrical power storage device will be described with reference to FIGS. 5A and 5B. As illustrated in FIG. 5A, a cylindrical power storage device 300 includes a positive electrode cap (battery cap) 301 on the top surface and a battery can (outer can) 302 on the side surface and bottom surface. The positive electrode cap 301 and the battery can 302 are insulated from each other by a gasket (insulating gasket) 310.

FIG. 5B is a diagram schematically illustrating a cross section of the cylindrical power storage device. Inside the battery can 302 having a hollow cylindrical shape, a battery element in which a strip-like positive electrode 304 and a strip-like negative electrode 306 are wound with a stripe-like separator 305 interposed therebetween is provided. Although not illustrated, the battery element is wound around a center pin. One end of the battery can 302 is close and the other end thereof is open. For the battery can 302, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 302, the battery element in which the positive electrode, the negative electrode, and the separator are wound is interposed between a pair of insulating plates 308 and 309 which face each other. Further, a nonaqueous electrolyte (not illustrated) is injected inside the battery can 302 provided with the battery element. As the nonaqueous electrolyte, a nonaqueous electrolyte which is similar to those of the above coin-type power storage device and the laminated power storage device can be used.

Although the positive electrode 304 and the negative electrode 306 can be formed in a manner similar to that of the positive electrode and the negative electrode of the coin-type power storage device described above, the difference lies in that, since the positive electrode and the negative electrode of the cylindrical power storage device are wound, active materials are formed on both sides of the current collectors. A positive electrode terminal (positive electrode current collecting lead) 303 is connected to the positive electrode 304, and a negative electrode terminal (negative electrode current collecting lead) 307 is connected to the negative electrode 306. Both the positive electrode terminal 303 and the negative electrode terminal 307 can be formed using a metal material such as aluminum. The positive electrode terminal 303 and the negative electrode terminal 307 are resistance-welded to a safety valve mechanism 312 and the bottom of the battery can 302, respectively. The safety valve mechanism 312 is electrically connected to the positive electrode cap 301 through a positive temperature coefficient (PTC) element 311. The safety valve mechanism 312 cuts off electrical connection between the positive electrode cap 301 and the positive electrode 304 when the internal pressure of the battery exceeds a predetermined threshold value. Further, the PTC element 311, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

Note that in this embodiment, the coin-type power storage device, the laminated power storage device, and the cylindrical power storage device are given as examples of the power storage device; however, any of power storage devices with a variety of shapes, such as a sealed power storage device and a square-type power storage device, can be used. Further, a structure in which a plurality of positive electrodes, a plurality of negative electrodes, and a plurality of separators are stacked or wound may be employed.

As nonaqueous electrolytes in the power storage device 100, the power storage device 200, and the power storage device 300 of this embodiment, a nonaqueous electrolyte containing the cyclic quaternary ammonium salt of one embodiment of the present invention is used. Thus, the power storage device 100, the power storage device 200, and the power storage device 300 can operate at a wide range of temperatures including low temperatures. Further, in the power storage device 100, the power storage device 200, and the power storage device 300, degradation of battery characteristics at low temperatures is minimized.

According to one embodiment of the present invention, a high-performance power storage device can be provided. Note that this embodiment can be implemented in combination with any of the other embodiments, as appropriate.

Embodiment 3

In this embodiment, a power storage device having a structure different from those of the power storage devices described in the above embodiment will be described. Specifically, descriptions will be given taking a lithium-ion capacitor and an electric double layer capacitor (EDLC) as examples.

A lithium-ion capacitor is a hybrid capacitor including a combination of a positive electrode of an electric double layer capacitor and a negative electrode of a lithium secondary battery formed using a carbon material and is also an asymmetric capacitor where power storage principles of the positive electrode and the negative electrode are different from each other. The positive electrode forms an electrical double layer and enables charge and discharge by a physical action, whereas the negative electrode enables charge and discharge by a chemical action of lithium. In a lithium-ion capacitor, a negative electrode in which lithium is occluded in a negative electrode active material such as a carbon material is used, whereby energy density is much higher than that of a conventional electric double layer capacitor whose negative electrode is formed using active carbon.

In a lithium-ion capacitor, instead of the positive electrode active material layer in the power storage device described in Embodiment 2, a material capable of reversibly having at least one of lithium ions and anions is used. Examples of such a material are active carbon, a conductive polymer, and a polyacenic semiconductor (PAS).

The lithium-ion capacitor has high charge and discharge efficiency which allows rapid charge and discharge and has a long life even when it is repeatedly used.

The use of at least the cyclic quaternary ammonium salt of one embodiment of the present invention for an electrolytic solution in the lithium-ion capacitor allows the lithium-ion capacitor to operate at a wide range of temperatures including low temperatures. Further, in the lithium-ion capacitor, degradation of battery characteristics at low temperatures is minimized.

Note that in the case of an electric double layer capacitor, active carbon, a conductive polymer, a polyacenic semiconductor (PAS), or the like can be used as a positive electrode active material layer and a negative electrode active material layer. An electrolytic solution in the electric double layer capacitor can be formed of only the cyclic quaternary ammonium salt of one embodiment of the present invention, in which case, the electric double layer capacitor can operate at a wide range of temperatures including low temperatures. Further, in the electric double layer capacitor, degradation of battery characteristics at low temperatures is minimized.

According to one embodiment of the present invention, a high-performance power storage device can be provided. Note that this embodiment can be implemented in combination with any of the structures described in the other embodiments, as appropriate.

Embodiment 4

The power storage device of one embodiment of the present invention can be used for power supplies of a variety of electric devices which can be operated with power.

Specific examples of electric devices each utilizing the power storage device of one embodiment of the present invention are as follows: display devices, lighting devices, desktop personal computers and laptop personal computers, image reproduction devices which reproduce still images and moving images stored in recording media such as Blu-ray Discs, mobile phones, smartphones, portable information terminals, portable game machines, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and dialyzers. In addition, moving objects driven by electric motors using power from power storage devices are also included in the category of electric devices. Examples of the moving objects include electric vehicles, hybrid vehicles each including both an internal-combustion engine and an electric motor, and motorized bicycles including motor-assisted bicycles.

In the electric devices, the power storage device of one embodiment of the present invention can be used as a power storage device for supplying enough power for almost the whole power consumption (referred to as a main power supply). Alternatively, in the electric devices, the power storage device of one embodiment of the present invention can be used as a power storage device which can supply power to the electric devices when the supply of power from the main power supply or a commercial power supply is stopped (such a power storage device is referred to as an uninterruptible power supply). Still alternatively, in the electric devices, the power storage device of one embodiment of the present invention can be used as a power storage device for supplying power to the electric devices at the same time as the power supply from the main power supply or a commercial power supply (such a power storage device is referred to as an auxiliary power supply).

Figure 6:
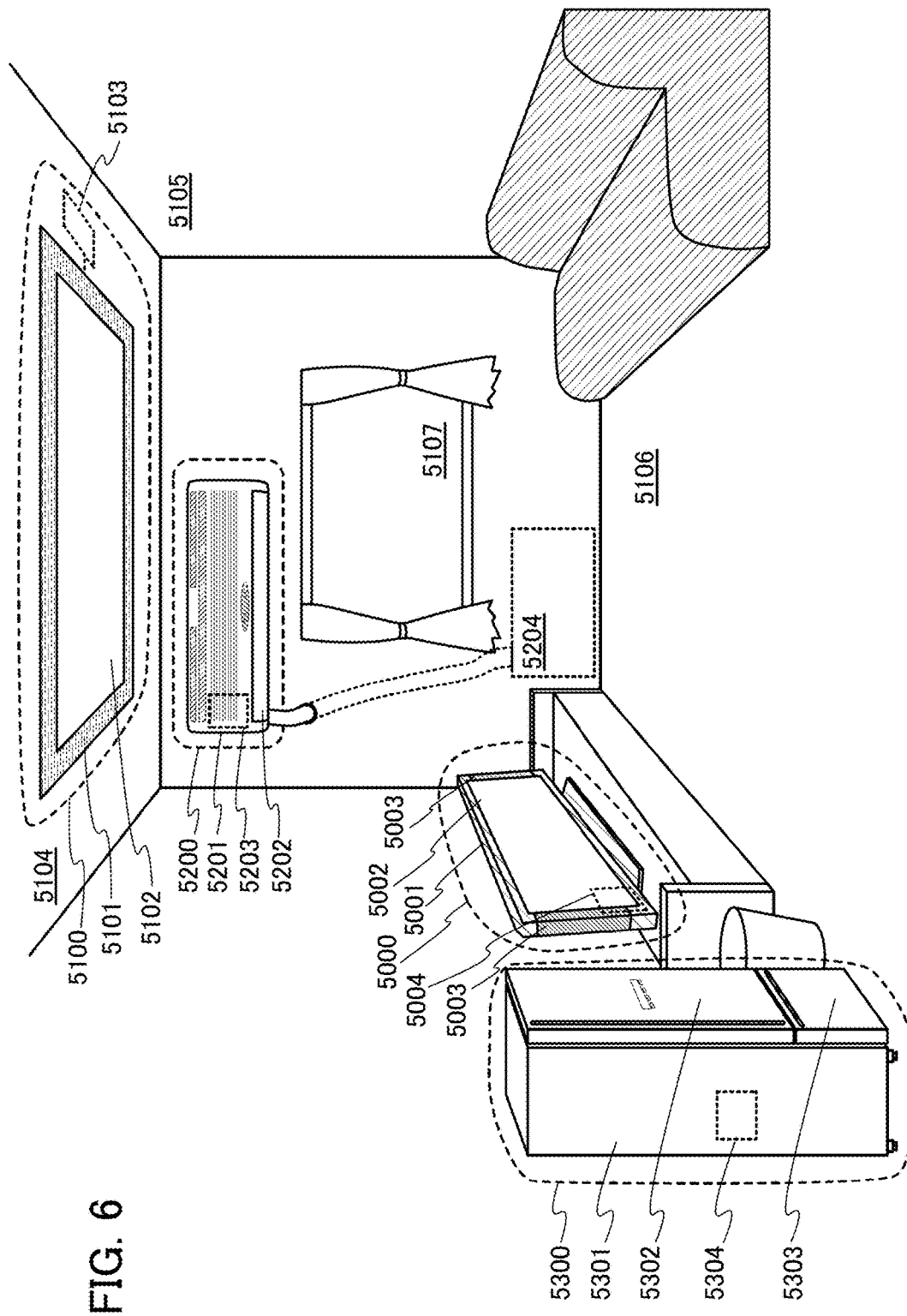
FIG. 6 illustrates electric devices.

FIG. 6 illustrates specific structures of the electric devices. In FIG. 6, a display device 5000 is an example of an electric device including a power storage device 5004. Specifically, the display device 5000 corresponds to a display device for TV broadcast reception and includes a housing 5001, a display portion 5002, speaker portions 5003, and the power storage device 5004. The power storage device 5004 of one embodiment of the present invention is provided in the housing 5001. The display device 5000 can receive electric power from a commercial power supply. Alternatively, the display device 5000 can use electric power stored in the power storage device 5004. Thus, the display device 5000 can be operated with the use of the power storage device 5004 as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, all of information display devices for personal computers, advertisement displays, and the like besides TV broadcast reception.

In FIG. 6, an installation lighting device 5100 is an example of an electric device including a power storage device 5103. Specifically, the lighting device 5100 includes a housing 5101, a light source 5102, and a power storage device 5103. Although FIG. 6 illustrates the case where the power storage device 5103 is provided in a ceiling 5104 on which the housing 5101 and the light source 5102 are installed, the power storage device 5103 may be provided in the housing 5101. The lighting device 5100 can receive electric power from a commercial power supply. Alternatively, the lighting device 5100 can use electric power stored in the power storage device 5103. Thus, the lighting device 5100 can be operated with the use of the power storage device 5103 as an uninterruptible power supply even when electric power cannot be supplied from a commercial power supply due to power failure or the like.

Note that although the installation lighting device 5100 provided in the ceiling 5104 is illustrated in FIG. 6 as an example, the power storage device of one embodiment of the present invention can be used in an installation lighting device provided in, for example, a wall 5105, a floor 5106, a window 5107, or the like other than the ceiling 5104. Alternatively, the power storage device can be used in a tabletop lighting device or the like.

As the light source 5102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 6, an air conditioner including an indoor unit 5200 and an outdoor unit 5204 is an example of an electric device including a power storage device 5203. Specifically, the indoor unit 5200 includes a housing 5201, an air outlet 5202, and a power storage device 5203. Although FIG. 6 illustrates the case where the power storage device 5203 is provided in the indoor unit 5200, the power storage device 5203 may be provided in the outdoor unit 5204. Alternatively, the secondary batteries 5203 may be provided in both the indoor unit 5200 and the outdoor unit 5204. The air conditioner can receive electric power from a commercial power supply. Alternatively, the air conditioner can use electric power stored in the power storage device 5203. Particularly in the case where the power storage devices 5203 are provided in both the indoor unit 5200 and the outdoor unit 5204, the air conditioner can be operated with the use of the power storage device 5203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 6 as an example, the power storage device of one embodiment of the present invention can be used in an air conditioner in which the functions of an indoor unit and an outdoor unit are integrated in one housing.

In FIG. 6, an electric refrigerator-freezer 5300 is an example of an electric device including a power storage device 5304. Specifically, the electric refrigerator-freezer 5300 includes a housing 5301, a door for a refrigerator 5302, a door for a freezer 5303, and the power storage device 5304. The power storage device 5304 is provided in the housing 5301 in FIG. 6. The electric refrigerator-freezer 5300 can receive electric power from a commercial power supply. Alternatively, the electric refrigerator-freezer 5300 can use electric power stored in the power storage device 5304. Thus, the electric refrigerator-freezer 5300 can be operated with the use of the power storage device 5304 as an uninterruptible power supply even when electric power cannot be supplied from a commercial power supply due to power failure or the like.

Note that among the electric devices described above, a high-frequency heating apparatus such as a microwave oven and an electric device such as an electric rice cooker require high power in a short time. The tripping of a breaker of a commercial power supply in use of an electric device can be prevented by using the power storage device of one embodiment of the present invention as an auxiliary power supply for supplying electric power which cannot be supplied enough by a commercial power supply.

In addition, in a time period when electric devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electric devices are used. For example, in the case of the electric refrigerator-freezer 5300, electric power can be stored in the power storage device 5304 in night time when the temperature is low and the door for a refrigerator 5302 and the door for a freezer 5303 are not often opened or closed. On the other hand, in daytime when the temperature is high and the door for a refrigerator 5302 and the door for a freezer 5303 are frequently opened and closed, the power storage device 5304 is used as an auxiliary power supply; thus, the usage rate of electric power in daytime can be reduced.

Note that this embodiment can be implemented in combination with any of the structures described in the other embodiments, as appropriate.

Embodiment 5

Next, a portable information terminal which is an example of electric devices provided with the power storage device of one embodiment of the present invention will be described.

Figure 7A:
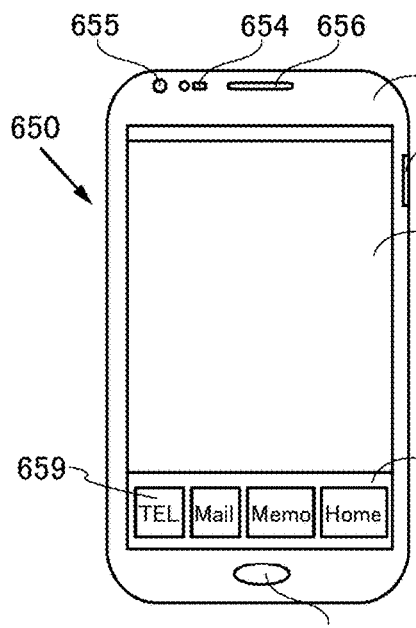
FIGS. 7A to 7C illustrate an electric device.
Figure 7B:
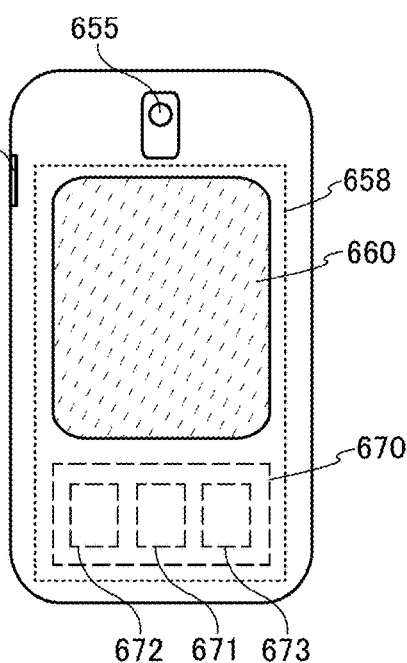

FIG. 7A is a schematic diagram of the front side of a portable information terminal 650. FIG. 7B is a schematic diagram of the back side of the portable information terminal 650. The portable information terminal 650 includes a housing 651, display portions 652 (including a display portion 652a and a display portion 652b), a power button 653, an optical sensor 654, a camera lens 655, a speaker 656, a microphone 657, and a power source 658.

The display portion 652a and the display portion 652b are touch panels. In the display portion 652a and the display portion 652b, keyboard buttons for inputting text can be displayed as needed. When the keyboard button is touched with a finger, a stylus, or the like, text can be input. Alternatively, when text is directly written or an illustration is directly drawn in the display portion 652a with a finger, a stylus, or the like without displaying the keyboard buttons, the text or the illustration can be displayed.

In the display portion 652b, functions which can be performed by the portable information terminal 650 are displayed. When a marker indicating a desired function is touched with a finger, a stylus, or the like, the portable information terminal 650 performs the function. For example, when a marker 659 is touched, the portable information terminal 650 can function as a phone; thus, phone conversation with the speaker 656 and the microphone 657 is possible.

The portable information terminal 650 incorporates a detecting device for determining inclination, such as a gyroscope or an acceleration sensor (not illustrated). Thus, when the housing 651 is placed horizontally or vertically, switching between display directions, for example, switching between a landscape mode and a portrait mode can be performed in the display portion 652a and the display portion 652b.

Further, the portable information terminal 650 is provided with the optical sensor 654; thus, in the portable information terminal 650, the brightness of the display portion 652a and the display portion 652b can be optimally controlled in accordance with the amount of ambient light detected with the optical sensor 654.

Figure 7C:
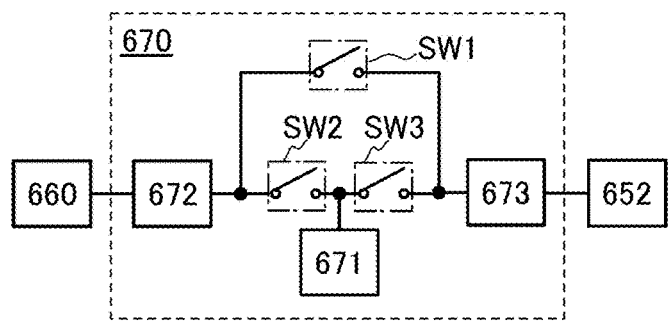

The portable information terminal 650 is provided with the power source 658 including a solar cell 660 and a charge/discharge control circuit 670. FIG. 7C illustrates an example where the charge/discharge control circuit 670 includes a battery 671, a DC-DC converter 672, and a converter 673. The power storage device described in the above embodiment is used as the battery 671.

The portable information terminal 650 can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 660, which is attached to the portable information terminal 650, can supply electric power to a display portion, an image signal processor, and the like. Note that the solar cell 660 can be provided on one or both surfaces of the housing 651 and thus the battery 671 can be charged efficiently. The use of the power storage device of one embodiment of the present invention as the battery 671 has advantages such as a reduction in size.

The structure and operation of the charge/discharge control circuit 670 illustrated in FIG. 7B will be described with reference to a block diagram of FIG. 7C. FIG. 7C illustrates the solar cell 660, the battery 671, the DC-DC converter 672, a converter 673, switches SW1 to SW3, and the display portion 652. The battery 671, the DC-DC converter 672, the converter 673, and the switches SW1 to SW3 correspond to the charge and discharge control circuit 670 in FIG. 7B.

First, an example of operation in the case where electric power is generated by the solar cell 660 using external light will be described. The voltage of electric power generated by the solar cell 660 is raised or lowered by the DC-DC converter 672 so that the electric power has a voltage for charging the battery 671. When the display portion 652 is operated with the electric power from the solar cell 660, the switch SW1 is turned on and the voltage of the electric power is raised or lowered by the converter 673 to a voltage needed for operating the display portion 652. In addition, when display on the display portion 652 is not performed, the switch SW1 is turned off and the switch SW2 is turned on so that the battery 671 may be charged.

Although the solar cell 660 is described as an example of a power generation means, there is no particular limitation on the power generation means, and the battery 671 may be charged with any of the other means such as a piezoelectric element or a thermoelectric conversion element (Peltier element). For example, the battery 671 may be charged with a non-contact power transmission module capable of performing charging by transmitting and receiving electric power wirelessly (without contact), or any of the other charge means used in combination.

Note that it is needless to say that one embodiment of the present invention is not limited to the portable information terminal illustrated in FIGS. 7A to 7C as long as the portable information terminal is provided with the power storage device described in the above embodiment. Note that this embodiment can be implemented in combination with any of the structures described in the other embodiments, as appropriate.

Embodiment 6

Further, an example of the moving object which is an example of the electric devices will be described with reference to FIGS. 8A and 8B.

Any of the power storage devices described in the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 8A:
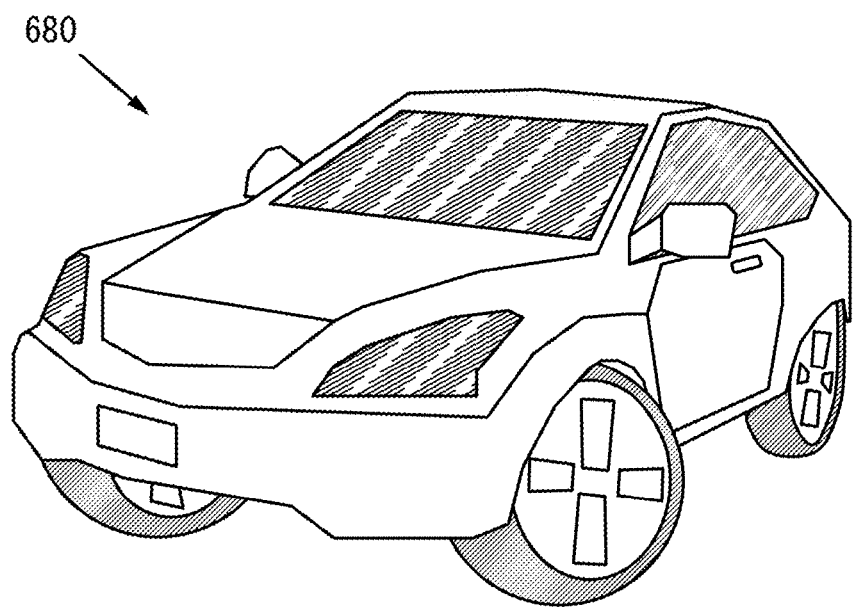
FIGS. 8A and 8B illustrate an electric device.
Figure 8B:
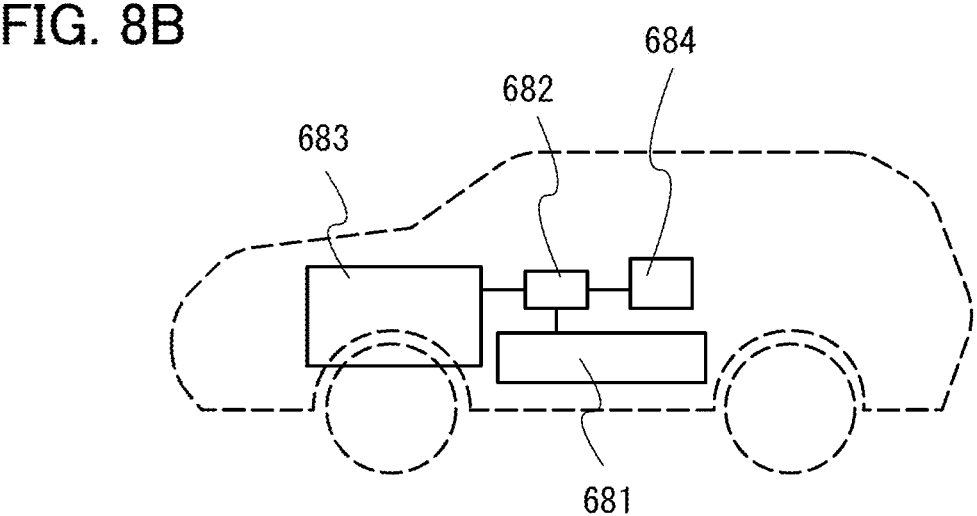

FIGS. 8A and 8B illustrate an example of an electric vehicle. An electric vehicle 680 is equipped with a battery 681. The output of the electric power of the battery 681 is adjusted by a control circuit 682 and the electric power is supplied to a driving device 683. The control circuit 682 is controlled by a processing unit 684 including a ROM, a RAM, a CPU, or the like which is not illustrated.

The driving device 683 includes a DC motor or an AC motor either alone or in combination with an internal-combustion engine. The processing unit 684 outputs a control signal to the control circuit 682 based on input data such as data on operation (e.g., acceleration, deceleration, or stop) of a driver or data during driving (e.g., data on an upgrade or a downgrade, or data on a load on a driving wheel) of the electric vehicle 680. The control circuit 682 adjusts the electric energy supplied from the battery 681 in accordance with the control signal of the processing unit 684 to control the output of the driving device 683. In the case where the AC motor is mounted, although not illustrated, an inverter which converts direct current into alternate current is also incorporated.

The battery 681 can be charged by external electric power supply using a plug-in technique. For example, the battery 681 is charged through a power plug from a commercial power supply. The battery 681 can be charged by converting the supplied power into DC constant voltage having a predetermined voltage level through a converter such as an AC-DC converter. The use of the power storage device of one embodiment of the present invention as the battery 681 can be conducive to an increase in capacity of the battery, leading to an improvement in convenience. When the battery 681 itself can be more compact and more lightweight as a result of improved characteristics of the battery 681, the vehicle can be lightweight, leading to an increase in fuel efficiency.

Note that it is needless to say that one embodiment of the present invention is not limited to the electric vehicle illustrated in FIGS. 8A and 8B as long as the electric vehicle is equipped with the power storage device described in the above embodiment. Note that this embodiment can be implemented in combination with any of the structures described in the other embodiments, as appropriate.

Example 1

In this example, descriptions will be given of a synthesis method and the physical property of 2-methyl-5-azoniaspiro[4,4]nonane bis(fluorosulfonyl)amide (hereinafter abbreviated to 2mAS44-FSA), the cyclic quaternary ammonium salt expressed by General Formula (G3) in which an anion (A$^-$) is a (fluorosulfonyl)amide (FSA) anion. Note that the present invention is not limited to the following examples.

A synthesis method of 2mAS44-FSA will be described using Synthesis Scheme (S-8) below. The structural Formula of 2mAS44-FSA is Structural Formula (β-4) in Synthesis Scheme (S-8).

[Chemical Formula 41]

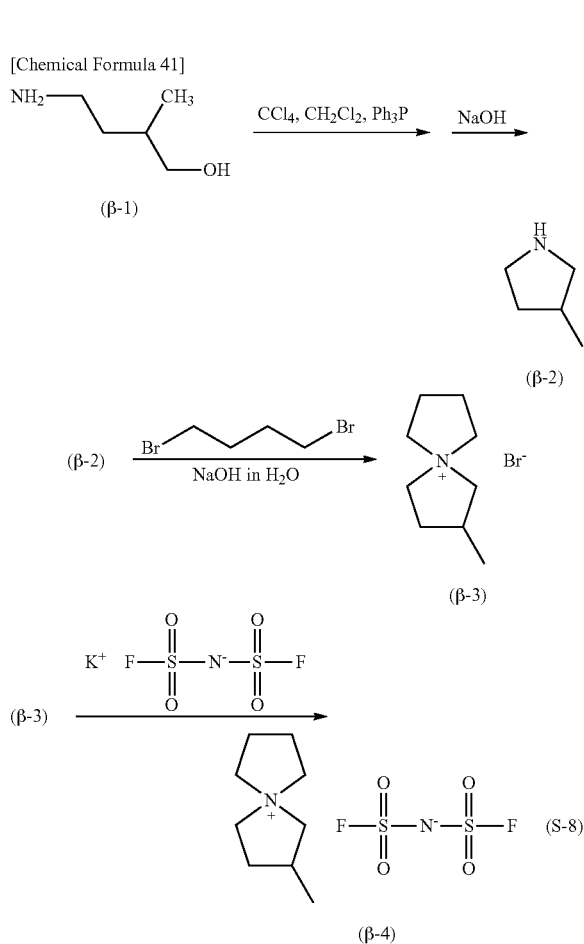

Synthesis of 3-methylpyrrolidine

4-Amino-2-methyl-1-butanol expressed by Structural Formula (β-1) (0.5 mol) and carbon tetrachloride (1.0 mol, 2 eq) were dissolved in methylene chloride (150 ml), triphenylphosphine (0.55 mol, 1.1 eq) was added thereto, and then the mixture was heated to reflux at 40° C. for approximately 3 hours. After that, the intermediate is extracted with water three times and the water was removed by evaporation under reduced pressure. The residue was transferred to a container, 60 ml of water and sodium hydroxide (1.0 mol, 2 eq) were added to the residue, and stirring was performed overnight (15 to 20 hours). After separation into two layers was observed, NaCl was added and salting-out and distillation were performed, so that 3-methylpyrrolidine expressed by Structural Formula (β-2) (40.64 g, 0.5 mol) was obtained.

Synthesis of 2-methyl-5-azoniaspiro[4,4]nonane bromide

Next, dibromobutane (0.5 mol) was added to a sodium hydroxide solution formed by dissolving sodium hydroxide (0.5 mol) in 500 ml of water. The synthesized 3-methylpyrrolidine (0.5 mol) was dripped for 30 minutes with this mixed solution kept at 60° C. and stirred and then the mixture was heated to reflux at 100° C. for approximately 3 hours. After the solvent was removed by evaporation under reduced pressure at 60° C., sodium hydroxide (2.5 mol) was dissolved into 250 ml of water to form a sodium hydroxide solution and the sodium hydroxide solution being iced was added to the residue. An intermediate was extracted with methylene chloride three times, the methylene chloride layer was dried with magnesium sulfate, and then the solvent was removed by evaporation under reduced pressure to give a rough precipitate. Purification was performed by recrystallization with methylene chloride and acetone and then washing with diethyl ether and drying were performed, so that 2-methyl-5-azoniaspiro[4,4]nonane bromide (0.225 mol, 49.6 g) was obtained.

Synthesis of 2mAS44-FSA

A solution of 2-methyl-5-azoniaspiro[4,4]nonane bromide (0.225 mol) and a solution of potassium bis(fluorosulfonyl)amide (0.248 mol, 1.1 eq) were mixed and stirred overnight (15 to 20 hours) to yield a hydrophobic, viscous, water-clear liquid. The intermediate is extracted with methylene chloride three times and then the methylene chloride layer was washed with water. A small amount of the water layer was taken and added to a silver nitrate solution, so that a white precipitation of silver bromide was formed. The methylene chloride layer was washed until the white precipitation of silver bromide was not observed (six times of washing with water) and was dried with magnesium sulfate and then the solvent was removed by evaporation under reduced pressure. Further, the obtained viscous liquid was dried under reduced pressure at 60° C. for approximately 8 hours to yield 2-methyl-5-azoniaspiro[4,4]nonane bis(fluorosulfonyl)amide (64.11 g, 0.20 mol).

The compound synthesized according to Synthesis Scheme (S-8) was identified as the desired product 2mAS44-FSA by a nuclear magnetic resonance (NMR) method and mass spectrometry.

Figure 9A:
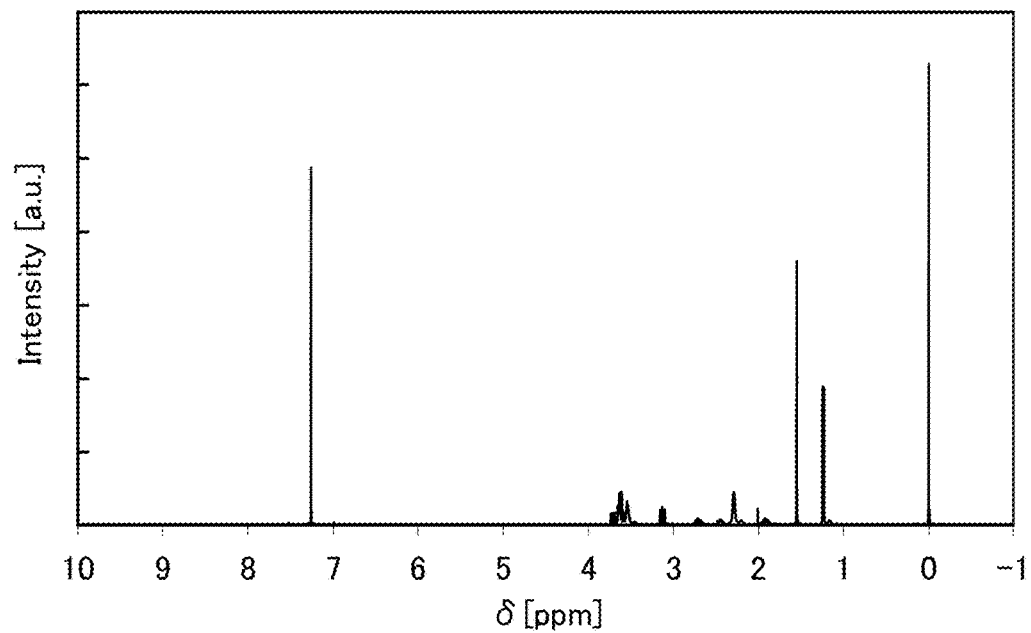
FIGS. 9A and 9B are $^1$H NMR charts of a synthesized ionic liquid.
Figure 9B:
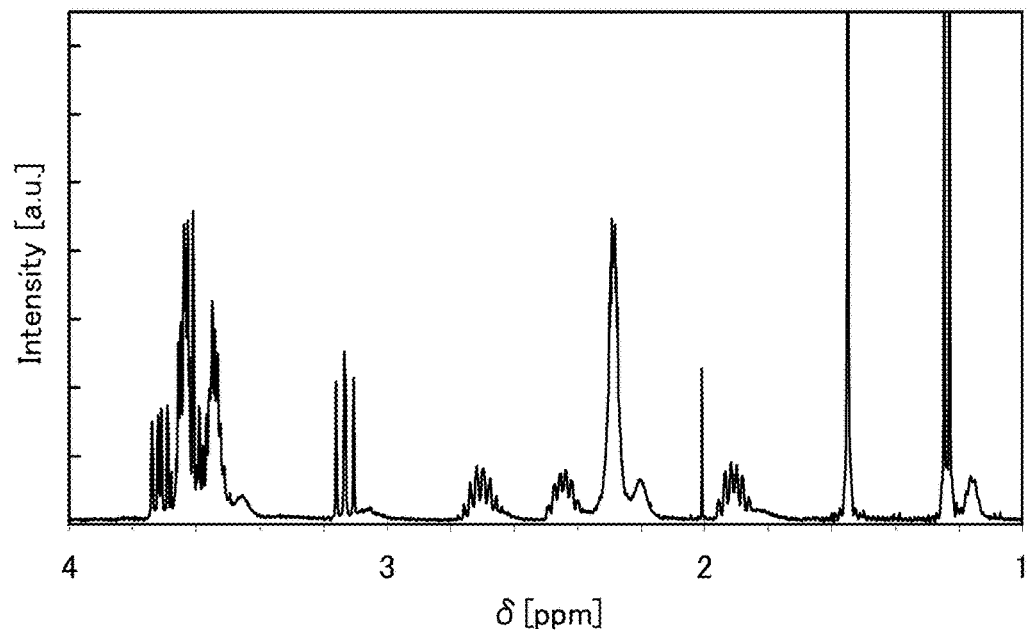

FIGS. 9A and 9B are $^1$H NMR charts. Note that FIG. 9B is an enlarged chart showing the range of 1.00 ppm to 4.00 ppm in FIG. 9A.

$^1$H NMR data of the obtained compound is shown below.

$^1$H-NMR (CDCl$_3$, 400 MHz, 298 K): δ (ppm) 1.23, 1.25 (3H), 1.85 to 1.95 (1H), 2.26 to 2.31 (1H), 2.39 to 2.49 (1H), 2.62 to 2.74 (1H), 3.11, 3.13, 3.16 (1H), 3.51 to 3.74 (7H)

The measurement results of the electron impact mass spectrometry (EI-MS) of the obtained compound are shown below.

MS(EI-MS): m/z=140.14 (M)$^+$; C$_9$H$_{18}$N (140.14), m/z=179.92 (M)$^-$; F$_2$NO$_4$S$_2$ (179.92)

The above results show that the synthesized compound is the desired product 2mAS44-FSA.

The physical property of the obtained 2mAS44-FSA was evaluated. The viscosity was measured with an oscillatory viscometer (VM-10A) produced by SEKONIC CORPORATION at 25° C. A measurement value obtained with the oscillatory viscometer is "viscosity (mPa·s)×density (g/ml)"; thus, the viscosity was obtained by dividing a measurement value by the density.

The ionic conductivity was evaluated by the conductivity. The conductivity was obtained by filling a conductivity cell, which is a housing made of a fluorine resin and provided with a plate electrode produced by SUS Corporation, with a sample and performing AC impedance measurement. In the AC impedance measurement, an impedance measurement system composed of a potentiostat and a frequency response analyzer (FRA) is used to analyze a response current against a small voltage amplitude applied to an object to be measured. The AC impedance measurement was performed with an electrochemical measurement system HZ-5000 produced by HOKUTO DENKO CORPORATION and connected with a frequency response analyzer FRA5022 produced by NF Corporation, under the conditions that the AC amplitude was 10 mV and the temperature was 25° C.

The melting points were measured with a differential scanning calorimeter DSC200 produced by SII NanoTechnology Inc., under the conditions that the temperature range was from −100° C. to 100° C. and the temperature rising rate was 10° C./min.

The viscosity of the 2mAS44-FSA at 25° C. was 47 mPa·s. The melting points of the 2mAS44-FSA were −11.4° C. and −8.1° C. The conductivity of the 2mAS44-FSA at 25° C. was 8.4 mS/cm. Note that the 2mAS44-FSA synthesized in this example has two melting points presumably because the synthesized 2mAS44-FSA has a stereoisomer.

Further, the oxidation potential and the reduction potential of the 2mAS44-FSA were evaluated by linear sweep voltammetry.

The measurement was performed using the electrochemical measurement system HZ-5000 produced by HOKUTO DENKO CORPORATION in a glove box with an argon atmosphere. A glassy carbon electrode was used as a working electrode and a platinum wire was used as a counter electrode. A silver wire immersed in a solution in which silver trifluoromethanesulfonate was dissolved in 1-ethyl-3-methylimidazolium bis(trifluoromethanesulfonyl)amide at a concentration of 0.1 mol/L was used as a reference electrode. The reduction potentials of samples were corrected based on the redox potential of lithium (Li/Li$^+$).

In linear sweep voltammetry, oxidation potential is a potential at which a current density of −1 mA/cm$^2$ was detected while the potential was scanned. Reduction potential is a potential at which a current density of −1 mA/cm$^2$ was detected while the potential was scanned.

The oxidation potential and the reduction potential of the 2mAS44-FSA were 6.1 V (vs. Li/Li$^+$) and 0.1 V (vs. Li/Li$^+$), respectively.

According to the above results, the melting points of the 2mAS44-FSA of one embodiment of the present invention were lower than 0° C., which implies that the use of the 2mAS44-FSA as a nonaqueous solvent in formation of a nonaqueous electrolyte enables manufacture of a power storage device which can operate at a wide range of temperatures including low temperatures.

Note that this example can be implemented in combination with any of the structures described in the other embodiments and examples, as appropriate.

Example 2

In this example, the battery characteristics of a lithium secondary battery containing the 2mAS44-FSA described in Example 1 as a nonaqueous solvent of a nonaqueous electrolyte will be described.

In this example, a full cell coin-type lithium secondary battery was fabricated and the battery characteristics thereof were evaluated. First, the structure and a fabrication method of the lithium secondary battery will be described with reference to FIGS. 1A and 1B.

The positive electrode 104 has a layered structure of aluminum foil serving as the positive electrode current collector 105 and the positive electrode active material layer 106 with a thickness of approximately 50 μm. For the positive electrode active material layer 106, a mixture where lithium iron (II) phosphate (LiFePO$_4$), acetylene black, and poly(vinylidene fluoride) were mixed at a ratio of 85:8:7 was used and was formed on one side of the aluminum foil. Note that the amount of LiFePO$_4$ in the positive electrode 104 was approximately 6.0 mg/cm$^2$ and the single-electrode theoretical capacity was approximately 1.0 mAh/cm$^2$.

The negative electrode 107 has a layered structure of copper foil serving as the negative electrode current collector 108 and the negative electrode active material layer 109 with a thickness of approximately 100 μm. For the negative electrode active material layer 109, a mixture where mesocarbon microbeads (MCMB) powder with a diameter of 9 μm, acetylene black, and poly(vinylidene fluoride) were mixed at a ratio of 93:2:5 was used and was formed on one side of the copper foil. Note that the amount of MCMB in the negative electrode 107 was approximately 9.3 mg/cm$^2$ and the single-electrode theoretical capacity was approximately 3.46 mAh/cm$^2$.

As a nonaqueous electrolyte, a solution where 1.0 M lithium bis(trifluoromethylsulfonyl)amide (hereinafter abbreviated to LiTFSA) as a lithium salt was dissolved in the 2mAS44-FSA described in Example 1 was used.

As the separator 110, a poly(vinylidene fluoride) film with a thickness of 125 μm subjected to hydrophillic treatment was used. The separator 110 was impregnated with the nonaqueous electrolyte.

The positive electrode can 101 and the negative electrode can 102 were formed of stainless steel (SUS). As the gasket 103, a spacer or a washer was used.

As illustrated in FIG. 1, the positive electrode can 101, the positive electrode 104, the separator 110, the negative electrode 107, the gasket 103, and the negative electrode can 102 are stacked, and the positive electrode can 101 and the negative electrode can 102 are crimped to each other with a "coin cell crimper". Thus, the coin-type lithium secondary battery was fabricated. The fabricated coin-type lithium secondary battery is Sample 1.

A coin-type lithium secondary battery containing an ionic liquid (EMI-FSA) which contains a 1-ethyl-3-methylimidazolium (EMI) cation and an FSA anion, as a nonaqueous solvent of a nonaqueous electrolyte, instead of the 2mAS44-FSA in Sample 1 is Comparative Example 1. Note that the other conditions such as the concentration of a lithium salt are the same as those of Sample 1; thus, Comparative Example 1 except the nonaqueous electrolyte was fabricated in the same manner as that of Sample 1.

A coin-type lithium secondary battery containing an ionic liquid (P13-FSA) which contains an N-methyl-N-propylpyrrolidinium (P13) cation and an FSA anion, as a nonaqueous solvent of a nonaqueous electrolyte, instead of the 2mAS44-FSA in Sample 1 is Comparative Example 2. Note that the other conditions such as the concentration of a lithium salt are the same as those of Sample 1; thus, Comparative Example 2 except the nonaqueous electrolyte was fabricated in the same manner as that of Sample 1.

The charge and discharge characteristics of Sample 1, Comparative Example 1, and Comparative Example 2 were measured. The measurement was performed with a charge-discharge measuring instrument (produced by TOYO SYSTEM Co., LTD.) with Sample 1, Comparative Example 1, and Comparative Example 2 heated and kept at 60° C. Further, charge and discharge in the measurement were performed at a rate of 0.1 C in the voltage range of 2.0 V to 4.0 V (constant current charge and discharge).

Figure 10:
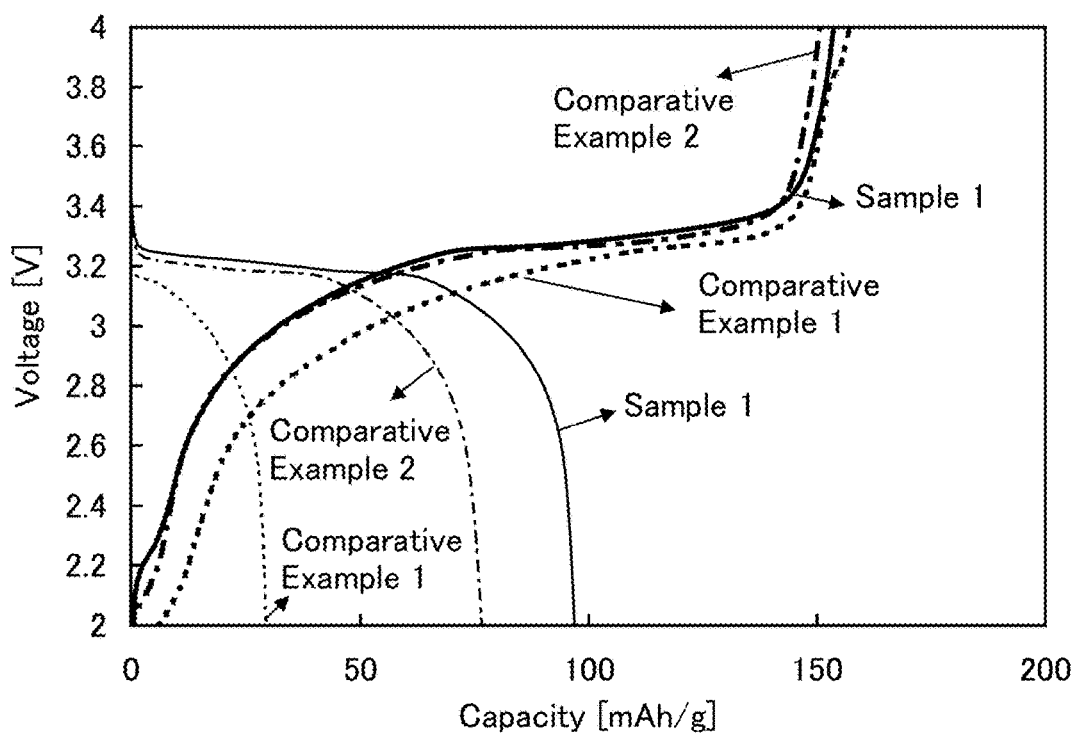
FIG. 10 is a graph showing the charge and discharge characteristics of coin-type lithium secondary batteries.

FIG. 10 shows the charge and discharge characteristics of Sample 1, Comparative Example 1, and Comparative Example 2. In the graph, the horizontal axis represents capacity per unit weight of the positive electrode active material and the vertical axis represents charge and discharge voltage. Solid lines show results of Sample 1, dotted lines show results of Comparative Example 1, and dashed dotted lines show results of Comparative Example 2. Further, thick curves are charge curves of Sample 1, Comparative Example 1, and Comparative Example 2, and the capacity values at 4 V are initial charge capacities. Thin curves are discharge curves of Sample 1, Comparative Example 1, and Comparative Example 2, and the capacity values at 2 V are initial discharge capacities.

As shown in FIG. 10, there are no significant differences in initial charge capacity between Sample 1, Comparative Example 1, and Comparative Example 2 and their initial charge capacities are approximately 150 mAh/g, whereas there are differences in initial discharge capacity between them. The initial discharge capacity of Sample 1 is approximately 100 mAh/g, whereas the initial discharge capacities of Comparative Example 1 and Comparative Example 2 are approximately 30 mAh/g and approximately 75 mAh/g, respectively. These results indicate that the ratio of discharge capacity to charge capacity (initial charge and discharge efficiency) of Sample 1 is the highest among them.

Here, the reason why the initial charge and discharge efficiency of Sample 1 is higher than those of Comparative Example 1 and Comparative Example 2 will be examined. A discharge capacity lower than a charge capacity is caused presumably because part of charge capacity is used for irreversible reactions. One of the irreversible reactions is a reaction where cations in an ionic liquid fill sites in a negative electrode active material which are used for insertion or extraction of lithium ions serving as carrier ions.

Further, the result that initial charge and discharge efficiency depends on the kind of a nonaqueous solvent used in a nonaqueous electrolyte was able to be found because the structures of ionic liquids used as nonaqueous solvents, specifically, the stereostructures of cations in the ionic liquids are different from one another.

Figure 11A:
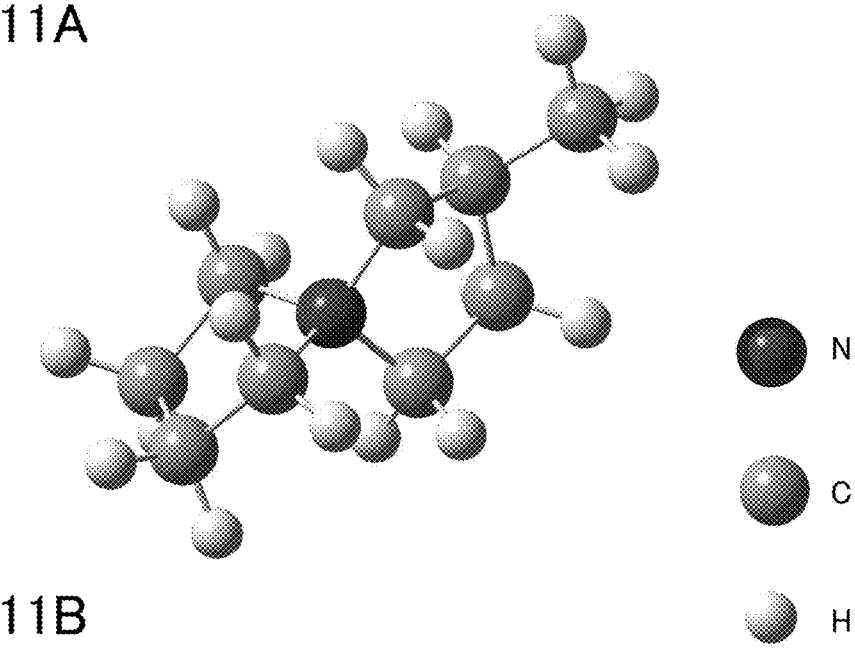
FIGS. 11A to 11C are the stereostructures of cations.
Figure 11B:
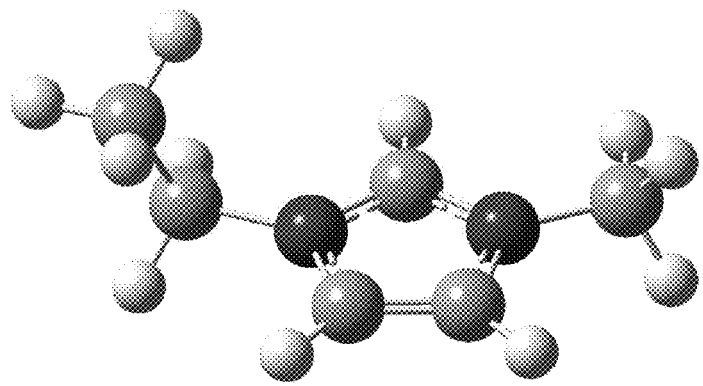
Figure 11C:
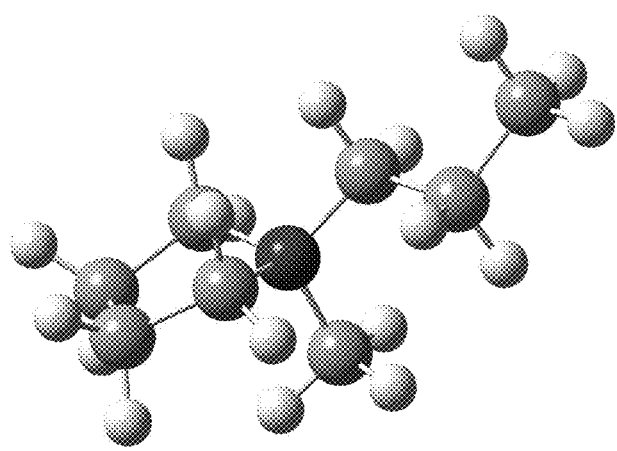

FIGS. 11A, 11B, and 11C show the stereostructures of the cations in the ionic liquids used for Sample 1, Comparative Example 1, and Comparative Example 2, respectively. FIG. 11A is a 2mAS44 cation, FIG. 11B is an EMI cation, and FIG. 11C is a P13 cation.

The optimum molecular structures in the singlet ground state of the 2mAS44 cation, the EMI cation, and the P13 cation as the stereostructures thereof were calculated using density functional theory (DFT). In the DFT, the total energy is represented as the sum of potential energy, electrostatic energy between electrons, electronic kinetic energy, and exchange-correlation energy including all the complicated interactions between electrons. In the DFT, an exchange-correlation interaction is approximated by a functional (that is, a function of another function) of one electron potential represented in terms of electron density to enable high-speed and highly-accurate calculations. Here, B3LYP which is a hybrid functional was used to specify the weight of each parameter related to exchange-correlation energy. In addition, as a basis function, 6-311G (a basis function of a triple-split valence basis set using three contraction functions for each valence orbital) was applied to all the atoms. By the above basis function, for example, orbits of 1 s to 3 s are considered in the case of hydrogen atoms while orbits of 1 s to 4 s and 2 p to 4 p are considered in the case of carbon atoms. Furthermore, to improve calculation accuracy, the p function and the d function as polarization basis sets are added to hydrogen atoms and atoms other than hydrogen atoms, respectively. Note that Gaussian 09 was used as a quantum chemistry computational program in this example. The quantum chemical calculations were performed using a high performance computer (Altix ICE8400EX produced by SGI, Ltd.). Note that in the quantum chemical calculations, the 2mAS44 cation, the EMI cation, and the P13 cation had the most stable structures and were in a vacuum.

The 2mAS44 cation has a twisted stereostructure where two aliphatic rings composing a spiro ring are perpendicular to each other and the rings cannot rotate on a nitrogen atom, the structure having larger steric hindrance than those of Comparative Example 1 and Comparative Example 2 (see FIG. 11A). Note that the 2mAS44 cation has optical isomers and the lowest unoccupied molecular orbitals (LUMOs) of the optical isomers in the most stable structures coincide with each other; thus, only one of the structures is shown in FIG. 11A.

The EMI cation has a stereostructure where atoms in an imidazolium ring lie in the same plane, the structure having smaller steric hindrance than those of Sample 1 and Comparative Example 2 (see FIG. 11B).

Unlike in the EMI cation, in the P13 cation, an atom in a pyrrolidinium ring has a substituent outside the plane where a cyclic skeleton lies and thus steric hindrance is larger than that of the EMI cation and smaller than the 2mAS44 cation having two rings (see FIG. 11C).

Note that in all the cations, a methyl group and an ethyl group as substituents can freely rotate on a carbon atom.

According to the above, sites in a negative electrode active material which are used for insertion and extraction of lithium ions are likely to be filled when steric hindrance is small. Accordingly, a cation with larger steric hindrance is less likely to fill the site. That is to say, the 2mAS44 cation having larger steric hindrance than the EMI cation and the P13 cation is unlikely to fill the site. Thus, in Sample 1 containing an ionic liquid which contains the 2mAS44 cation, such an irreversible reaction is minimized, so that the initial charge and discharge efficiency of Sample 1 is higher than those of Comparative Example 1 and Comparative Example 2.

The above results suggest that the use of the cyclic quaternary ammonium salt of one embodiment of the present invention which contains the following cation, as a nonaqueous solvent, enables manufacture of a lithium secondary battery which has higher performance than a lithium secondary battery containing a known ionic liquid as a nonaqueous solvent. The cation has a stereostructure whose bulk is high and which is a spiro ring structure with large steric hindrance. The symmetry of the cation is destroyed by introduction of a substituent so that the cyclic quaternary ammonium salt is liquid even at room temperature.

In addition, Sample 1 operates as a battery, without an additive such as ethylene carbonate (EC) or vinylene carbonate (VC). This result suggests that the use of the cyclic quaternary ammonium salt of one embodiment of the present invention as a nonaqueous solvent allows manufacture of a lithium secondary battery in which an irreversible reaction such as a decomposition reaction of the additive or a film formation reaction does not occur and thus a reduction in initial charge and discharge capacity is minimized.

Note that this example can be implemented in combination with any of the structures described in the other embodiments and examples, as appropriate.

Example 3

In this example, descriptions will be given of a synthesis method and the physical property of 7-methyl-5-azoniaspiro [4,5]decane bis(fluorosulfonyl)amide (hereinafter abbreviated to 7mAS45-FSA), the cyclic quaternary ammonium salt expressed by General Formula (G3) in which an anion (A⁻) is a (fluorosulfonyl)amide (FSA) anion. The structural formula of 7mAS45-FSA is Structural Formula (β-5). Note that the present invention is not limited to the following examples.

[Chemical Formula 42]

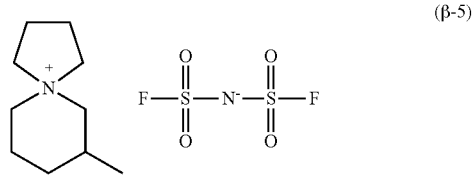

(β-5)

7mAS45-FSA in this example can be synthesized with reference to the synthesis method of 2mAS44-FSA, which is described in Example 1. Specifically, 3-pipecoline and 1,4-dibromopentane are reacted with each other to synthesize 7-methyl-5-azoniaspiro[4,5]decane bromide, and anion exchange between the 7-methyl-5-azoniaspiro[4,5]decane bromide and FSA is performed, so that 7mAS45-FSA can be synthesized. Thus, a description of a synthesis scheme of the 7mAS45-FSA will be omitted.

Synthesis of 7-methyl-5-azoniaspiro[4,5]decane bromide

3-Pipecoline (9.9 g, 100 mmol), 2-propanol (90 ml), potassium carbonate (28.0 g, 200 mmol), and a solution where 1,4-dibromobutane (17.0 g, 80 mmol) was dissolved in 2-propanol (10 ml) were mixed at room temperature in a nitrogen atmosphere. This mixed solution was heated to reflux at 100° C. for 10 hours. 2-Propanol (100 ml) was added to the obtained reaction solution, a solid is removed by suction filtration, and washing with 2-propanol (100 ml) was performed. The obtained filtrate was concentrated, purification was performed by recrystallization with a mixed solvent of 2-propanol and acetone, and then the obtained solid was filtrated and dried, so that a white solid 7-methyl-5-azoniaspiro[4,5]decane bromide (14.0 g, 60 mmol) was obtained.

Synthesis of 7mAS45-FSA

The 7-methyl-5-azoniaspiro[4,5]decane bromide (13.5 g, 58 mmol) and potassium bis(fluorosulfonyl)amide (13.9 g, 63 mmol) were mixed and stirred in pure water to immediately give an ionic liquid insoluble in water. After that, the obtained ionic liquid was extracted with methylene chloride and then washed with pure water six times. The solvent was removed by evaporation and drying was performed at 100° C. in a vacuum, so that 7-methyl-5-azoniaspiro[4,5]decane bis(fluorosulfonyl)amide (16.6 g, 50 mmol) was obtained.

The ionic liquid obtained through the above steps was identified as 7mAS45-FSA by a nuclear magnetic resonance (NMR) method and mass spectrometry.

Figure 12A:
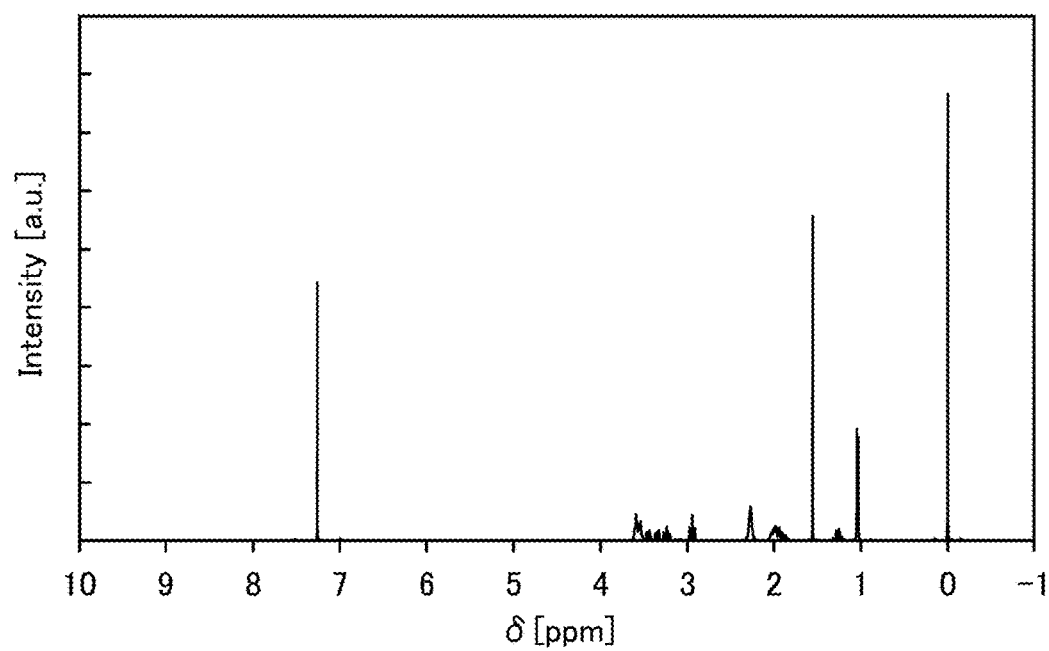
FIGS. 12A and 12B are $^1$H NMR charts of a synthesized ionic liquid.
Figure 12B:
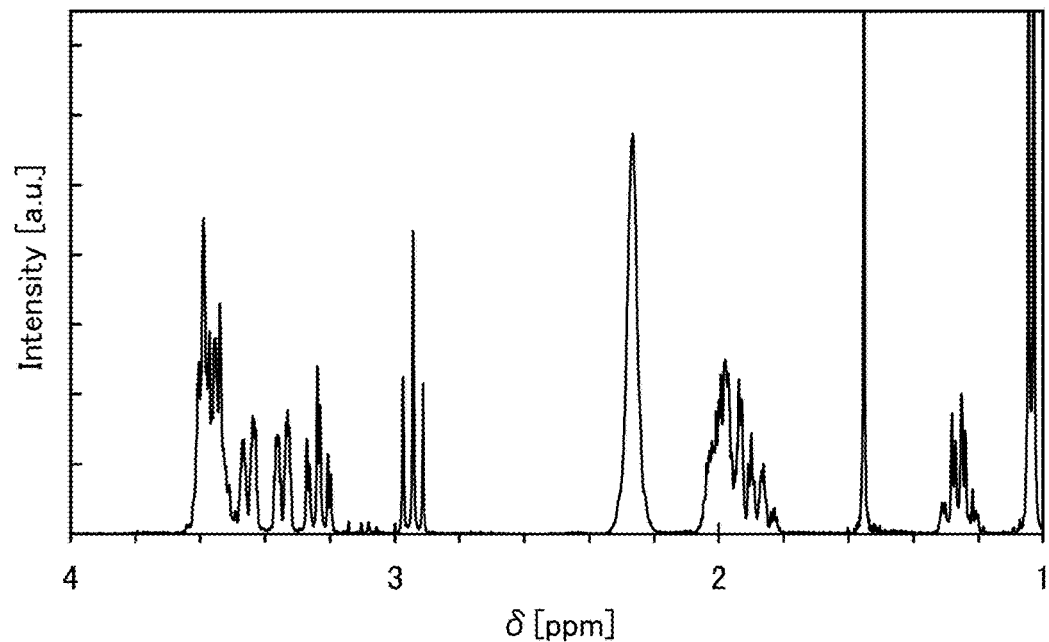

FIGS. 12A and 12B show ¹H NMR charts. Note that FIG. 12B is an enlarged chart showing the range of 1.00 ppm to 4.00 ppm in FIG. 12A.

¹H NMR data of the obtained compound is shown below.

¹H NMR (CDCl₃, 400 MHz, 298 K): δ (ppm) 1.02 to 1.05 (3H), 1.20 to 1.31 (1H), 1.82 to 1.93 (3H), 1.93 to 2.05 (1H), 2.23 to 2.30 (4H), 2.91 to 2.98 (1H), 3.19 to 3.27 (1H), 3.33 to 3.37 (1H), 3.43 to 3.47 (1H), 3.50 to 3.60 (4H)

The measurement results of the electron impact mass spectrometry (EI-MS) of the obtained compound are shown below.

MS(EI-MS): m/z=154.22 (M)$^+$; $C_{10}H_{20}N$ (154.16), m/z=179.98 (M)$^-$; $F_2NO_4S_2$ (179.92)

The results show that the compound synthesized through the above steps is the desired product 7mAS45-FSA.

Further, the viscosity, the melting points, and the conductivity of the 7mAS45-FSA were measured. The measurement of the viscosity, the melting points, and the conductivity was performed as in Example 1. The viscosity of the 7mAS45-FSA was 68 Pa·s. The melting points of the 7mAS45-FSA were −24° C. and −6° C. The conductivity of the 7mAS45-FSA at 25° C. was 5.5 mS/cm. Note that the 7mAS45-FSA synthesized in this example has two melting points presumably because the synthesized 7mAS45-FSA has a stereoisomer.

The oxidation potential and the reduction potential of the 7mAS45-FSA were evaluated by linear sweep voltammetry. The measurement was performed by a method similar to that in Example 1.

The oxidation potential and the reduction potential of the 7mAS45-FSA were 5.8 V (vs. Li/Li$^+$) and 0.1 V (vs. Li/Li$^+$), respectively.

Similarly to the calculation described in Example 2, the calculation of the optimum molecular structure in the singlet ground state of a 7mAS45 cation was performed using density functional theory. The LUMO level of the 7mAS45 cation was −3.33 eV.

According to the above results, the melting points of the 7mAS45-FSA of one embodiment of the present invention were lower than 0° C., which suggests that the use of the 7mAS45-FSA as a nonaqueous solvent in formation of a nonaqueous electrolyte enables manufacture of a power storage device which can operate at a wide range of temperatures including low temperatures.

Note that this example can be implemented in combination with any of the structures described in the other embodiments and examples, as appropriate.

Example 4

In this example, the battery characteristics of a lithium secondary battery containing the 7mAS45-FSA described in Example 3 as a nonaqueous solvent of a nonaqueous electrolyte will be described.

In this example, a full cell coin-type lithium secondary battery was fabricated and the battery characteristics thereof were evaluated. First, the structure and a fabrication method of the cell coin-type lithium secondary battery will be described with reference to FIGS. 1A and 1B.

The positive electrode 104 has a layered structure of aluminum foil serving as the positive electrode current collector 105 and the positive electrode active material layer 106 with a thickness of approximately 50 μm. For the positive electrode active material layer 106, a mixture where lithium iron (II) phosphate (LiFePO$_4$), acetylene black, and poly(vinylidene fluoride) were mixed at a ratio of 85:8:7 was used and was formed on one side of the aluminum foil. Note that the amount of LiFePO$_4$ in the positive electrode 104 was approximately 6.0 mg/cm$^2$ and the single-electrode theoretical capacity was approximately 1.0 mAh/cm$^2$.

The negative electrode 107 has a layered structure of copper foil serving as the negative electrode current collector 108 and the negative electrode active material layer 109 with a thickness of approximately 100 μm. For the negative electrode active material layer 109, a mixture where meso-carbon microbeads (MCMB) powder with a diameter of 9 μm and poly(vinylidene fluoride) were mixed at a ratio of 90:10 was used and was formed on one side of the copper foil. Note that the amount of MCMB in the negative electrode 107 was approximately 8.0 mg/cm$^2$ and the single-electrode theoretical capacity was approximately 3.0 mAh/cm$^2$.

As a nonaqueous electrolyte, a solution where 1.0 M LiTFSA as a lithium salt was dissolved in the 7mAS45-FSA described in Example 3 was used.

As the separator 110, a poly(vinylidene fluoride) film with a thickness of 125 μm subjected to hydrophillic treatment was used. The separator 110 was impregnated with the nonaqueous electrolyte.

The positive electrode can 101 and the negative electrode can 102 were formed of stainless steel (SUS). As the gasket 103, a spacer or a washer was used.

As illustrated in FIG. 1, the positive electrode can 101, the positive electrode 104, the separator 110, the negative electrode 107, the gasket 103, and the negative electrode can 102 are stacked, and the positive electrode can 101 and the negative electrode can 102 are crimped to each other with a "coin cell crimper". Thus, the coin-type lithium secondary battery was fabricated. The fabricated coin-type lithium secondary battery is Sample 2.

The charge and discharge characteristics of Sample 2 were measured. The measurement was performed with the same charge-discharge measuring instrument as the measuring instrument used in Example 1 with Sample 2 heated and kept at 60° C. Further, charge and discharge in the measurement were performed at a rate of 0.1 C in the voltage range of 2.0 V to 4.0 V (constant current charge and discharge).

Figure 13:
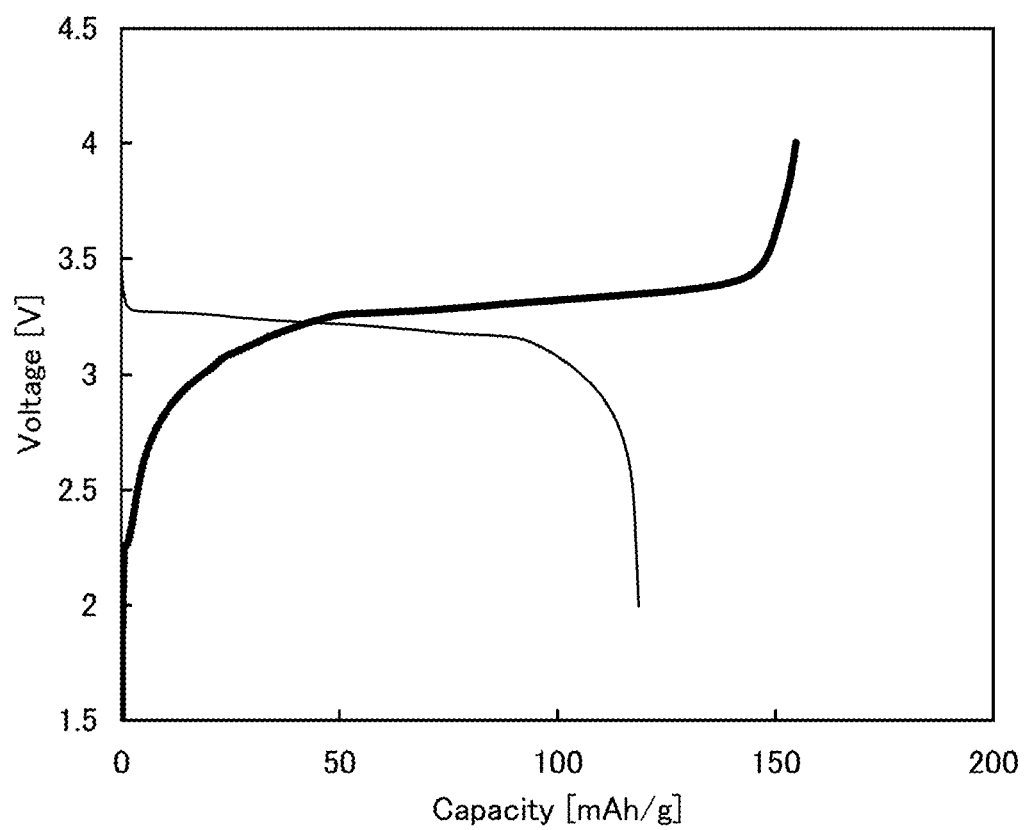
FIG. 13 is a graph showing the charge and discharge characteristics of a coin-type lithium secondary battery.

FIG. 13 shows the charge and discharge characteristics of Sample 2. In the graph, the horizontal axis represents capacity per unit weight of the positive electrode active material and the vertical axis represents charge and discharge voltage. Further, the thick curve is a charge curve of Sample 2, and the capacity value at 4 V is the initial charge capacity. The thin curve is a discharge curve of Sample 2, and the capacity value at 2 V is the initial discharge capacity.

The initial charge capacity and the initial discharge capacity of Sample 2 were approximately 150 mAh/g and approximately 100 mAh/g, respectively.

Figure 19:
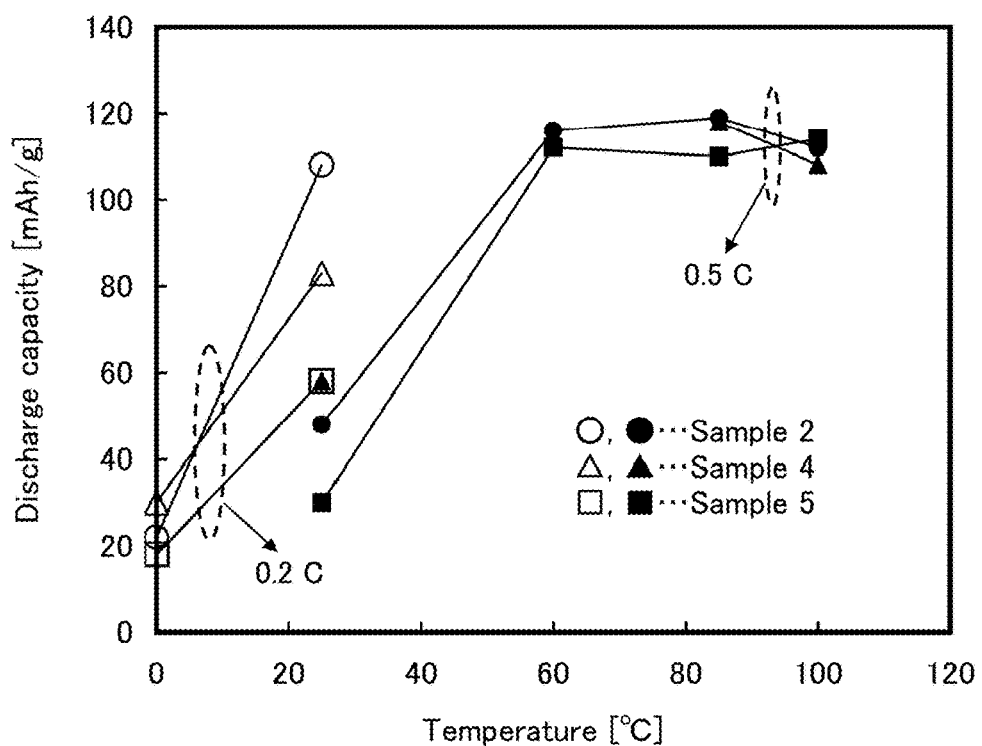
FIG. 19 is a graph showing the temperature-discharge capacity characteristics of coin-type lithium secondary batteries.

FIG. 19 shows results obtained by measuring discharge capacity of Sample 2, Sample 4, and Sample 5 with respect to temperature at a rate of 0.5 C or 0.2 C. Sample 2 contains the 7mAS45-FSA as a nonaqueous solvent. Sample 4 contains 3mP13-FSA, which is formed when a methyl group binds to the 3-position of P13-FSA, as a nonaqueous solvent instead of the nonaqueous solvent used in Sample 2. Sample 5 contains 3mPP13-FSA, which is formed when a methyl group binds to the 3-position of PP13-FSA, as a nonaqueous solvent instead of the nonaqueous solvent used in Sample 2.

As shown in FIG. 19, the discharge capacity of each sample did not decrease at higher than or equal to 60° C. Further, FIG. 19 shows that Sample 2 had a favorable discharge capacity also at room temperature.

Next, the cycle characteristics of Sample 2 with respect to temperature at which it is heated and kept were evaluated. The measurement was performed with the same charge-discharge measuring instrument as the measuring instrument used in Example 1. Temperatures at which Sample 2 was heated and kept are 60° C., 85° C., and 100° C. In the measurement, charge and discharge were performed at a constant current, and a set of charge and discharge is one cycle. In the first cycle, constant current charge was performed at a rate of 0.1 C and then discharge was performed at a rate of 0.1 C. In the second and later cycles, charge and discharge at a rate of 0.5 C were repeated 200 times.

Figure 14:
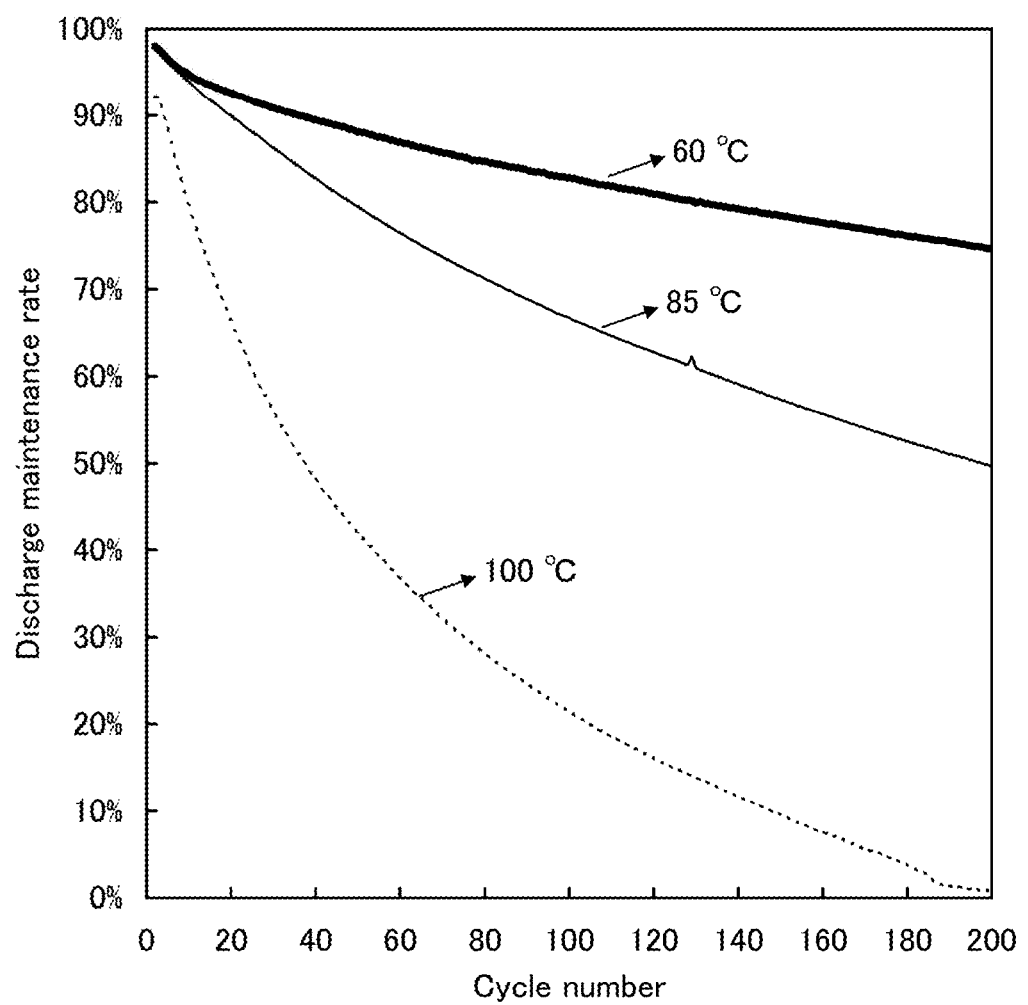
FIG. 14 is a graph showing the cycle characteristics of a coin-type lithium secondary battery.

FIG. 14 shows the cycle characteristics of Sample 2 measured at the temperatures. The horizontal axis represents the number of charge and discharge cycles and the vertical axis represents discharge maintenance rate. Note that FIG. 14 shows discharge maintenance rate in the second and later cycles. In FIG. 14, the thick line shows cycle characteristics of Sample 2 heated and kept at 60° C.; the thin line shows cycle characteristics of Sample 2 heated and kept at 85° C.; and the dotted line shows cycle characteristics of Sample 2 heated and kept at 100° C. As shown in FIG. 14, the discharge maintenance rate after 200 cycles at 60° C. was approximately 75%; the discharge maintenance rate after 200 cycles at 85° C. was approximately 50%; and the discharge maintenance rate after 100 cycles at 100° C. was approximately 20%, while discharge was hardly observed after 200 cycles. The above results show that Sample 2 can operate as a battery even at temperatures of 60° C. or higher unlike a lithium secondary battery containing an organic solvent such as diethyl carbonate or ethylene carbonate, which is generally not safe at high temperatures, as a nonaqueous solvent of a nonaqueous electrolyte.

Figure 15:
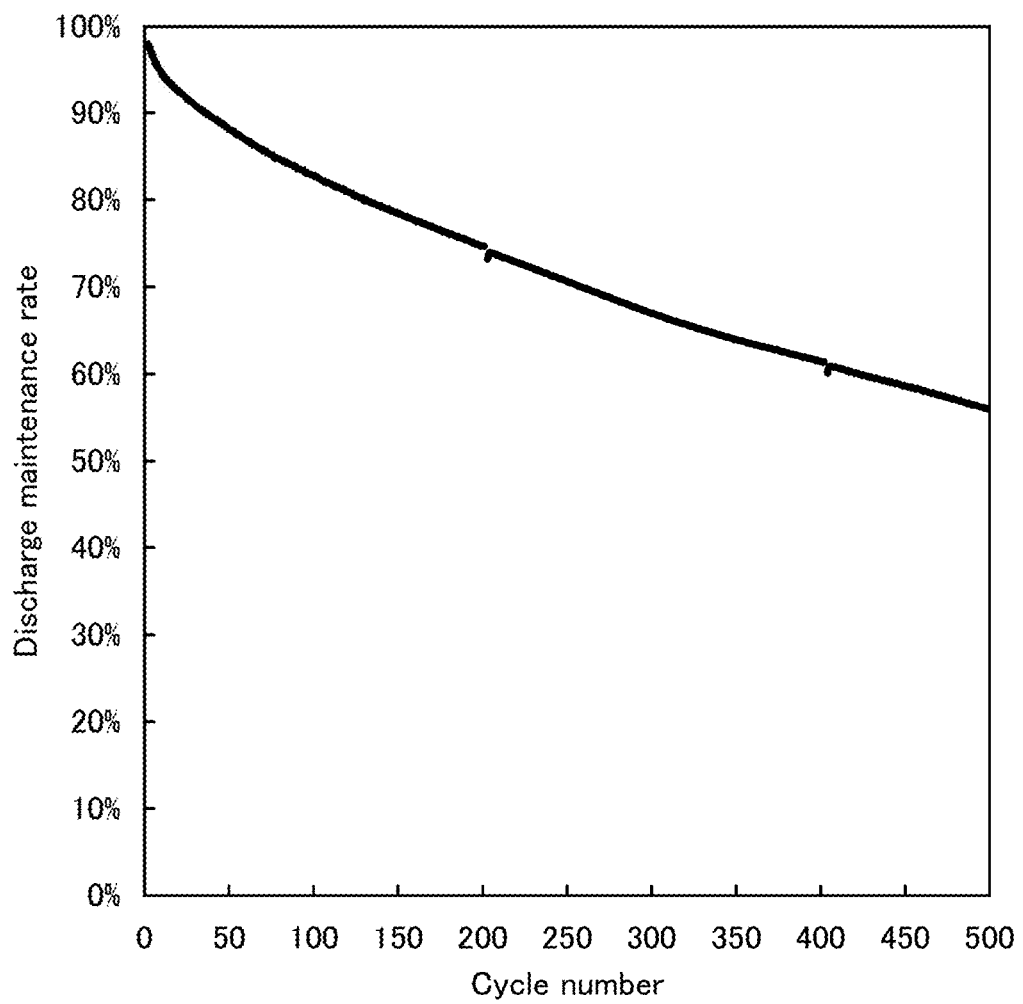
FIG. 15 is a graph showing the cycle characteristics of a coin-type lithium secondary battery.

FIG. 15 shows the discharge maintenance rate until 500th cycle of Sample 2 heated and kept at 60° C. The discharge maintenance rate after 300 cycles was approximately 67%. The discharge maintenance rate after 400 cycles was approximately 61%. The discharge maintenance rate after 500 cycles was approximately 56%. Note that charge and discharge were performed at a rate of 0.1 C in every 200 cycles and capacity was measured.

Figure 20:
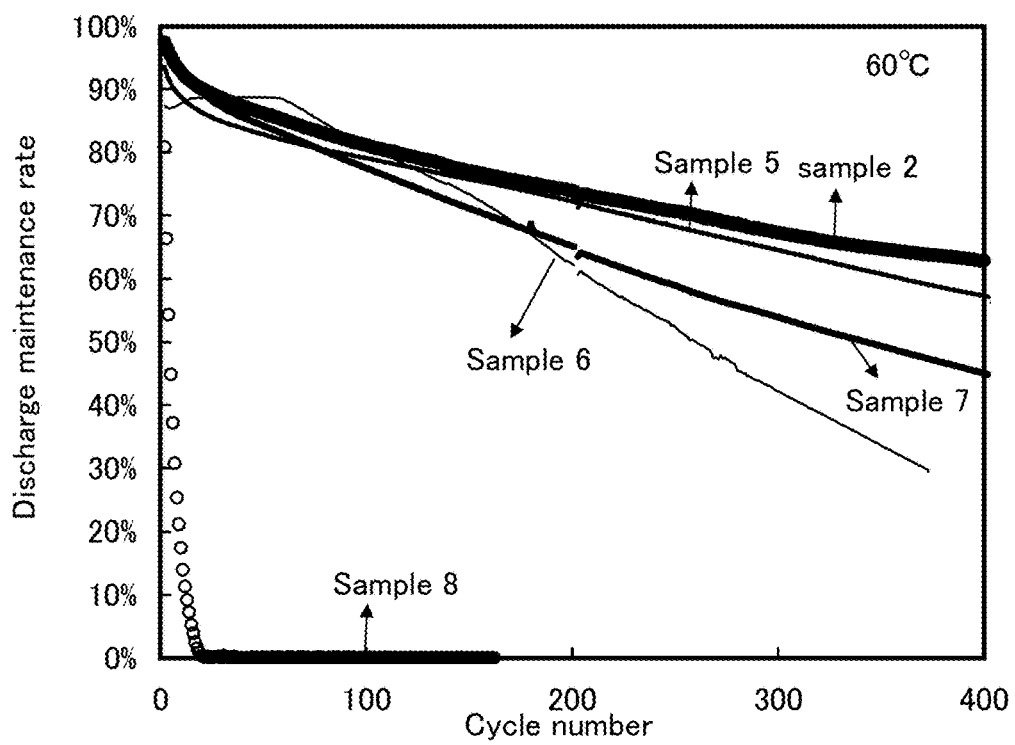
FIG. 20 is a graph showing the cycle characteristics of coin-type lithium secondary batteries.
Figure 21:
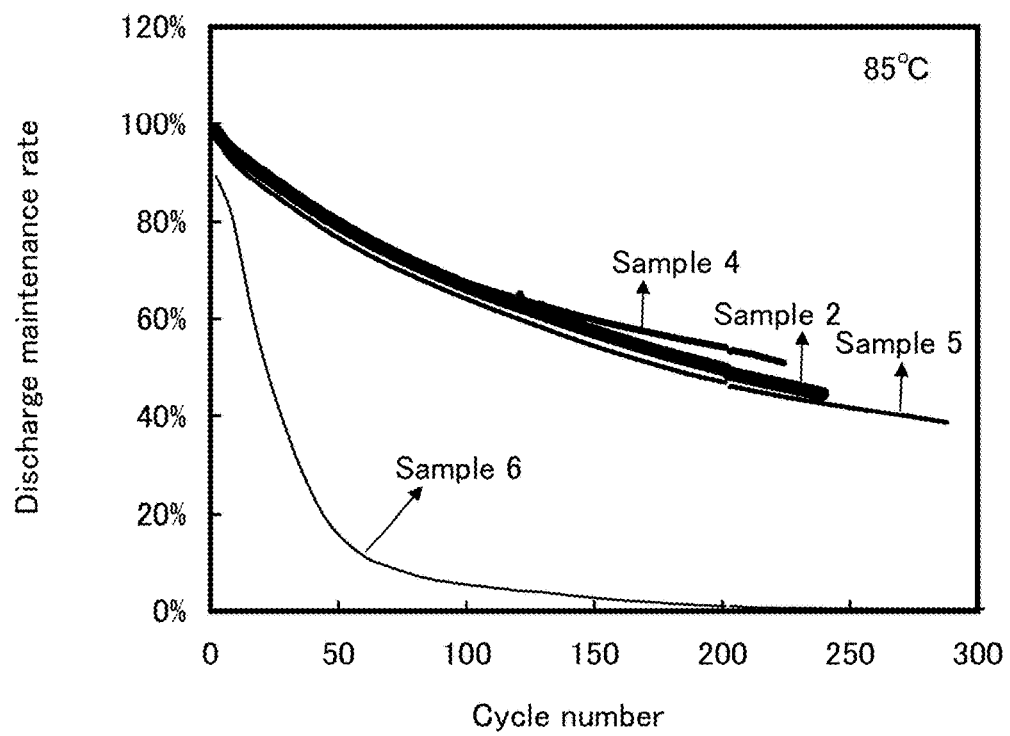
FIG. 21 is a graph showing the cycle characteristics of coin-type lithium secondary batteries.
Figure 22:
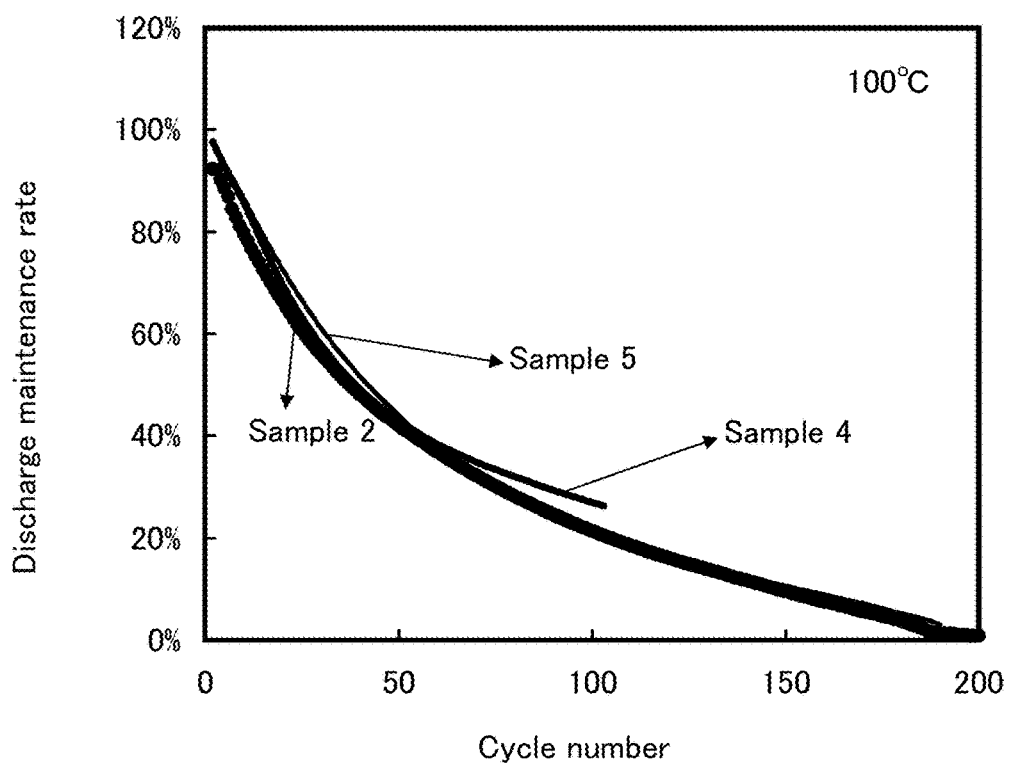
FIG. 22 is a graph showing the cycle characteristics of coin-type lithium secondary batteries.

In addition, FIG. 20, FIG. 21, and FIG. 22 show comparison results of the cycle characteristics of batteries at respective temperatures; the batteries each contain an organic solvent or an ionic liquid as a nonaqueous solvent of a nonaqueous electrolyte. Here, Sample 6, Sample 7, and Sample 8 were used in addition to Sample 2, Sample 4, and Sample 5 described above. Sample 6 contains a solution where 1 M LiPF$_6$ as a lithium salt was dissolved in a mixture of EC and DEC mixed at a volume ratio of 1:1 as an organic solvent, as a nonaqueous electrolyte. Sample 7 contains a solution where 1 M LiTFSA as a lithium salt was dissolved in PP13-FSA (N-methyl-N-propylpiperidinium bis(fluorosulfonyl)amide) as an ionic liquid, as a nonaqueous electrolyte. Sample 8 contains a solution where 1 M LiTFSA as a lithium salt was dissolved in EMI (abbreviation) as an ionic liquid, as a nonaqueous electrolyte.

The table below shows the results of the above measurement.

FIGS. 20 to 22 show that Sample 2, Sample 4, and Sample 5 have more favorable characteristics than Sample 6, Sample 7, and Sample 8 and that the discharge capacity maintenance rate of Sample 2 was particularly high at 60° C.

The results in this example indicate that the use of the 7mAS45-FSA described in Example 3 as a nonaqueous solvent of a nonaqueous electrolyte allows manufacture of a lithium secondary battery. The results also show that Sample 2 operates as a battery, without an additive such as ethylene carbonate or vinylene carbonate.

Next, the rate characteristics of a lithium secondary battery containing the 7mAS45-FSA as a nonaqueous solvent of a nonaqueous electrolyte were evaluated. As a sample for the evaluation of the rate characteristics, a half cell coin-type lithium secondary battery including a positive electrode similar to that in Sample 2 and lithium foil as a negative electrode was used. The half cell coin-type lithium secondary battery was fabricated by the fabrication method of Sample 2 using lithium foil instead of copper foil in the negative electrode 107. Thus, the positive electrode and the nonaqueous electrolyte of the half cell coin-type lithium secondary battery are the same as those in Sample 2.

Figure 16:
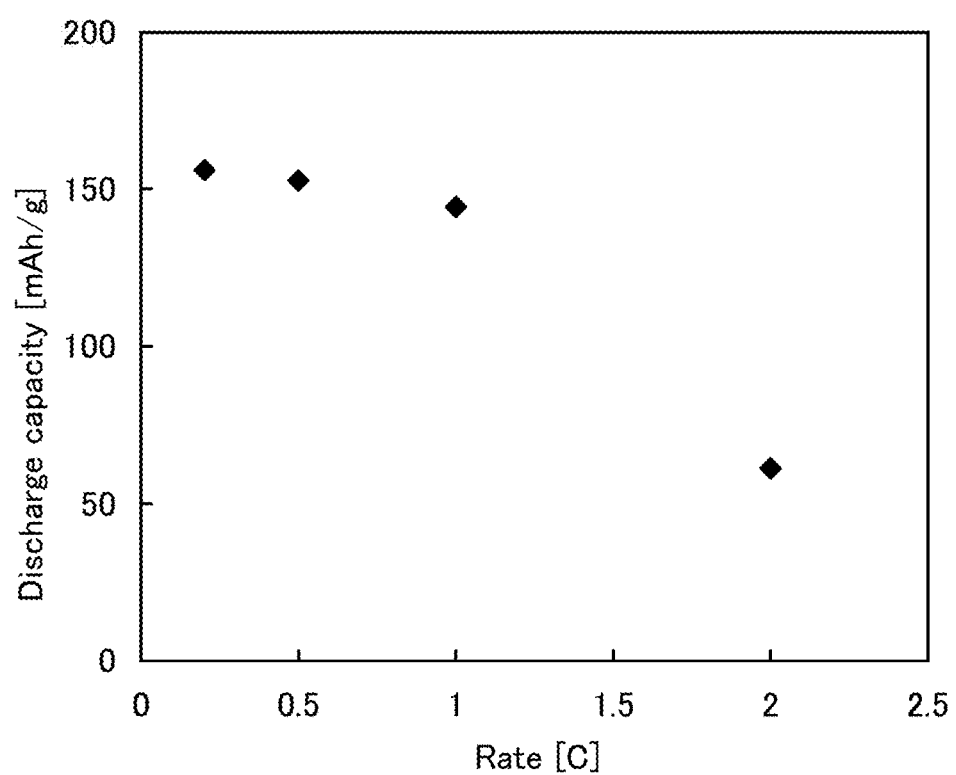
FIG. 16 is a graph showing the rate characteristics of a coin-type lithium secondary battery.

The rate characteristics of the half cell coin-type lithium secondary battery were measured. The measurement was performed with the same charge-discharge measuring instrument as the measuring instrument used in Example 1 with the half cell coin-type lithium secondary battery heated and kept at 60° C. The charge voltage is lower than or equal to 4 V and the charge rate was 0.2 C, and discharge rates are 0.2 C, 0.5 C, 1 C, and 2 C. FIG. 16 shows discharge capacity with respect to rate.

The charge capacity at the rate was approximately 150 mAh/g, and the discharge capacities at 0.2 C, 0.5 C, and 1 C were approximately 150 mAh/g substantially equal to the charge capacity. On the other hand, the discharge capacity at 2 C was approximately 60 mAh/g. These results show that the rate characteristics of the fabricated half cell coin-type lithium secondary battery was favorable.

Note that as shown in FIG. 16, when the half cell coin-type lithium secondary battery was heated and kept at 60° C. and discharged at 1 C, the discharge capacity was 144 mAh/g, and when the half cell coin-type lithium secondary battery was heated and kept at 25° C. and discharged at 0.2 C, the discharge capacity was substantially equal to that of the half cell coin-type lithium secondary battery heated and kept at 60° C. and discharged at 1 C (specifically, 133 mAh/g).

TABLE 3

|  |  | 60° C. | | 85° C. | | 100° C. | |
| --- | --- | --- | --- | --- | --- | --- | --- |
|  |  | Initial capacity [mAh/g] | Discharge capacity maintenance rate (%) (at the 50th cycle) | Initial capacity [mAh/g] | Discharge capacity maintenance rate (%) (at the 50th cycle) | Initial capacity [mAh/g] | Discharge capacity maintenance rate (%) (at the 50th cycle) |
| Sample 4 | LiTFSA/ 3mP13-FSA | — | — | 118 | 79 | 108 | 43 |
| Sample 5 | LiTFSA/ 3mPP13-FSA | 115 | 83 | 110 | 80 | 114 | 44 |
| Sample 2 | LiTFSA/ 7mAS45-F SA | 118 | 86 | 119 | 80 | 111 | 53 |
| Sample 6 | LiPF$_6$/EC · DEC | — | — | 106 | 26 | — | — |

The above results suggest that the use of the 7mAS45-FSA as a nonaqueous solvent of a nonaqueous electrolyte enables manufacture of a lithium secondary battery with favorable rate characteristics.

In addition to the rate characteristics of Sample 2, the rate characteristics at room temperature (25° C.) of Sample 4 and Sample 7 were measured. Note that the structures and the fabrication methods of the lithium secondary batteries are similar to those in Example 2.

Figure 23:
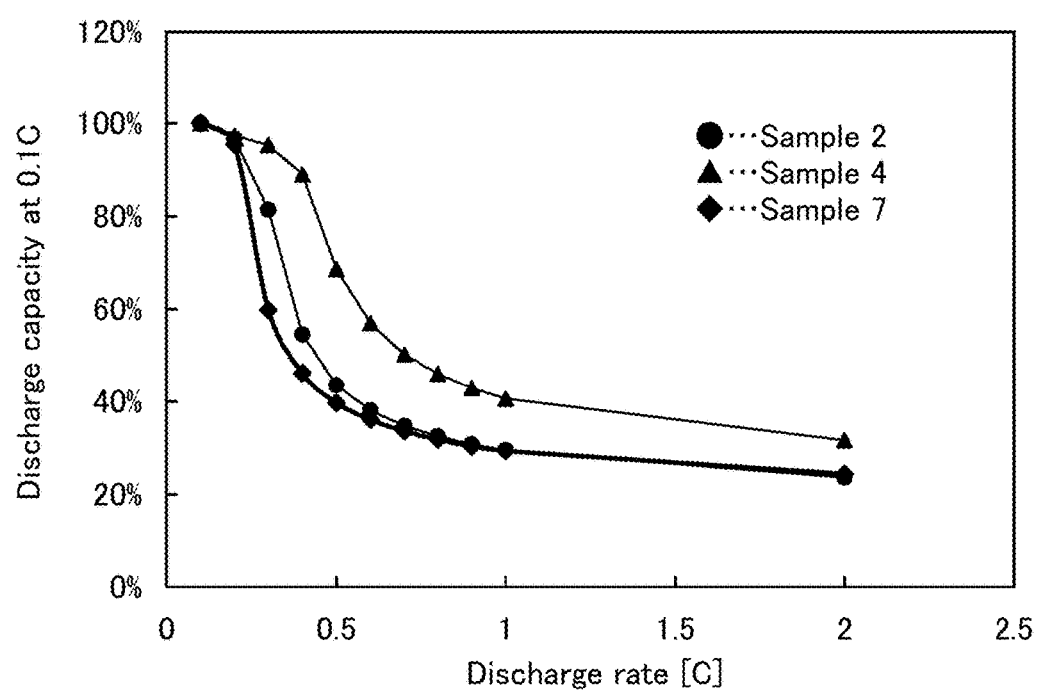
FIG. 23 is a graph showing the rate characteristics of coin-type lithium secondary batteries.

FIG. 23 shows the results of the above measurement. In FIG. 23, the horizontal axis represents discharge rate (C) and the vertical axis represents discharge capacity at 0.1 C. The results show that Sample 2 and Sample 4 each have more favorable characteristics than Sample 7.

Note that this example can be implemented in combination with any of the structures described in the other embodiments and examples, as appropriate.

Example 5

In this example, descriptions will be given of a synthesis method and the physical property of 2-methyl-5-azoniaspiro[4,5]decane bis(fluorosulfonyl)amide (hereinafter abbreviated to 2mAS45-FSA), the cyclic quaternary ammonium salt expressed by General Formula (G3) in which an anion (A⁻) is a (fluorosulfonyl)amide (FSA) anion, and the charge and discharge characteristics of a lithium secondary battery containing 2mAS45-FSA for a nonaqueous electrolyte. The structural formula of 2mAS45-FSA is Structural Formula (β-6). Note that the present invention is not limited to the following examples.

[Chemical Formula 43]

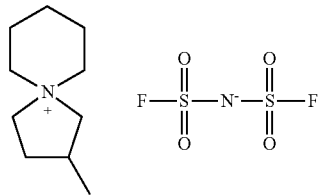

(β-6)

2mAS45-FSA in this example can be synthesized with reference to the synthesis method of 2mAS44-FSA, which is described in Example 1. Specifically, 3-methylpyrrolidine and 1,5-dibromopentane are reacted with each other to synthesize 2-methyl-5-azoniaspiro[4,5]decane bromide, and anion exchange between the 2-methyl-5-azoniaspiro[4,5] decane bromide and FSA is performed, so that 2mAS45-FSA can be synthesized. Thus, a description of a synthesis scheme of the 2mAS45-FSA will be omitted.

<Synthesis of 2-methyl-5-azoniaspiro[4,5]decane bromide

First, 3-methylpyrrolidine (see Structural Formula (β-2) in Synthesis Scheme (S-8)) was synthesized as in Example 1. Then, sodium hydroxide (0.1 mol) was dissolved in pure water (100 ml) at room temperature in the air to form a sodium hydroxide solution and 1,5-dibromopentane (0.1 mol) was added to the sodium hydroxide solution. The 3-methylpyrrolidine (0.1 mol) was dripped for 30 minutes with this mixed solution kept at 60° C. and stirred, and then the mixture was heated to reflux at 70° C. for 2 hours and at 80° C. for approximately 1 hour. A 10 mol/L of sodium hydroxide solution was added to the obtained reaction solution and an intermediate was extracted with 1-butanol. The obtained filtrate was concentrated, purification was performed by recrystallization with a mixed solvent of 1-butanol and ether, and then the obtained solid was filtrated and dried, so that a white solid 2-methyl-5-azoniaspiro[4,5] decane bromide (4.4 g, 19 mmol) was obtained.

Synthesis of 2mAS45-FSA

The 2-methyl-5-azoniaspiro[4,5]decane bromide (4.4 g, 19 mmol) and potassium bis(fluorosulfonyl)amide (4.5 g, 21 mmol) were mixed and stirred in pure water to immediately give an ionic liquid insoluble in water. After that, the obtained ionic liquid was extracted with methylene chloride and then washed with pure water six times. The solvent was removed by evaporation and drying was performed at 80° C. in a vacuum, so that 2-methyl-5-azoniaspiro[4,5]decane bis(fluorosulfonyl)amide (5.2 g, 16 mmol) was obtained.

The ionic liquid obtained through the above steps was identified as 2mAS45-FSA by a nuclear magnetic resonance (NMR) method and mass spectrometry.

Figure 17A:
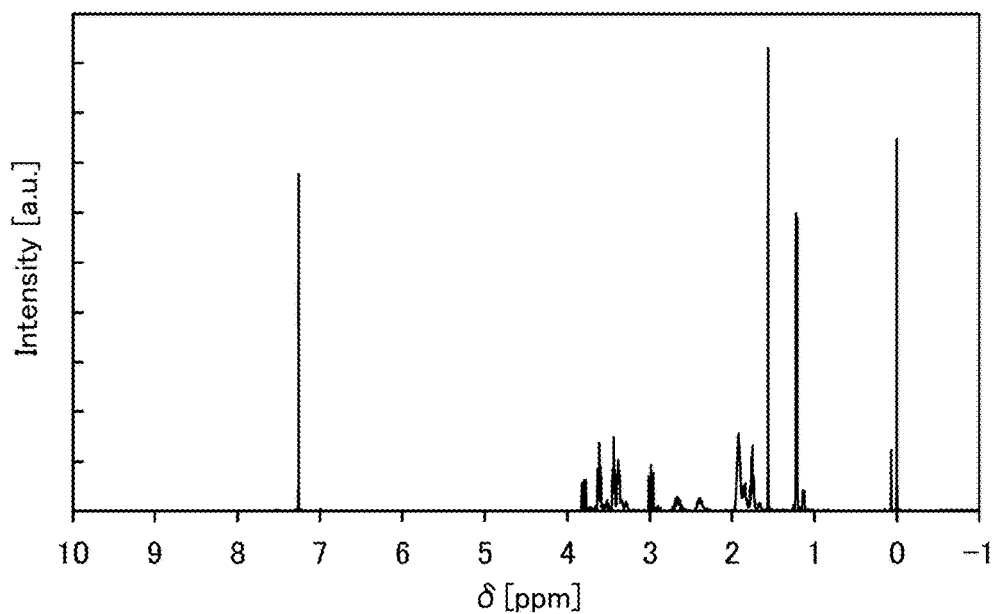
FIGS. 17A and 17B are $^1$H NMR charts of a synthesized ionic liquid.
Figure 17B:
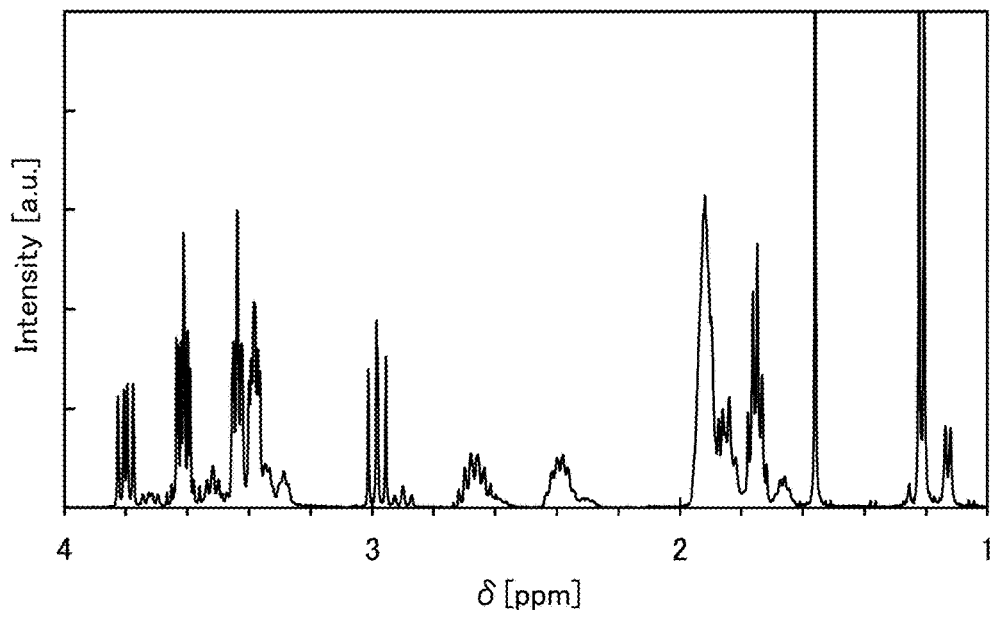

FIGS. 17A and 17B show $^1$H NMR charts. Note that FIG. 17B is an enlarged chart showing the range of 1.00 ppm to 4.00 ppm in FIG. 17A.

$^1$H NMR data of the obtained compound is shown below.

$^1$H NMR (CDCl$_3$, 400 MHz, 298 K): δ (ppm) 1.20 to 1.22 (3H), 1.60 to 1.78 (2H), 1.78 to 1.95 (5H), 2.27 to 2.43 (1H), 2.54 to 2.71 (1H), 2.84 to 3.00 (1H), 3.24 to 3.46 (4H), 3.46 to 3.64 (2H), 3.64 to 3.81 (1H)

The measurement results of the electron impact mass spectrometry (EI-MS) of the obtained compound are shown below.

MS(EI-MS): m/z=154.22 (M)⁺; C$_{10}$H$_{20}$N (154.16), m/z=179.98 (M)⁻; F$_2$NO$_4$S$_2$ (179.92)

The above results show that the compound synthesized through the above steps is the desired product 2mAS45-FSA.

Further, the viscosity, the melting points, and the conductivity of the 2mAS45-FSA were measured. The measurement of the viscosity, the melting points, and the conductivity was performed as in Example 1. The viscosity of the 2mAS45-FSA was 85 Pa·s. The melting points of the 2mAS45-FSA were 2.1° C. and 7.6° C. The conductivity of the 2mAS45-FSA at 25° C. was 4.7 mS/cm. Note that the 2mAS45-FSA synthesized in this example has two melting points presumably because the synthesized 2mAS45-FSA has a stereoisomer.

The oxidation potential and the reduction potential of the 2mAS45-FSA were evaluated by linear sweep voltammetry. The measurement was performed by a method similar to that in Example 1.

The oxidation potential and the reduction potential of the 2mAS45-FSA were 5.9 V (vs. Li/Li⁺) and 0.01 V (vs. Li/Li⁺), respectively.

According to the above results, the melting points of the 2mAS45-FSA of one embodiment of the present invention were low, which indicates that the use of the 2mAS45-FSA as a nonaqueous solvent in formation of a nonaqueous electrolyte enables manufacture of a power storage device which can operate at a wide range of temperatures including low temperatures.

Note that this example can be implemented in combination with any of the structures described in the other embodiments and examples, as appropriate.

Example 6

In this example, the battery characteristics of a lithium secondary battery containing the 2mAS45-FSA described in Example 5 as a nonaqueous solvent of a nonaqueous electrolyte will be described.

In this example, a full cell coin-type lithium secondary battery was fabricated and the battery characteristics thereof were evaluated. The structure and a fabrication method of the cell coin-type lithium secondary battery fabricated in this example are the same as those in Example 4 except that the 2mAS45-FSA described in Example 5 is used as a nonaqueous solvent of a nonaqueous electrolyte.

As a nonaqueous electrolyte, a solution where 1.0 M LiTFSA as a lithium salt was dissolved in the 2mAS45-FSA described in Example 5 was used in this example. The coin-type lithium secondary battery fabricated in this example is Sample 3.

The charge and discharge characteristics of Sample 3 were measured. The measurement was performed with the same charge-discharge measuring instrument as the measuring instrument used in Example 1 with Sample 3 heated and kept at 60° C. Further, charge and discharge in the measurement were performed at a rate of 0.1 C in the voltage range of 2.0 V to 4.0 V (constant current charge and discharge).

Figure 18:
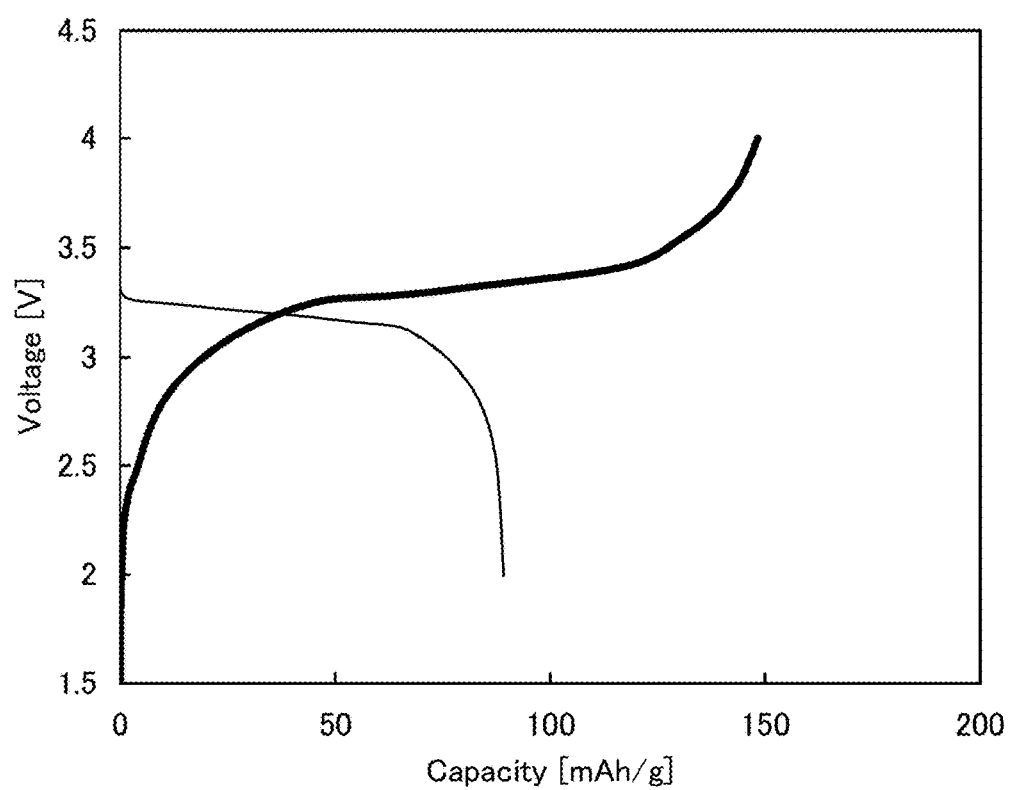
FIG. 18 is a graph showing the charge and discharge characteristics of a coin-type lithium secondary battery.

FIG. 18 shows the charge and discharge characteristics of Sample 3. In the graph, the horizontal axis represents capacity per unit weight of the positive electrode active material and the vertical axis represents charge and discharge voltage. Further, the thick curve is a charge curve of Sample 3, and the capacity value at 4 V is the initial charge capacity. The thin curve is a discharge curve of Sample 3, and the capacity value at 2 V is the initial discharge capacity.

The initial charge capacity and the initial discharge capacity of Sample 3 were approximately 150 mAh/g and approximately 90 mAh/g, respectively.

The above results suggest that the use of the 2mAS45-FSA described in Example 5 as a nonaqueous solvent of a nonaqueous electrolyte enables manufacture of a lithium secondary battery. Further, the results show that Sample 3 operates as a battery, without an additive such as ethylene carbonate or vinylene carbonate.

Note that this example can be implemented in combination with any of the structures described in the other embodiments and examples, as appropriate.

EXPLANATION OF REFERENCE

100: power storage device, 101: positive electrode can, 102: negative electrode can, 103: gasket, 104: positive electrode, 105: positive electrode current collector, 106: positive electrode active material layer, 107: negative electrode, 108: negative electrode current collector, 109: negative electrode active material layer, 110: separator, 153: positive electrode active material, 154: graphene, 183: negative electrode active material, 184: conductive additive, 185: graphene, 200: power storage device, 201: positive electrode current collector, 202: positive electrode active material layer, 203: positive electrode, 204: negative electrode current collector, 205: negative electrode active material layer, 206: negative electrode, 207: separator, 208: nonaqueous electrolyte, 209: exterior body, 300: power storage device, 301: positive electrode cap, 302: battery can, 303: positive electrode terminal, 304: positive electrode, 305: separator, 306: negative electrode, 307: negative electrode terminal, 308: insulating plate, 309: insulating plate, 311: PTC element, 312: safety valve mechanism, 650: portable information terminal, 651: housing, 652: display portion, 652a: display portion, 652b: display portion, 653: power button, 654: optical sensor, 655: a camera lens, 656: speaker, 657: microphone, 658: power source, 659: marker, 660: solar cell, 670: charge/discharge control circuit, 671: battery, 672: DC-DC converter, 673: converter, 680: electric vehicle, 681: battery, 682: control circuit, 683: driving device, 684: processing unit, 5000: display device, 5001: housing, 5002: display portion, 5003: speaker portion, 5004: power storage device, 5100: lighting device, 5101: housing, 5102: light source, 5103: power storage device, 5104: ceiling, 5105: wall, 5106: floor, 5107: window, 5200: indoor unit, 5201: housing, 5202: air outlet, 5203: power storage device, 5204: outdoor unit, 5300: electric refrigerator-freezer, 5301: housing, 5302: door for refrigerator, 5303: door for freezer, and 5304: power storage device This application is based on Japanese Patent Application serial no. 2012-103033 filed with the Japan Patent Office on Apr. 27, 2012, Japanese Patent Application serial no. 2012-222974 filed with the Japan Patent Office on Oct. 5, 2012, and Japanese Patent Application serial no. 2013-049812 filed with the Japan Patent Office on Mar. 13, 2013, the entire contents of which are hereby incorporated by reference.

The invention claimed is:

1. A cyclic quaternary ammonium salt consisting of:
   a quaternary spiro ammonium cation including a substituted aliphatic ring and an unsubstituted aliphatic ring; and
   a counter anion to the quaternary spiro ammonium cation,
   wherein the number of carbon atoms in the substituted aliphatic ring is four, and the number of carbon atoms in the unsubstituted aliphatic ring is five,
   wherein each substituent on the substituted aliphatic ring is a methyl group, and
   wherein the cyclic quaternary ammonium salt is an ionic liquid.

2. The cyclic quaternary ammonium salt according to claim 1, wherein a melting point of the ionic liquid is lower than a room temperature.

3. The cyclic quaternary ammonium salt according to claim 1, wherein the substituent is an electron-donating substituent.

4. The cyclic quaternary ammonium salt according to claim 1, wherein a reduction potential of the ionic liquid is lower than or equal to 0.5 V with respect to a redox potential of lithium.

5. The cyclic quaternary ammonium salt according to claim 1, wherein a conductivity of the ionic liquid at 25° C. is higher than or equal to 3 mS/cm.

6. A power storage device comprising:
   a positive electrode;
   a negative electrode; and
   the cyclic quaternary ammonium salt according to claim 1.

7. The power storage device according to claim 6 further comprising:
   a lithium salt.

8. A cyclic quaternary ammonium salt expressed by Formula (G1),

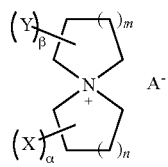

(G1)

wherein: n is 1; m is 2; α is 1; β is 0; X is a methyl group; and A⁻ is an anion selected from a monovalent amide anion, a monovalent methide anion, a perfluoroalkylsulfonate anion, tetrafluoroborate, perfluoroalkylborate, hexafluorophosphate, and perfluoroalkylphosphate, and wherein the cyclic quaternary ammonium salt is an ionic liquid.

9. The cyclic quaternary ammonium salt according to claim 8, wherein the ionic liquid is liquid at room temperature.

10. The cyclic quaternary ammonium salt according to claim 8, wherein the substituent is an electron-donating substituent.

11. The cyclic quaternary ammonium salt according to claim 8, wherein the ionic liquid is expressed by Formula (G10),

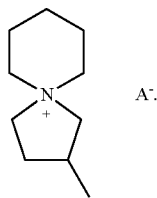

(G10)

12. The cyclic quaternary ammonium salt according to claim 8, wherein a reduction potential of the ionic liquid is lower than or equal to 0.5 V with respect to a redox potential of lithium.

13. The cyclic quaternary ammonium salt according to claim 8, wherein a conductivity of the ionic liquid at 25° C. is higher than or equal to 3 mS/cm.

14. The cyclic quaternary ammonium salt according to claim 8, wherein a melting point of the ionic liquid is lower than a room temperature.

15. The cyclic quaternary ammonium salt according to claim 8, wherein a substitution position of X is the 2-position of the cyclic quaternary ammonium cation.

16. A power storage device comprising:
a positive electrode;
a negative electrode; and
the cyclic quaternary ammonium salt according to claim 8.

17. The power storage device according to claim 16 further comprising:
a lithium salt.

18. A power storage device comprising,
a positive electrode;
a negative electrode; and
an electrolyte,
wherein the electrolyte comprises:
    an ionic liquid consisting of:
        a quaternary spiro ammonium cation including a first aliphatic ring and a second aliphatic ring, wherein the first aliphatic ring has four carbon atoms and a methyl substituent and the second aliphatic ring has five carbon atoms; and
        a counter anion to the quaternary spiro ammonium cation; and
    a metal salt.

19. The power storage device according claim 18, wherein metal ions of the metal salt are selected from at least one of lithium ions, sodium ions, potassium ions, calcium ions, strontium ions, and barium ions.

20. The power storage device according claim 18,
wherein the negative electrode comprises an active material,
wherein the active material is selected from at least one of a graphite, graphitizing carbon, non-graphitizing carbon, a carbon nanotube, a graphene, and a carbon black, and
wherein the metal salt is a lithium salt.

21. The ionic liquid according to claim 18, wherein a melting point of the ionic liquid is lower than a room temperature.

* * * * *